United States Patent
Nakamura et al.

(10) Patent No.: US 7,164,486 B1
(45) Date of Patent: Jan. 16, 2007

(54) IMAGE FORMING APPARATUS, EXPANSION BOX FOR IMAGE FORMING APPARATUS AND IMAGE EDITING SYSTEM

(75) Inventors: Hisatoshi Nakamura, Kawasaki (JP); Toshiharu Tsuruma, Kawasaki (JP); Hitoshi Katta, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/571,868

(22) Filed: May 16, 2000

(30) Foreign Application Priority Data

May 17, 1999 (JP) .................... 11-136384

(51) Int. Cl.
G06F 15/00 (2006.01)
G06F 3/12 (2006.01)
H04N 4/00 (2006.01)

(52) U.S. Cl. .................. 358/1.15; 358/1.1; 358/442

(58) Field of Classification Search ........... 358/1.9, 358/471, 442, 444, 400, 1.13, 1.15, 520, 358/537, 539, 1.1; 399/113, 121
See application file for complete search history.

(56) References Cited

U.S. PATENT DOCUMENTS

| | | | | |
|---|---|---|---|---|
| 4,437,127 A | * | 3/1984 | Hirose | 358/296 |
| 4,866,539 A | * | 9/1989 | Marazzi et al. | 358/303 |
| 5,048,078 A | * | 9/1991 | Satomi et al. | 379/102.02 |
| 5,283,671 A | * | 2/1994 | Stewart et al. | 358/532 |
| 5,428,423 A | * | 6/1995 | Clark | 355/77 |
| 5,500,715 A | * | 3/1996 | Ta et al. | 399/1 |
| 5,504,696 A | * | 4/1996 | Debes | 702/95 |
| 5,544,045 A | * | 8/1996 | Garland et al. | 704/3 |
| 5,627,653 A | * | 5/1997 | Nakazato | 358/300 |
| 5,701,185 A | * | 12/1997 | Reiss et al. | 358/471 |
| 5,710,872 A | * | 1/1998 | Takahashi et al. | 358/1.9 |
| 5,719,540 A | * | 2/1998 | Takaoka et al. | 355/35 |
| 5,734,915 A | * | 3/1998 | Roewer | 715/512 |
| 5,751,923 A | * | 5/1998 | Matsuzawa | 358/1.15 |
| 5,771,419 A | * | 6/1998 | Kubo et al. | 399/2 |
| 5,805,777 A | * | 9/1998 | Kuchta | 358/1.13 |
| 5,881,210 A | * | 3/1999 | Guay et al. | 358/1.9 |
| 5,887,989 A | * | 3/1999 | Hannah | 400/61 |
| 6,002,845 A | * | 12/1999 | Honma | 358/1.16 |
| 6,025,923 A | * | 2/2000 | Kageyama et al. | 358/1.14 |
| 6,111,659 A | * | 8/2000 | Murata | 358/296 |
| 6,141,120 A | * | 10/2000 | Falk | 358/504 |

(Continued)

FOREIGN PATENT DOCUMENTS

JP   A-1-280962   11/1989

Primary Examiner—Madeleine A V Nguyen
(74) Attorney, Agent, or Firm—Oliff & Berridge, PLC

(57) ABSTRACT

An image editing system having an image forming apparatus and an expansion box. The image forming apparatus includes an image inputting part which inputs the original image as an image, an image processing part which converts image information of an input color coordinate system into an output color coordinate system, an image outputting part which prints out image information of the output color coordinate system, and a first connection part which performs exchanging the image information of the output color coordinate system between the image forming apparatus and an external device. The expansion box includes a second connection part which is connected with the first connection part and a storing part which stores the image information and provides the expansion of image editing function.

5 Claims, 32 Drawing Sheets

U.S. PATENT DOCUMENTS

| | | | |
|---|---|---|---|
| 6,154,755 A * | 11/2000 | Dellert et al. | 715/526 |
| 6,160,633 A * | 12/2000 | Mori | 358/1.5 |
| 6,192,184 B1 * | 2/2001 | Shiota et al. | 386/52 |
| 6,313,919 B1 * | 11/2001 | Nakagiri et al. | 358/1.11 |
| 6,369,913 B1 * | 4/2002 | Aoyagi et al. | 358/1.9 |
| 6,433,883 B1 * | 8/2002 | Kajita | 358/1.14 |
| 6,469,795 B1 * | 10/2002 | Beaudet et al. | 358/1.14 |
| 6,522,770 B1 * | 2/2003 | Seder et al. | 382/100 |
| 6,549,657 B1 * | 4/2003 | Ohta et al. | 382/173 |
| 6,559,967 B1 * | 5/2003 | Akiba et al. | 358/1.16 |
| 6,665,081 B1 * | 12/2003 | Suzuki et al. | 358/1.13 |
| 6,750,987 B1 * | 6/2004 | Murata | 358/474 |
| 2002/0181736 A1 * | 12/2002 | Seder et al. | 382/100 |

\* cited by examiner

100: IMAGE EDITING SYSTEM

FIG. 19

PARAMETER DESIGNATION AREA

PLEASE DESIGNATE FILE TO BE OUTPUTTED

/ PHOTOGRAPH \ / MIS- \
PRINTING   \ CELLANEOUS \

| FILE SELECTION | PHOTOGRAPH SIZE | SIMPLEX/DEPLEX SELECTION | PAPER SELECTION |
|---|---|---|---|
| ☐ WORKING SITE... | ☐ POST CARD | ☐ SIMPLEX | ☐ TRAY 1 A4 LONGITUDINAL WRITING |
| ☐ MO... | ☐ L SHEET | ☐ DUPLEX | ☐ TRAY 2 A3 |
| ☐ PC CARD... | ☐ 2L SHEET | | ☐ TRAY 3 A3 |
| ☐ CD-ROM... | ☐ A4 | | ☐ TRAY 5 (HAND INSERTING) A3 |
| | ☐ MIS- CELLANEOUS... | | ☐ MISCELLANEOUS... |

FIG. 20

POP UP OF "PHOTOGRAPH SIZE"

PLEASE DESIGNATE FILE TO BE OUTPUTTED

PHOTOGRAPH SIZE                         [ CANCEL ]  [ CLOSE ]

| PHOTOGRAPH SIZE | N UP | |
|---|---|---|
| ☐ POST CARD | ☐ 1 UP | |
| ☐ L SHEET | ☐ 2 UP | PHOTOGRAPH SIZE IS AUTOMATICALLY ADJUSTED CORRESPONDING TO THE SELECTED PAPER SIZE |
| ☐ 2L SHEET | ☐ 4 UP | |
| ☐ A4 | ☐ 8 UP | |
| ☐ MISCELLANEOUS... | | |

FIG. 29

100: IMAGE EDITING SYSTEM

IMAGE FORMING APPARATUS, EXPANSION BOX FOR IMAGE FORMING APPARATUS AND IMAGE EDITING SYSTEM

BACKGROUND OF THE INVENTION

1. Field of the Invention

The present invention relates to an image forming apparatus which includes an image inputting part which reads an original image, an image processing part which performs processing such as color coordinate conversion and the like in response to the inputted image data and an image outputting part which performs printing out based on the processed image data, and more particularly to an expansion of image editing function of the image forming apparatus. To be more specific, the present invention relates to an expansion of image editing function which can be realized with the minimum design change of the image forming apparatus body.

2. Description of the Related Art

Even in the past, various OA (Office Automation) equipment have been widely developed and manufactured and they have been used in offices of enterprises and research organizations in an extensive manner. Particularly, in the current society where the documentation is considered to be most important, image forming apparatuses of an electrophotography system which can reproduce original images of high quality have been deeply spread into the office. In this specification, "image forming apparatuses" include, in addition to "copying machines" which read and reproduce original images on papers, "facsimiles" which output image data received through telephone circuits such as PSTN (Public Switched Telephone Network) or ISDN (Integrated Services Digital Network), "printers" which print computer data or "composite apparatuses" which are provided with not less than two image output functions among them.

The image forming apparatus generally includes an image inputting part which reads images by optically scanning an original, an image processing part which performs given processing such as color coordinate conversion, digital filtering, T/I separation or the like, an image outputting part which reproduces the inputted image on a printing paper based on the image data after image processing. The image outputting part, for example, adopts an electrophotographic processing system. The elecrophotographic processing system is realized by repeating charging, developing and cleaning of an electrophotrographic photosensitive body. That is, after uniformly charging the surface of the photosensitive body by a charger, the surface of the photosensitive body is exposed in response to the image data so as to form an electrostatic latent image. Then, after changing the electrostatic latent image to a toner image by a developer, the toner image is transferred to a printing paper. Thereafter, the toner image is fixed onto the printing paper by heating, fusing and sealing actions and the printing paper is discharged to the outside of the image forming apparatus. Residual toner remaining on the surface of the photosensitive body after transferring is removed by a cleaner and is served for a subsequent developing process.

By the way, recently, not only the original images which are optically read are directly reproduced on the printing paper but also it has been required to perform various editing and processing with respect to these original images. Here, "editing and processing" are not limited to mere enlargement or reduction processing of original images but include sorting based on electronic image data, cutting and copying of images into documents, storing of image data, transfer of image data to other equipment and the like. Further, not only the image forming apparatus performs image inputting operation by optically scanning by itself, but also, it is expected that the image forming apparatus will accept the supply of existing image data through media such as CD (Compact Disc) and MO (Magneto-Optical disc) or networks.

To perform electronic processing of image data including electronic sorting, it is necessary to provide a processor which electronically processes image data and an external memory device having a relatively large capacity such as a hard disc device for storing image data. To transmit and receive image data through exchangeable type media such as CD, MO and the like, a media drive which performs inputting and outputting of data of respective media becomes necessary. Further, to perform inputting and outputting of the data through a network, a network interface becomes necessary. In short, to expand functions, hardware which are necessary corresponding to respective functions must be additionally provided. This additional provision of hardware, for example, can be realized in the form of providing "an adapter card" which mounts circuit components on a printed wiring board.

However, the additional provision of hardware to the image forming apparatus inevitably pushes up the cost. In particular, with respect to products such as copying machines whose marketability have been proved, in general, their mechanical and electrical specifications have been fixed depending on respective makers. Basically, products like copying machines assume their use under the "standalone" environment and hence, the design which is optimized by only considering the realization of conventional functions almost has been followed fixedly. In other words, The design change of these devices whose design has been fixed will give rise to an unexpected expansion of development and manufacturing cost. That is, to newly add a slot or a space for mounting the adapter card in the inside of the copying machine imposes an unbearable load to designers and manufacturers of the devices.

To facilitate the manipulation of complicate and versatile functions by a user, it is necessary to expand a user interface function. In the devices such as copying machines currently available, users commands are inputted through only an "operation panel" of monochromatic display having a size of several inches which is formed in a vacant space on the upper surface of the device which accommodates an original reading part (platen or original feeder sometimes). To provide the complicated and versatile function selection on such a relatively narrow operation panel, the design of the screen inevitably becomes cumbersome. In other words, it is impossible for users of the copying machine to perform the function selection, that is, the command inputting operation intuitively and it is necessary for the user to acquire some level of operational skill. Basically, the inputting operation on the narrow operation panel is tight.

On the other hand, in the field of general-purpose computers (work stations or personal computers, for example) a so-called DTP (Desktop Publishing) becomes one of the major usage of the computers. This trend has been brought about along with an increase of demand that documents of high confidentiality such as in-house documents or news letters are prepared personally with the least labor and at a low cost.

The general-purpose computer system shows an excellent performance in handling electronic information and can electronically store, transfer, sort the image data and move, adhere and copy the image data in the electronic document easily. However, image scanners for electronically inputting the image data on the paper, printers for performing print outputting of the electronic document or the like are expensive. It is not realistic economically as well as from a viewpoint of space efficiency of an office that each user of computer has the image inputting device and image outputting device. In short, the burden which becomes necessary due to the image editing is also excessively large for the user of the general-purpose computer.

Although the image forming apparatuses such as copying machines are excellent in electronically inputting the original image and reproducing the original image on the paper, the further expansion of their image editing function is requested. On the other hand, although the general computer system is excellent in the electronic processing of data, it is difficult for them to have devices for performing image inputting and image outputting as standard equipment. Although both of the image forming apparatus and the general computer electronically can process image data, the transmission/reception of data has not been performed between them.

SUMMARY OF THE INVENTION

The present invention has been made in view of the above circumstances and provides an expansion of image editing function in an image forming apparatus which includes an image inputting part which reads an original image, an image processing part which performs processing such as color conversion on the inputted image data and an image outputting part which performs image outputting for the processed image data.

The present invention also provides an expansion of image editing function with the minimum design change of the image forming apparatus body.

According to a first aspect of the present invention, the image forming apparatus includes an image inputting part which inputs an original image as an image data of an input color coordinate system, an image processing part which converts the image data of the input color coordinate system into an output color coordinate system, an image outputting part which prints out the image data of the output color coordinate system, and a connection part which performs transmission/reception of the image data of the output color coordinate system (or output system data format) between the image forming apparatus and an expansion box disposed outside the image forming apparatus.

That is, in the image forming apparatus according to the first aspect of the present invention, the expansion box is connected to the image forming apparatus through the connection part. The expansion box is, for example, constituted by a general-purpose computer system which is called a work station or a personal computer and is excellent in processing of electronic data. This expansion box electronically stores or sorts the image data received from the image forming apparatus, or cuts out the image data, or copy the image data into given document file, or electronically edits the image. Alternatively, the expansion box receives image data from other equipment connected to a network or transfers image data supplied from a media mounted in a media drive to the image forming apparatus side so as to output the image on the printing paper.

The expansion function such as image editing in the image forming apparatus is not provided by adding hardware and software to the image forming apparatus body to which the design based on the conventional functions is fixed but is provided by the general-purpose computer system which is externally connected to the image forming apparatus. In other words, the image forming apparatus can obtain the added values with a minimum increase of cost by preparing the connection port for mounting the general-purpose computer system.

In the image forming apparatus according to the first aspect of the present invention, the image inputting part optically reads the original image and hence, the input color coordinate system may be formed of a RGB color coordinate space which adopts three primary colors as key colors. On the other hand, the image outputting part reproduces a color image by a combination of toners of four colors made of yellow (Y), magenta (M), cyan (C) and black (K), that is, by four developing processes and hence, the output coordinate system is preferably formed of a YMCK color coordinate space.

The image processing part may be able to perform the image processing such as the adjustment of hue, saturation and density, base-color removal, gray scale correction and the like in addition to the conversion processing of color coordinate system. Different from image edit processing such as clipping, copying, sorting of image data and the like, this kind of image processing is tuned up deeply depending on the hardware characteristics of the image outputting part and hence, it is preferable that this image processing is performed in the inside of the image forming apparatus rather than in the outside of the image forming apparatus. Further, since the processing quantity of this image processing is enormous, it is preferable to perform such image processing by the hardware exclusive for image processing rather than outputting the image to the outside and subjecting the image to a software processing. Further, such image processing hardware is generally provided to the image forming apparatus such as a copying machine or the like as a standard equipment and is relatively expensive. Accordingly, it is economical that the expansion box per se is not equipped with the image processing hardware and makes use of the hardware resource mounted in the image forming apparatus.

The connection part may be connected to the expansion box by means of a high-speed bus interface. The image forming apparatus according to the first aspect of the present invention transfers image data to the expansion box which is mounted to the image forming apparatus through the connection part or prints out image data received from the expansion box in a reverse way at the image outputting part. In case the image outputting part is a printing machine of an electrophotography system, it is necessary to supply image data to a developing process real-time and hence, it is preferable to connect by means of a high-speed bus interface of approximately several GBps.

Further, according to a second aspect of the present invention, the expansion box for image forming apparatus which is used in such a manner that the expansion box is connected to the image forming apparatus which can exchange image data of the output color coordinate system (or output system data format) with the outside and the expansion box includes a connection part for inputting and outputting image data and a storing part for storing image data.

The expansion box for image forming apparatus according to the second aspect of the present invention is a general-purpose computer system called a work station or a personal computer, for example. On the expansion box, image data received from the image forming apparatus may be electronically stored or sorted. Alternatively, the image data is cut out or copied into a given document file or is electronically subjected to an image editing.

By making use of the architecture of the general-purpose computer system, the expansion box can be developed at a relatively low cost and in a short due period. Further, with the use of existing image editing applications executable in the general-purpose computer system, various editing processing can be applied to the image data supplied from the image forming apparatus. That is, added values can be given to the image forming apparatus at a relatively low cost.

The expansion box according to the second aspect of the present invention is provided with a compression part and a decompression part for compressing and decompressing image data. Since the image data to be stored is first compressed and then is stored, the storage capacity can be saved. Compression and decompression method, however, is not limited. For example, either the run-length system or the registration library system may be adopted in a suitably selective manner corresponding to the characteristics of data to be compressed.

Further, the expansion box for image forming apparatus according to the second aspect of the present invention may include a network interface for connection to a network. By setting the expansion box under the network environment, image data edited by other computer system in the network can be printed out at the image forming apparatus. Further, image data obtained at the image input part of the image forming apparatus may be supplied to a remote computer system through the expansion box and the network.

The expansion box is designed by making use of the architecture of the general-purpose computer system. Accordingly, by installing various kinds of adapter cards which have been popularly used in the computer field, the hardware of the expansion box can be easily increased at a relatively low cost so as to expand the function of the expansion box. Eventually, the image forming apparatus on which the expansion box is mounted can obtain added values at a low cost.

Still further, the expansion box for image forming apparatus according to the second aspect of the present invention may include a user interface which indicates processing contents to a user and receives command inputs from the user.

As has been explained in the column of "Background of the Invention", the operation panel which is provided to the image forming apparatus body as the standard equipment can offer merely a relatively narrow screen and hence, the user inputting operation becomes tight and also requires some level of operational skill. To the contrary, the expansion box according to the second and third aspects of the present invention is designed by making use of the architecture of the general-purpose computer system and hence, the expansion box can be provided with a liquid crystal display panel having a relatively large screen (for example, size of 14 inches) and a user interface formed of a mouse (alternatively, a touch panel overlapped to the liquid crystal display panel). That is, the expansion box can offer the user the intuitive dialogue type inputting operation by using the graphical user interface (GUI) as a base. The design of the GUI screen and the command inputting operation on the GUI screen are already fixed in the field of computer and hence, the burden imposed on the user for learning operation skill can be reduced.

Further, not only the GUI screen is designed in the form of a window system screen which is general in the field of computer technology, but also the GUI screen can be designed in the form of an operation panel of a copying machine so as to obtain the integration of operational feeling between the users of copying machines. Here, "in the form of an operation panel of a copying machine" means to provide functional buttons which are operable by inputting coordinate through mouse cursors and touch panels on the screen, wherein the functional buttons include ten keys for performing starting and stopping of copying operation and inputting of numerals such as the number of copying or designation buttons of copying parameters. The design change of such a GUI screen can be substantially realized by only rewriting software program and hence, the design change can be performed at a relatively low cost in a short due period.

Still further, the expansion box for image forming apparatus according to the second aspect of the present invention may include an operation processing part for editing image data. The substantial portion of the operation processing part is, for example, formed of a DTP (Desk Top Publishing) application which is performed on a CPU (Central Processing Unit). This DTP application is capable of performing processing such as sorting or moving, deletion, copying of image data in documents for inputted data (or data stored in the hard disc device or the like). By performing the image editing operation with the use of existing applications on the general-purpose computer system which is used as the expansion box, the image editing operation can be realized at a much lower cost and in a much shorter period than the case of installing the expansion function onto the image forming apparatus body.

The third aspect of the present invention is directed to an image editing system which includes an image forming apparatus body for performing inputting and printing out of an original image and an expansion box connected to such an image forming apparatus body. The image forming apparatus body includes an image inputting part which inputs the original image as image data of an input color coordinate system, an image processing part which converts the image data of the input color coordinate system into image data of an output color coordinate system, an image outputting part which prints out the image data of the output color coordinate system, and a first connection part which transmits and receives the image data of the output color coordinate system (or output system data format) between the first connection part and the expansion box. The expansion box includes a second connection part which transmits and receives the image data between the first connection part and the second connection part, and a storage part which stores the image data therein.

Further, the third aspect of the present invention is directed to an image editing system which includes an image forming apparatus body for performing inputting and printing out of an original image and an expansion box connected to such an image forming apparatus body. The image forming apparatus body includes an image inputting part which inputs the original image as image data of an input color coordinate system, an image processing part which converts the image data of the input color coordinate system into image data of an output color coordinate system, an image outputting part which prints out the image data of the output color coordinate system, and a first connection part which transmits and receives the image data of the output color coordinate system (or output system data format) between the first connection part and the expansion box. The expansion box includes a second connection part which transmits and receives the image data between the first connection part and the second connection part, a storage part which stores the image data therein, a compression part which compresses image data inputted through the second connection part, and an decompression part which decompresses the compressed image data before outputting through the second connection part therein.

In the image editing system according to the third aspect of the present invention, the image editing system includes an image forming apparatus body and an expansion box. The image forming apparatus body includes an image inputting part which inputs the original image as image data of an input color coordinate system, an image processing part which converts the image data of the input color coordinate system into image data of an output color coordinate system, an image outputting part which prints out the image data of the output color coordinate system, and a first connection part which transmits and receives the image data of the output color coordinate system (or output system data format) between the first connection part and the expansion box therein. Further, the expansion box is provided for expanding the image editing function and includes a second connection part which is connected to the first connected part and a storage part which stores image data.

The expansion box can be developed at a low cost and in a short period by making use of the architecture of the general-purpose computer system. Further, the image forming apparatus can enjoy additional functions which make use of the hardware resource of the general-purpose computer by merely preparing a port for an external connection.

Further, the image editing system according to the third aspect of the present invention is provided with a compression part and an decompression part for performing the compression and decompression processing of image data. Accordingly, the image data to be stored is first compressed and then is stored and hence, the storage capacity can be saved. Compression and decompression method, however, is not limited. For example, either the run-length system or the registration library system may be adopted in a suitable selective manner depending on the characteristics of data to be compressed.

Further, in the image editing system according to the third aspect of the present invention, the above-mentioned expansion box may further include a network interface for connection to a network. By setting the expansion box under the network environment, image data edited by other computer system in the network can be printed out at the image forming apparatus. Further, image data obtained at the image input part of the image forming apparatus may be supplied to a remote computer system through the expansion box and the network in a reverse manner.

Further, in the image editing system according to the third aspect of the present invention, the above-mentioned expansion box may further include a user interface which indicates processing contents to a user and receives command inputs from the user. The operation panel which is provided to the image forming apparatus body as the standard equipment can offer merely a relatively narrow screen and hence, the user inputting operation becomes tight and also requires some level of operational skill. To the contrary, the expansion box according to the fourth and fifth aspects of the present invention is designed by making use of the architecture of the general-purpose computer system and hence, the expansion box can be provided with a user interface composed of a liquid crystal display panel having a relatively large screen (for example, size of 14 inches) and a mouse (alternatively, a touch panel overlapped to the liquid crystal display panel). That is, the expansion box can offer the user the intuitive dialogue type inputting operation by using the graphical user interface (GUI) as a base. The design of the GUI screen and the command inputting operation on the GUI screen are already fixed in the field computer and hence, the burden imposed on the user for learning operation skill can be reduced.

Further, not only the GUI screen is designed in the form of a window system screen which is general in the field of computer technology, but also the GUI screen can be designed in the form of an operation panel of a copying machine so as to obtain the integration of operational feeling between the users of copying machines. Here, "in the form of an operation panel of a copying machine" means to provide functional buttons which are operable by inputting coordinate through mouse cursors and touch panels on the screen, wherein the functional buttons include ten keys for performing starting and stopping of copying operation and inputting of numerals such as the number of copying or designation buttons of copying parameters. The design change of such a GUI screen can be substantially realized by only rewriting software program and hence, the design change can be performed at a relatively low cost in a short due period.

Still further, in the image editing system according to the third aspect of the present invention, the above-mentioned expansion box may further include an operation processing part for editing image data. The substantial portion of the operation processing part is, for example, formed of a DTP (Desk Top Publishing) application which is performed on a CPU (Central Processing Unit). This DTP application is capable of performing processing such as sorting or moving, deletion, copying of image data in documents for inputted data (or data stored in the hard disc device or the like). By performing the image editing operation with the use of existing applications on the general-purpose computer system which is used as the expansion box, the image editing operation can be realized at a much lower cost and in a much shorter due period than the case of installing the expansion function onto the image forming apparatus body.

Further, in the image editing system according to the third aspect of the present invention, the first connection part and the second connection part may be connected to the expansion box by means of a high-speed bus interface. In case the image outputting part in the inside of the image forming apparatus is a printing machine of an electrophotography system, it is necessary to supply image data to a developing process real-time and hence, it is preferable to connect by means of the high-speed bus interface of approximately several GBps.

Further, the fourth aspect of the present invention is directed to an image editing system which includes an image forming apparatus body which performs inputting of an original image and printing out and an expansion box connected to the apparatus body. The image forming apparatus body includes a discharging part which discharges a printing paper to the outside of the apparatus and an expansion box mounting portion which is mounted to a position of the image forming apparatus body which does not interfere the above-mentioned discharge portion.

Further, the fifth aspect of the present invention is directed to an image editing system which includes an image forming apparatus body which performs inputting of an original image and printing out and an expansion box connected to the apparatus body. The image editing system includes a support member which supports the expansion box and has a mounting base on which the expansion box is mounted and an attaching part which attaches the mounting base to the image forming apparatus body. The attaching part is connected to the image forming apparatus body at a portion which does not interfere a discharging part from which the image forming apparatus body discharges a printing paper.

In the image editing system according to the fourth aspect of the present invention, the expansion box includes an approximately box-like body and a display part which is disposed on the upper surface of the body, for example.

The expansion box is, for example, designed based on the architecture of the general-purpose computer system and includes an auxiliary memory device of a recording medium replaceable type such as an FDD (Floppy Disc Drive) as a standard equipment. Alternatively, the expansion box may be equipped with an exchangeable media drive unit such as a CD-ROM drive or an MO at a relatively low cost. By forming a recording medium loading part in a front face of an expansion box body, the media exchanging operation can be facilitated.

The sixth aspect of the present invention is directed to an image editing system which includes an image forming apparatus body which performs inputting of an original image and printing out and an expansion box connected to the apparatus body. The expansion box includes a display part, a media box which includes a recording medium loading part for replaceably mounting a exchangeable medium and an expansion box body accommodating other hardware components. The display part is mounted on the media box, and the media box is supported by a support member having a mounting base on which the media box is mounted and an attaching part which attaches the mounting base to the image forming apparatus body. The attaching part is connected to the image forming apparatus body at a portion which does not interfere a discharging part from which the image forming apparatus body discharges a printing paper.

The seventh aspect of the present invention is directed to an image editing system which includes an image forming apparatus body which performs inputting of an original image and printing out and an expansion box connected to the apparatus body. The expansion box includes a display part, a media box which includes a recording medium loading part for replaceably mounting an exchangeable medium and an expansion box body accommodating other hardware components. The expansion box body is installed in the vicinity of the image forming apparatus body.

BRIEF DESCRIPTION OF THE DRAWINGS

Preferred embodiments of the present invention will be described in detail based on the following figures, wherein:

FIG. 19 is a view obtained by extracting and illustrating only a parameter designated area out of a photograph print screen displayed on the display 71;

FIG. 20 is a view obtained by illustrating a "photograph size" pop-up screen called out from the print screen;

FIG. 29 is a view of a table showing a list of photographs for selecting given on-site photographs from designated media;

DESCRIPTION OF THE PREFERRED EMBODIMENT

Embodiments of the present invention have been explained in conjunction with attached drawings.

Figure 1:
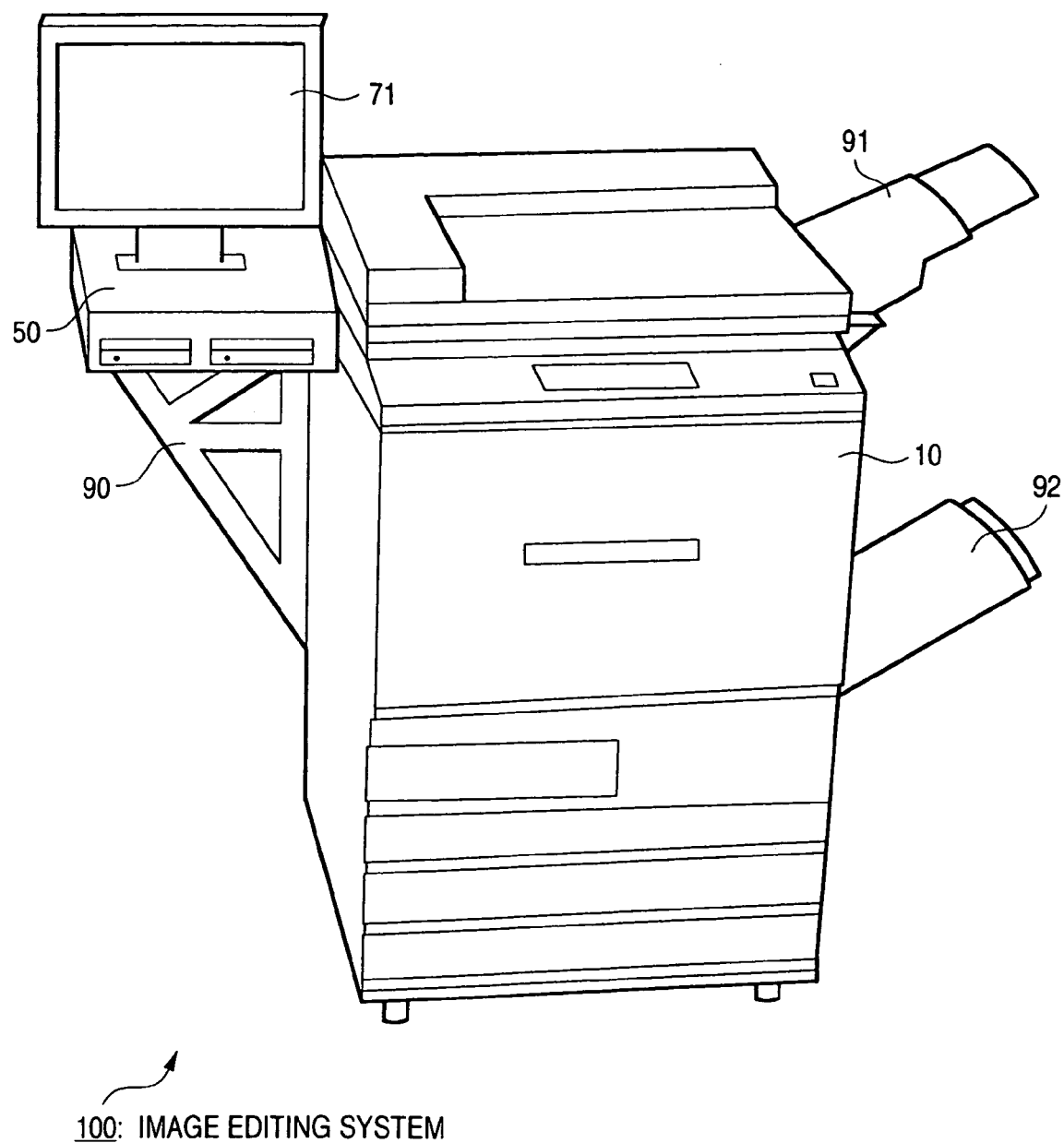
FIG. 1 is a view showing an outer appearance of an image editing system 100 provided for realizing the present invention.

FIG. 1 shows an outer appearance configuration of an image editing system 100 provided for carrying out the present invention. As shown in the drawing, the image editing system 100 includes a copying machine body as an image forming apparatus 10, an expansion box 50 and a support wing 90 for mounting the expansion box 50. The support wing 90 includes an approximately flat table for mounting the expansion box 50.

While being a copying machine which reads and reproduces original images on printing papers, the image forming apparatuses 10 includes a "facsimile" which outputs image data received through a telephone circuit such as a PSTN (Public Switched Telephone Network) or an ISDN (Integrated Services Digital Network), a "printer" which prints computer data or a "composite apparatus" which is provided with not less than two image output functions among them. The image forming apparatus 10 generally includes a platen and/or an automatic document feeder (ADF) on an upper surface portion of an apparatus body for performing image inputting. In case the automatic document feeder is used, originals which have been read are stacked on an original discharge feeder 91. However, in case the image inputting is not necessary as in the case of the printer, the platen, the automatic document feeder and the original discharge feeder 91 are removed from the apparatus 10 so as to make the entire upper surface of the apparatus flat (explained later and see FIG. 33).

Further, the basic function of the image forming apparatus 10 is, for example, to transfer and fix image data on a printing paper by an electrophotography system thus outputting the image. To this end, on at least one side wall face of the image forming apparatus 10, a paper discharge opening for discharging the printing paper is disposed. In an example shown in FIG. 1, in the vicinity of the paper discharge opening on the left side wall surface of the apparatus body, a paper discharge tray 92 is provided for allowing printing papers to be stacked thereon. Further, a bin-tray (not shown in drawings) may be mounted on the apparatus body.

On the other hand, the expansion box 50 is designed based on the architecture of the general-purpose computer system. As shown in the drawing, the expansion box 50 consists of an approximately box-like body and a display part 71. The display part 71, as will be explained later, includes a liquid crystal display (LCD) of a size of ten several inches and is integrally formed with a touch panel.

In the example shown in FIG. 1, the support wing 90 which mounts the expansion box 50 thereon is attached to the left side face of the apparatus in such a manner that the support wing 90 does not interfere the paper discharge opening and the paper discharge tray of the image forming apparatus 10. However, it is needless to say that the support wing 90 must be attached to the right side face of the apparatus with respect to a type of the apparatus which arranges the paper discharge opening and the paper discharge tray must be attached to the left side of the apparatus.

Further, in case the hardware components which are to be accommodated in the expansion box 50 are excessively large in number or the volume of the box 50 body is large and hence, it is difficult to mount the expansion box 50 on the support wing 90, there is no necessity of mounting the whole expansion box 50 on the support wing 90 specially. As an alternative, it is possible to design a media drive which accepts an exchangeable type media such as CD, MO, FD, a PC card or the like and a media exchanging opening such that they are separated from the expansion box 50. That is, on the support wing 90 shown in FIG. 1, only the media box which constitutes a portion of the expansion box 50 is mounted. In this case, a body of the expansion box 50 may be constituted as a tower type computer and may be installed in the vicinity of a side face or a back face of the image forming apparatus 10 (not shown in the drawing).

Figure 33:
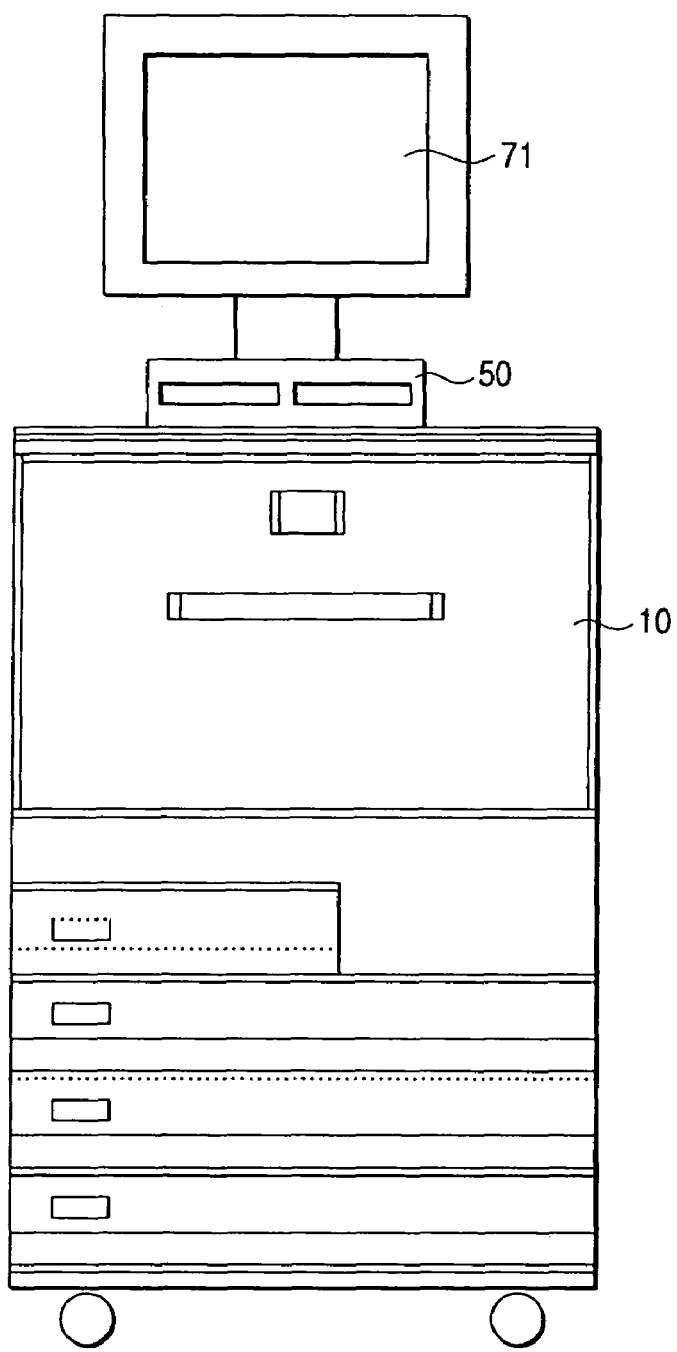
FIG. 33 is a view showing another configuration where an expansion box 50 is installed in an image forming apparatus 10.

FIG. 33 illustrates another embodiment where the expansion box 50 is mounted on the image forming apparatus 10. Further, in case the image forming apparatus 10 is of a type which exclusively use the image outputting function as in the case of a printer, there is no necessity of providing a platen or an automatic document feeder and hence, an upper surface of the apparatus body can be made flat uniformly. Accordingly, as shown in the drawing, the expansion box 50 body can be mounted on the upper surface of the image forming apparatus 10. In this case, the mounting floor area can be made narrower compared to that of the example shown in FIG. 1. Further, by designing and manufacturing the expansion box 50 in a further compact form, the expansion box 50 may be incorporated in the body of the image forming apparatus 10 (not shown in the drawing).

As explained above, the expansion box 50 is designed based on the architecture of the general-purpose computer system and hence, the expansion box 50 is provided with an FDD (Floppy Disc Drive) as a standard equipment and can be provided with other media drive which is capable of performing a media exchange such as a CD-ROM drive or a MO drive at an relatively low cost. Alternatively, the expansion box 50 may be provided with a PC card slot for inserting a media card. As shown in FIG. 1, by forming an exchange opening which allows an access of these various media in a front face of the body of the expansion box 50, the media exchanging manipulation is facilitated thus enhancing the usability of the expansion box 50.

Further, the expansion box 50 may use the touch panel (previously mentioned) with which the display portion is integrally formed as an inputting device and may allow an addition of other coordinate inputting device such as a mouse (not shown in the drawing). For example, the upper surface of the expansion box 50 is effectively used as a mouse manipulating face thus enhancing the space efficiency. In this case, by providing a rib at a rear position of the upper surface, the fall of the mouse is favorably prevented.

Further, a key board (not shown in the drawing) may be added to the expansion box 50 as other user inputting device. By setting the table area of the support wing 90 larger than the bottom surface of the expansion box 50, the key board may be mounted on the table.

The expansion box 50 can realize the expansion of functions of the image forming apparatus 10 easily and at a low cost by making use of the arithmetic ability and peripheral equipment of the general-purpose computer system (for example, a user interface, an auxiliary memory device and the like), the network environment and the like (the detail of the expanded functions are explained later). By assuring the consistency of the expansion box 50 with the body of the image forming apparatus 10 in terms of design (color tone of the casing or shape of edges or the like), the familiarity of the user is enhanced.

Figure 2:
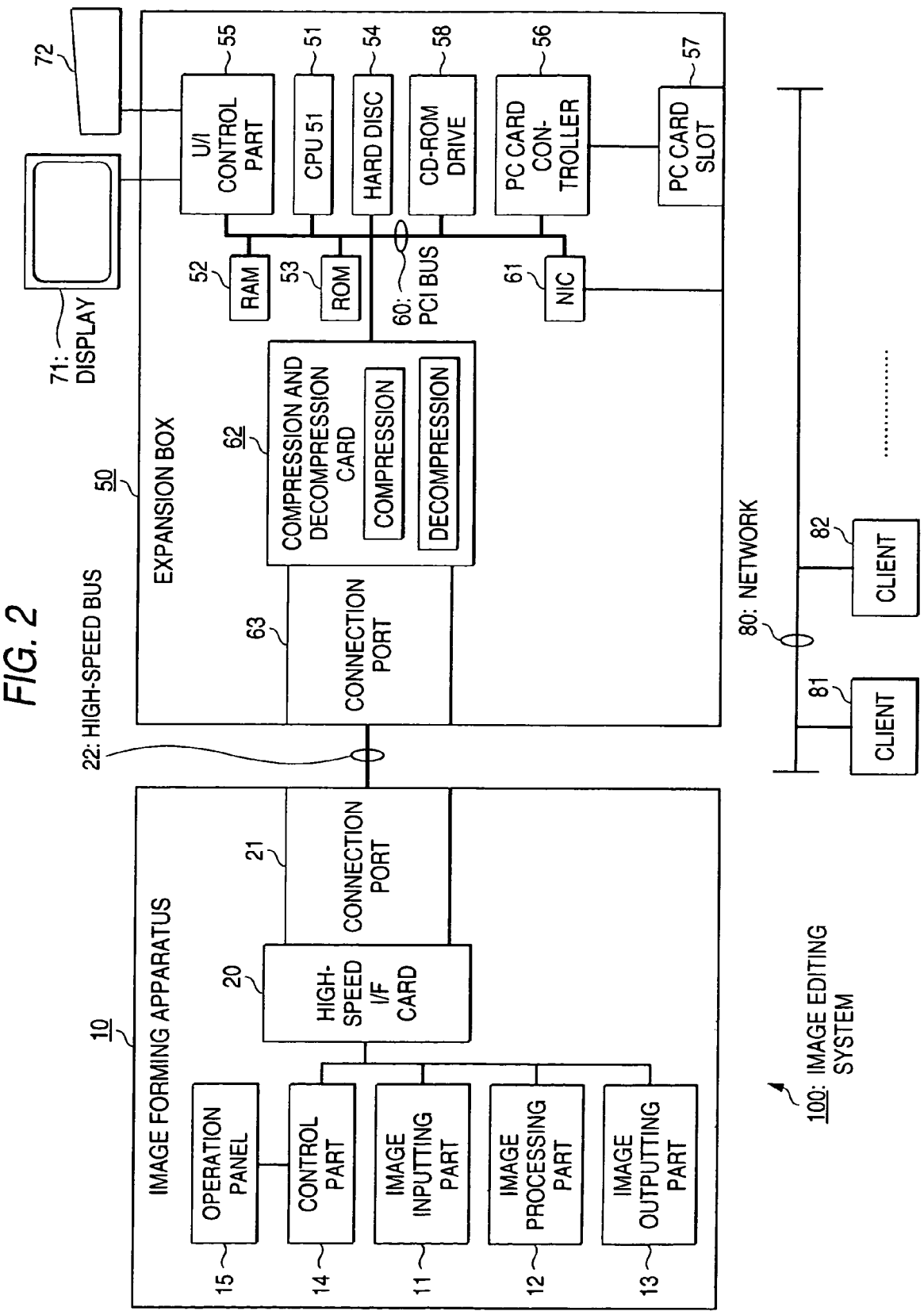
FIG. 2 is a view schematically showing the hardware configuration of the image editing system 100.

FIG. 2 schematically shows the hardware configuration of the image editing system 100. As shown in the drawing, the image editing system 100 of the present embodiment includes an image forming apparatus 10 which performs inputting processing and print outputting processing of image data and an expansion box 50 which is replaceably externally connected to the apparatus 10. Respective parts are explained hereinafter.

The image forming apparatus 10 corresponds to, besides a copying machine which reads original image and reproduces such image on printing papers, a facsimile which outputs image data received through a telephone circuit, a printer for printing computer data or a composite machine having at least two functions out of these. The fundamental function of the image forming apparatus 10 of this embodiment lies not only in optically scanning the original in accordance with designated parameters but also in outputting scanned image onto papers. The image forming apparatus 10 includes an image inputting part 11, an image processing part 12, an image outputting part 13 and a connection port 14.

The image inputting part 11 is a device which optically scans the surface of the original placed on a platen (not shown in the drawing) and reads image data. The image inputting part 11 may include an automatic document feeder (not shown in the drawing) in addition to the platen.

The image processing part 12 is a device which performs given image processing to image data inputted from the image inputting part 11. The image processing performed here includes processing for converting image data in the inputted state to a data format which the image outputting part 13 described later can print out the image. For example, the image outputting part 13 reproduces a color image by using a combination of four toners of four colors, that is, yellow (Y) magenta (M), cyan (C) and black (K). Accordingly, the image processing part 12 performs the color coordinate conversion from an input color coordinate made of three primary colors RGB to an output color coordinate made of four colors YMCK.

The image processing part 12 also performs processing such as hue/saturation/density adjustment, digital filtering, base-color adjustment, T/I separation, gray scale adjustment, generation of an image outputting part control signal and the like.

There are two reasons for performing the above-mentioned image processing in the image processing part 10 without leaving them to the expansion box 50 side. One reason is that the dependency of the content of these processing to the kinds of apparatus is high. That is, processing parameters must be tuned up relative to the image outputting part 13 which constitutes a hardware body so that in case the image processing part is mounted on the expansion box 50 side which is replaceable (that is, mountable to other image forming apparatus), it is difficult to optimize. The other reason is based on the processing speed of image data. That is, because of the presence of demand that image data must be supplied real-time to the image outputting part 13 which adopts the electrophotography system, the software is not suitable and there is no alternative but to mount an exclusive image processing hardware. The image forming apparatus such as a copying machine is generally provided with such an image processing hardware as a standard equipment. To the contrary, it is not economical to mount an expensive image processing hardware to the expansion box 50 (described later) which is designed based on the general-purpose computer system.

The image outputting part 13 is a device which performs page printing of the original image on printing papers based on the image data obtained by performing a given image processing such as color coordinate conversion and the like at the image processing part 12 (that is, on the image data having an output system data format). The image outputting part 13 adopts an electrophotography process system, for example. The electrophotography process is realized by repeating charging of an elecrophotographic photosensitive body (not show in the drawing), developing and cleaning. That is, after uniformly charging the surface of the photosensitive body by means of a charger (not shown in the drawing), the surface of the photosensitive body is exposed in response to the image data so as to form an electrostatic image, then the electrostatic image is turned into a toner image by a developer (not shown in the drawing), and then the toner image is transferred to a printing paper. Thereafter, the toner image is fixed to the paper by heating, fusing and pressing and then the paper is discharged to the outside of the image forming apparatus 10. After transferring, a cleaner removes residual toner from the surface of the photosensitive body and hence, the surface of the photosensitive body is served for a next developing process. In a color printing system which uses multi-color toners, plural developing process units are prepared for respective toner colors made of yellow (Y), magenta (M), cyan (C) and black (K).

A high-speed bus interface 20 is a communication interface which enables a high-speed data transfer for performing inputting and outputting of image data between the image forming apparatus 10 and the expansion box 50. The main reason that the image data is outputted to the outside of the image forming apparatus 10 through the high-speed bus interface 20 lies in the realization of the an "electronic sorting" (described later) which once stores the image data in a memory device of a large capacity such as a hard disc drive (described later) or rearranges the original and then sends the original back to the image forming apparatus 10 (described later).

In this embodiment, as shown in the drawing, the image data having the output system data format called YMCK system is transferred onto a high-speed bus 22 through the high-speed bus interface 20 and a connection port 21. The reason why the converted image data is not outputted to the input system data format but is outputted to the output system data format is based on the demand that the image data after the electronic sorting is to be supplied to the image outputting part 13 real-time. That is, in case the electronic sorting is performed with the image data having the RGB input color coordinate system, the image processing is performed after the image data is sent back to the image forming apparatus 10 and hence, it cannot be in time for the electrophotography processing.

Further, because of the demand that the image data is to be supplied to the image outputting part 13 real-time, in this embodiment, the high-speed bus interface 20 uses an interface having a data transfer speed of approximately several GBps.

The image forming apparatus 10, in addition to the above-mentioned parts, includes an operation panel 15 for allowing the user to perform command inputting and a user interface control part 14 for performing the screen display and input command processing on the operation panel 15. The above-mentioned image inputting part 10, the image processing part 12 and the image outputting part 13 may be operated in response to the user directions through the operation panel 15. In other words, the image forming apparatus 10 may be operable in the stand-alone environment (that is, without the expansion box 50) in response to the direct manipulation from the operation panel 15.

On the other hand, the expansion box 50 is designed based on the architecture of the general-purpose computer system. That is, the expansion box 50 is constituted such that a printed wiring board which is called a "mother board" (not shown in the drawing) and on which main circuit components are mounted is provided with connectors (not shown in the drawing) to which peripheral devices are connected by means of cables and various adapter cards are inserted in at least one bus slot (not shown in the drawing) formed in the board.

A CPU (Central Processing Unit) 51 is a main controller which integrally controls the inside operations of a system called the expansion box 50 and executes various kinds of application programs under an operation environment which an operating system (OS) provides. Further, the application may be, for example, a DTP (Desk Top Publishing) or other software program which provides image editing function.

The CPU 51 and other peripheral devices in the expansion box 50 are interconnected with each other through a bus having a standard specification adopted by the field of computer such as a PCI (Peripheral Component Interconnect) bus 60 or a ISA (Industry Standard Architecture) bus (not shown in the drawing).

RAM (Random Access Memory) 52 is, for example, a rewritable memory constituted by plural DRAM (Dynamic RAM) chips and is used for loading the executing program of the CPU 51 or for temporarily storing the operation data. More than two memory card slots are usually formed on the mother board and hence, the extension of the memory to the general-purpose computer system which constitutes the expansion box 50 can be carried out easily at a relatively low cost.

ROM (Read Only Memory) 53 is a memory used exclusively for reading in which the program code and other information are written in a non-volatile manner. The ROM stores, for example, a self diagnosis program (POST) which is performed at the time of starting or a group of codes (BIOS) for inputting and outputting operations.

A hard disc device 54 is an external memory device of magnetic disc type which has a relatively large capacity and stores the software program executed by the CPU 51 and various data such as documents and images in format file styles which are suitable for them respectively. For example, the YMCK system image data received from the image forming apparatus 10 through the high-speed bus interface 20 and the image data sent through the network (explained later) are stored in the hard disc device 54 as the document files. The hard disc device 54 is connected with a PCI bus 60 in accordance with, for example, an interface standard such as an IDE (Integrated Drive Electronics) or an SCSI (Small Computer System Interface). The extension or addition of the hard disc device to the general-purpose computer which constitutes the expansion box 10 turns out to be relatively inexpensive compared to the extension of the hard disc device to the image forming apparatus 10.

A user interface control part 55 is a device for providing a dialogue type inputting and outputting environment to users. To be more specific, the user interface control part 55 outputs the result of computer processing on a screen of a liquid crystal display (LCD) 71 or processes command inputs fed through the a keyboard/mouse 72.

Onto the screen of the liquid crystal display 71, a GUI (Graphical User Interface) environment which allows the intuitive command inputting by a mouse manipulation is provided. There has been already the standardized GUI manipulation mode in the field of computer so that the users effort to newly learn the manipulation of the image forming apparatus 10 can be reduced. For example, all functions of the image forming apparatus 10 can be instructed by a unified or integral manipulation, that is, "perform setting of conditions and execute processing upon pushing of a start button" on the screen of the GUI provided by the general-purpose computer.

Further, the GUI screen is designed not only in the form of a window system screen which is general in the field of computer technology, but also in the form of an operation panel of a copying machine so as to obtain the integration of operational feeling between the users of copying machines. The design change of such a GUI screen can be substantially realized by only rewriting software program and hence, the design change can be performed at a relatively low cost in a short due period.

Further, the liquid crystal display panel 71 has a larger screen (for example, a diagonal size of ten several inches) compared to the operation panel 15 which is provided to the body of the image forming apparatus 10 as a standard equipment. Further, the inputting device 72 may be provided in the form of a touch panel adhered to the surface of the display device 71 in place of the mouse or the keyboard.

A PC card controller 56 is a device for realizing the data transmission and reception protocol between a PC card inserted into a PC card slot 57 and the image forming apparatus 10. The PC card (not shown in the drawing) follows, for example, a standard "PC Card Standard" jointly determined by PCMCIA (Personal Computer Memory Card International Association) and JEIDA (Japan Electronic Industry Development Association). For example, image data is supplied to the image forming apparatus 10 in a form that a media card which stores the image data is inserted in the PC card slot 57. That is, the manipulation to place originals on the platen is replaced by the loading of the media card.

A CD-ROM drive 58 is a device which reads data from the surface of a CD disc which constitutes media. For example, image data is supplied to the image forming apparatus 10 in the form of loading the CD which carries the image data to the CD-ROM drive 58. That is, the manipulation to place originals on the platen is replaced by the loading of the media drive.

The interface standard for connecting the CD-ROM drive 58 to the mother board is, for example, ATAPI (AT Attachment Packet Interface: ATAPI being a standard for connecting devices other than the hard disc device to the IDE hard disc interface), SCSI or the like. Further, the expansion box 50 may be provided with media drives 58 such as an FDD (Floppy Disc Drive), an MO (Magneto-Optical) drive, a DVD (Digital Versatile Disc) drive or the like (not shown in the drawing) other than the CD-ROM drive.

An NIC (Network Interface Card) 61 is an interface for connecting the expansion box 60 to the network 80 and is installed in the mother board in the form of an "adapter card", for example.

On a network 80, plural computer systems 81, 82 . . . are present besides the expansion box 50 and they are transparently connected with each other in accordance with a given communication protocol (for example, TCP/IP (Transmission Control Protocol/Internet Protocol)).

The expansion box 50 is capable of functioning as a print server on the network 80 and can process printing jobs received from other computer systems 81, 82 . . . (that is, clients) and prints out images by using the image forming apparatus 10. Further, the expansion box 50 takes out document files from hard disc devices (remote discs not shown in the drawing) which clients 81 . . . have and prints out them by using the image forming apparatus 10. Further, the expansion box 50 can transfer the document files stored in the hard disc device 54 to the remote discs through the network 80.

A compression and decompression card 62 is a device for performing compressing and decompressing processing of image data and is mounted in the inside of the expansion box 50 in the form of an adapter card. The compression and decompression method is not limited specifically. For example, either the run-length system or the registration library system may be adopted in a suitable selective manner corresponding to the characteristics of data to be compressed. The compression and decompression card 62 of this embodiment is provided with a connection port 63 for transmitting and receiving image data between the image forming apparatus 10 and the expansion box 50 through the high-speed bus 22.

A drive source of the expansion box 50 may be shared by the image forming apparatus 10. Alternatively, interlocked with the manipulation of a power source switch of the image forming apparatus 10 side, boot and shutdown processing may be performed at the expansion box 50 side.

Besides those shown in FIG. 2, many other electric circuits are necessary for constituting the image editing system 100 (more specifically, the image forming apparatus 10 and the expansion box 50). Those electric circuits, however, are well known to those who are skilled in the art and they do not constitute the gist of the present invention and hence, they are omitted in this specification. Further, it must be noted that, to obviate any confusion of the drawing, the connection between respective hardware blocks is only partially shown in the drawing.

As mentioned above, in the image editing system 100, two user interfaces which are composed of the display 71 on the expansion box 50 having the relatively large screen and the operation panel 15 provided to the image forming apparatus 10 natively coexist.

When the expansion box 50 is under operation, the display 71 takes priority and hence, by making use of the large screen, an area which displays the scanned image at high definition can be assured. Further, respective input buttons can be designed in a relatively large shape so that the user can easily see the input buttons thus enhancing the operability of command inputting operation. Further, in the expansion box 50, by adding other devices such as the mouse, the keyboard or the like, the users inputting function can be enhanced.

By making the screen display of the display 71 common with the design of the operation panel 15 of the image forming apparatus 10 side, a user can smoothly manipulate both of the expansion box 50 and the image forming apparatus 10 without having discomfort. Examples for making design common are as follows.

(1) Buttons which imitate hardware keys on the operation panel of the image forming apparatus 10 side (a start key, a stop key, a reset key, a ten key and the like) are also provided to the manipulating surface on the display 71 (see FIG. 7 (explained later), for example)). The user can perform manipulations such as starting and stopping of the printing job in the same manner as in the case of the image forming apparatus 10.

(2) The display 71 also follows the arrangement of tabs and buttons on the manipulation panel of the image forming apparatus 10. The tab manipulation screen is illustrated in, for example, FIG. 7, FIG. 19 and FIG. 24 (explained later). With respect to settings classified with tabs, it is preferable to mount tabs in such a manner that the setting order is not restricted and the tabs to be set can be selected in an arbitrary order.

Further, there also arises a problem called a competition between two user interfaces. As explained above, the display 71 on the expansion box 50 has a larger screen and has a superior operability than the native operation panel 15 of the image forming apparatus 10 and hence, the priority is given to the latter so as to prohibit the simultaneous manipulation. That is, during the period that the display 71 is active, the manipulation on the operation panel 15 is disabled and such a condition is displayed (or alternatively, the screen may be darkened to indicate the disabled condition of manipulation. In a reverse manner, during the use of operation panel 15, the expansion box 50 side may be disabled and such a condition may be displayed on the display 71.

Further, in case the direct manipulation through the operation panel 15 becomes necessary urgently during the manipulation of the expansion box 50, an interrupt button (not shown in the drawing) may be pressed so as to interrupt the job of the expansion box 50. During the period that the job is interrupted, such a condition is displayed on the display 71. Further, upon completion of the interrupt processing, the job of the expansion box 50 is resumed.

Further, in case any failure occurs in the image editing system 100, it is desirable that an error message is offered to the user through these user interfaces. Followings are considered as message display modes.

(3) All information are offered on the display 71 of the expansion box 50 and no display is made on the operation panel 15 of the image forming apparatus 10 body (alternatively, a message that the display 71 is to be referred is displayed)

(4) In a reverse manner, information is offered only to the operation panel 15 of the image forming apparatus 10 body and no display is made on the display 71 (alternatively, a message that the operation panel 15 is to be referred is displayed).

(5) Information to be displayed are made different between the display 71 and the operation panel 15. For example, when a jam occurs, the summary of the error and method for resolving the error are displayed on the display 71 and further detailed information such as a place where the jam has occurred is displayed on the operation panel 15.

Further, in case the expansion box 50 deals with plural kinds of image forming apparatuses 10, the expansion box 50 may receive information on the kinds of apparatuses from the image forming apparatus 10 side through the high-speed bus interface 20. At the expansion box 50 side, in accordance with the received information on kinds of apparatuses, default values such as printing parameters are updated.

Figure 34:
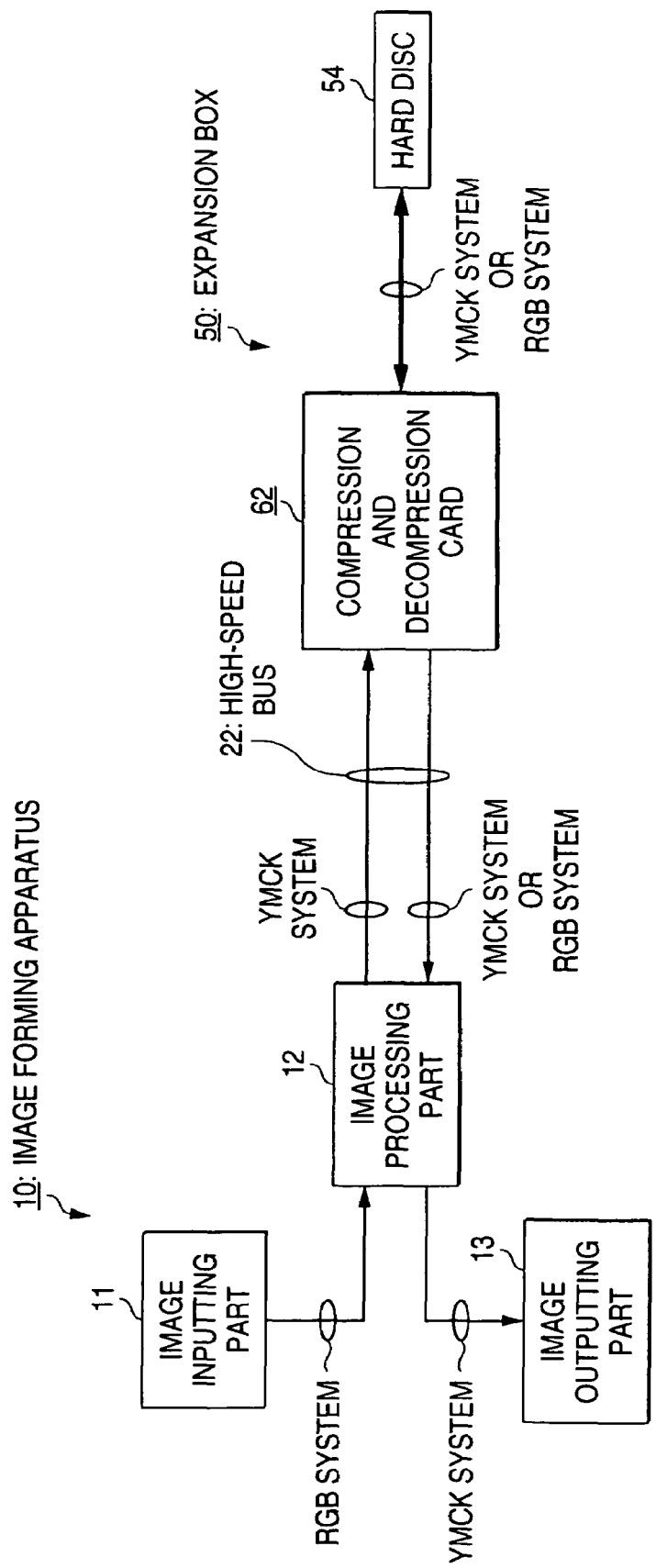
FIG. 34 is a view schematically showing data flow between the image forming apparatus 10 and the expansion box 50.

Subsequently, the flow of image data performed between the image forming apparatus 10 and the expansion box 50 is explained in conjunction with FIG. 34.

Image data which is generated by optically reading the original image with the image inputting part 11 has an input system data format based on three colors made of RGB. That is, the input image data of one page of original consists of three sheets of face information made of R, G, B. To the contrary, in the image outputting part 13, color image is generated by reproducing a combination of toners of four colors made of yellow (Y), magenta (M), cyan (C) and black (K), that is, face information of four colors by developing processes for respective colors. Accordingly, the image processing part 12 converts the image data of RGB input color coordinate to the image data of the output color coordinate of face information of four colors made of YMCK, that is, the image data of the output system data format. Further, the image processing part 12 also performs image processing dependent to hardware characteristics of the image outputting part 13 such as the hue/saturation/density adjustment, the base-color removal, the gray scale correction and like in addition to the color coordinate conversion processing.

The image processing part 12 supplies the image data of the output system data format related with one page of original to the image outputting part 13 in accordance with the face order of the developing process and outputs such image data to the outside of the image forming apparatus 10 through the high-speed bus interface 20.

The YMCK system image data which is outputted to the outside of the image forming apparatus 10 is transferred to the expansion box 50 through the high-speed bus 22.

At the expansion box 50 side, the YMCK system image data is received through the connection port 63 and the image data is once subjected to the compression processing on the compression and decompression card 62. The compression and decompression method which the compression and decompression card 62 of this embodiment adopts is not limited specifically. For example, either the run-length system or the registration library system may be adopted in a suitably selected manner corresponding to the characteristics of data to be compressed.

In the compression part of the compression and decompression card 62, the outputted system image data of one page of original is compressed every face information of respective colors YMCK and is stored in the hard disc device 54 while maintaining the face order as it is. Alternatively, the image data may be transferred to other computer systems 81 . . . on the network 80 through the NIC 61 and may be stored in the remote disc.

The memory space of the hard disc device 54 is administrated by the filing system of the operating system (described previously) and it is possible to perform a random access to the stored image data, that is, to respective document files. That is, it becomes possible to read out the files in the order different from the storing order thus realizing the "electronic sorting" of the image data (described later).

The image data taken out from the hard disc device 54 is compressed and hence, the image data is subjected to decompression processing at the compression and decompression card 62 to be restored to the original YMCK system image data and then is transferred to the image forming apparatus 10 through the high-speed bus 22. The reason why the high-speed bus interface 20 is utilized for transferring the image data is to supply the image data to the image outputting part 13 real-time with the elecrophotographic processing. It is preferable that the YMCK system output image sent to the data forming apparatus 10 maintains the same face order as the elecrophotographic process.

While taking out the image data from the hard disc device 54, the expansion box 50 obtains image data from other computer systems 81 . . . connected through the network 80, the media disc loaded to the CD-ROM drive 58, the media card inserted into the PC card slot 57 and the like and supplies them to the image forming apparatus 10.

However, it is often the case that the image data read out from the media disc or the media card is not of the YMCK system but is of the RGB system. This is because that the media disc or the like generally carries data which assumes processing thereof on the computer and the RGB system image data is a system which is more suitable for the processing on the computer than the YMCK system image data.

The image data which the image forming apparatus 10 outputs to the outside is only of the YMCK system, while the input image data which the image forming apparatus 10 accepts from the outside is not limited to the YMCK system and may also be of the RGB system.

Figure 3:
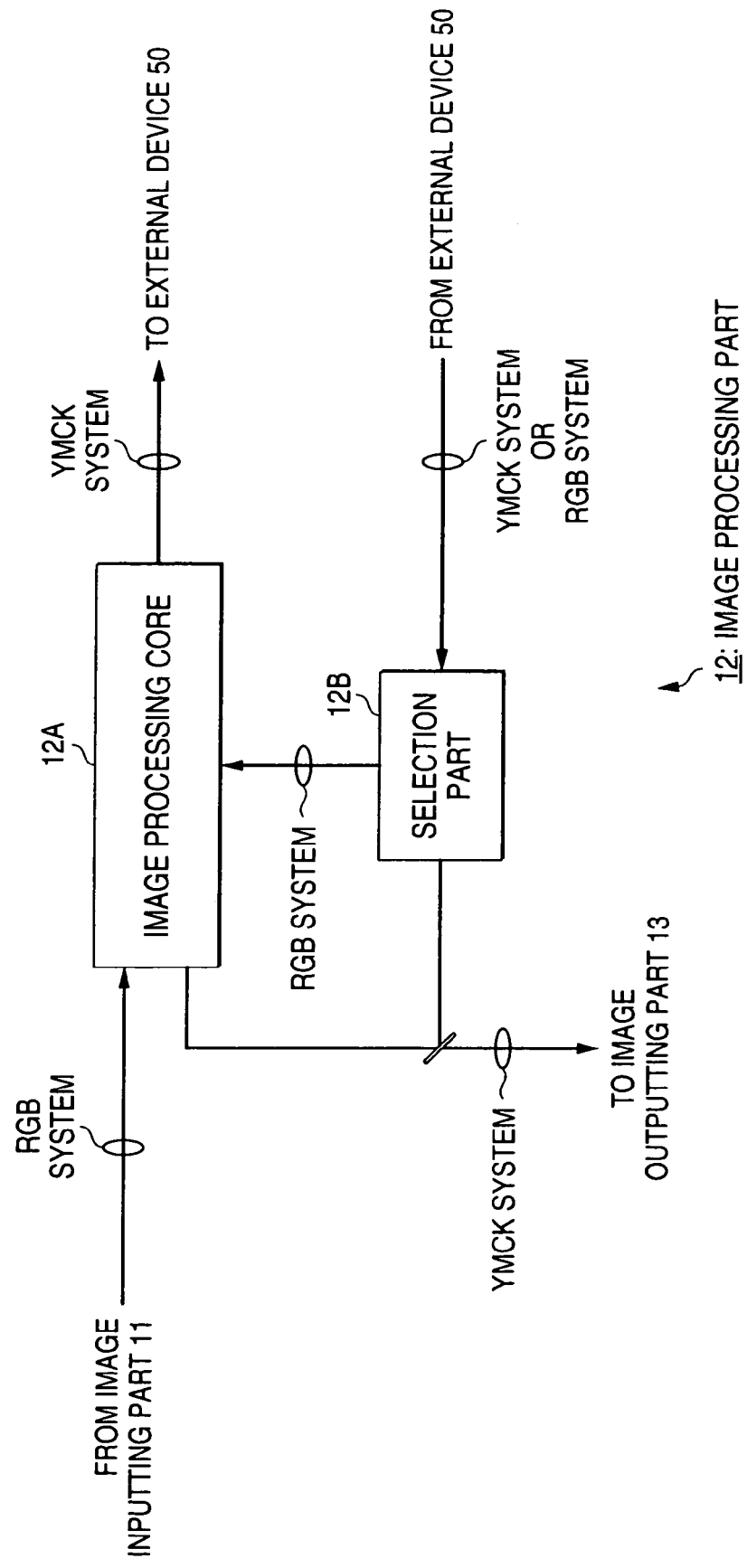
FIG. 3 is a view schematically showing the inner configuration of an image processing part 12.

FIG. 3 schematically shows the inner configuration of the image processing part 12. The RGB system image data inputted from the image inputting part 11 is always outputted outside after being color-converted to the YMCK system (that is, the output system data format) at an image processing core 12A. To the contrary, the image data inputted from the outside is once inputted to a selection part 12B. If the received data is of the YMCK system, that is, the output system data format, the selection part 12B directly transfers the received image data to the image outputting part 13 while if the received image data remains to be of the RGB system, that is, the input system data format, the selection part 12B inputs the received data to the image processing core 12A and then transfers the image data to the image outputting part 13 after performing the color conversion from the RGB system to the YMCK system.

Two copying manipulations are offered on the image editing system 100 of this embodiment. One is the copying instruction through the operation panel 15 mounted on the image forming apparatus 10 and the other is the copying instruction performed with the use of the large screen display 71 of the expansion box 50 side.

Figure 4:
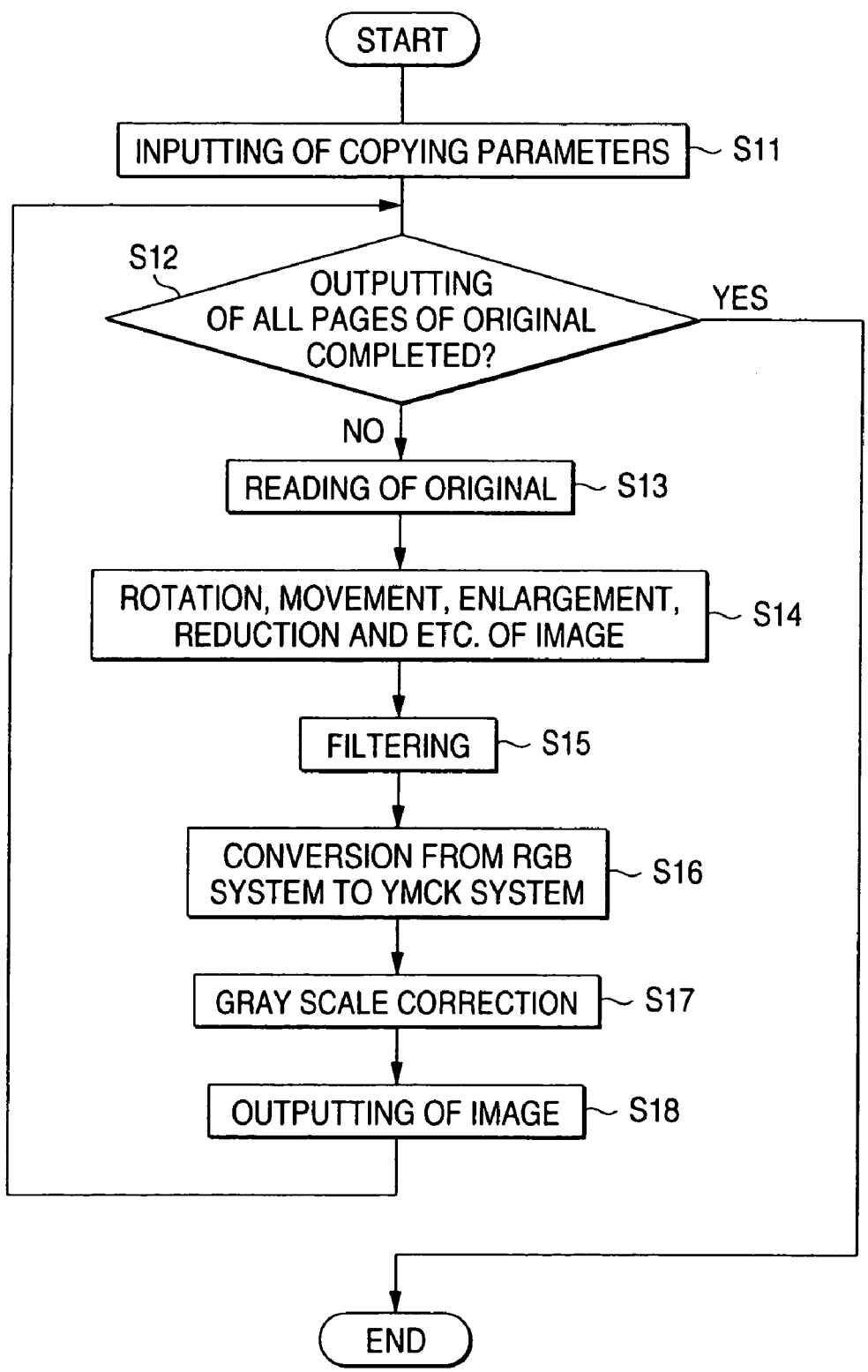
FIG. 4 is a flow chart showing processing procedures of a copying operation in the image editing system 100.

FIG. 4 shows the processing procedure in accordance with the former copying instruction method in the form of a flow chart. Respective steps of this flow chart are explained hereinafter.

First of all, copying parameters are designated on the operation panel 15 of the image forming apparatus 10 (step S11). Here, the copying parameter include paper selection, magnification selection, density, kinds of originals, color mode, color balance adjustment, hue adjustment, saturation adjustment, sharpness adjustment, the number of papers to be copied, operation mode and the like. In case copying parameters are not designated, the default values are used.

Subsequently, the first page of the original is placed on the platen (or automatic document feeder not shown in the drawing) and then a closed-loop system processing constituted by a judgement block S12 is repeatedly executed until outputting of images are completed with respect to all pages of original.

The image inputting part 11 optically scans the surface of the original placed on the platen so as to read image data (step S13) and transfers the inputted image data to the image processing part 12 where the image processing is executed. Here, the image processing includes respective processing for converting to the output system data format including processing (step S14) such as rotation, movement, enlargement, reduction of image in accordance with copying parameters inputted in the step S11, filtering (step S15), color coordinate conversion from the RGB system to the YMCK system (step S16) and gray scale adjustment (step S17).

After the image processing, in the step S18, the image data of the output system data format is supplied to the image outputting part 13 and the inputted image is reproduced on the printing paper. When the printing paper is discharged to the outside of the image forming apparatus 10, the processing again returns to the step S12 and it is judged whether all original pages are processed (that is, page printing) or not.

Figure 5:
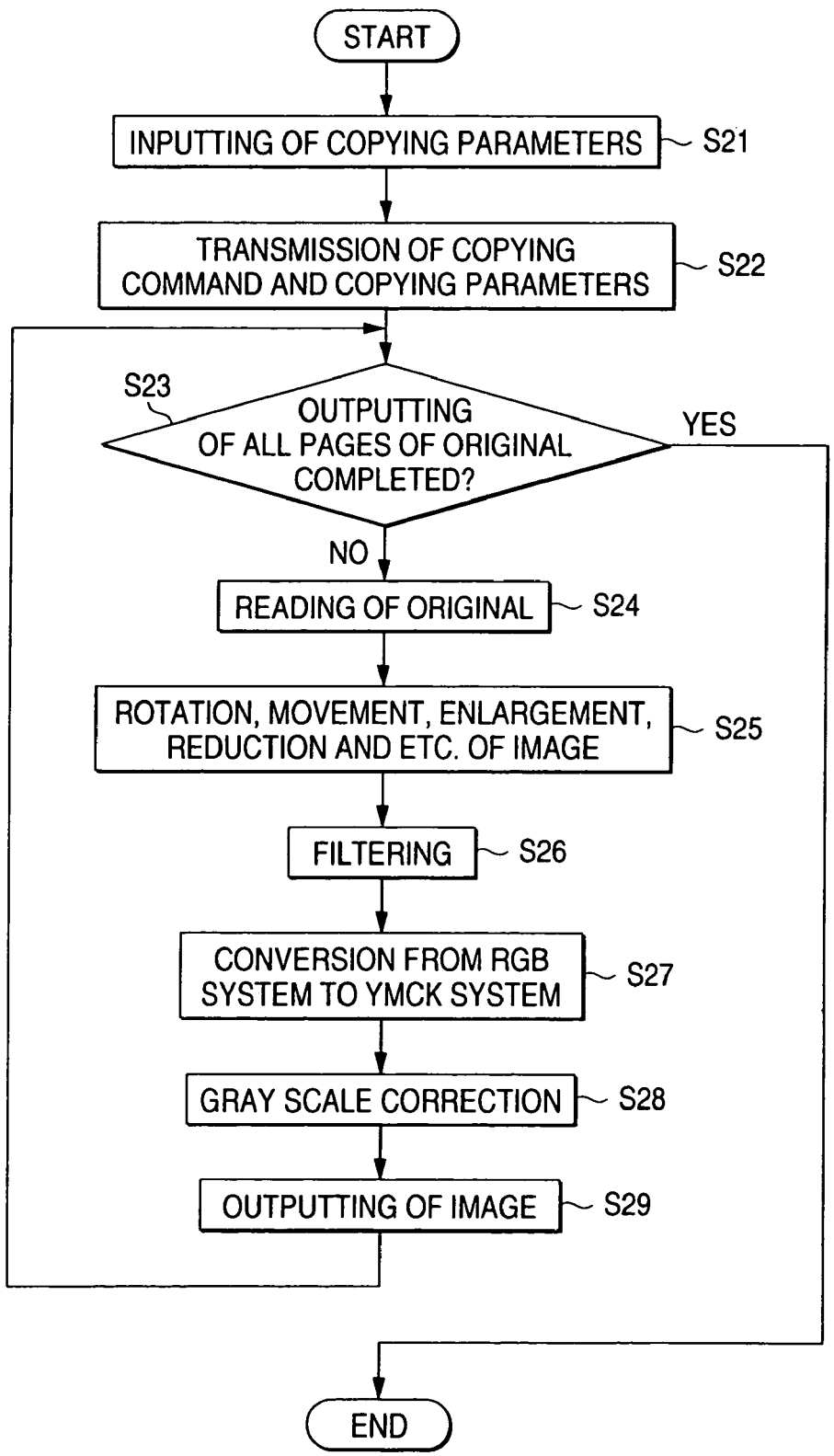
FIG. 5 is a flow chart showing processing procedures of a copying operation in the image editing system 100.

Further, FIG. 5 shows the processing procedure in accordance with the latter copying instruction method in the form of a flow chart. The latter copying instruction method is a method which performs instruction of copying manipulation with the use of the large screen display 71 of the expansion box 50 side. Respective steps of this flow chart are explained hereinafter.

First of all, copying parameters are inputted (step S21). In this case, the inputting operation is different from that of the above-mentioned example, and is performed on the GUI screen prepared on the large screen display 71 of the expansion box 50 side. However, in case the copying parameters are not set, default values are used.

Figure 6:
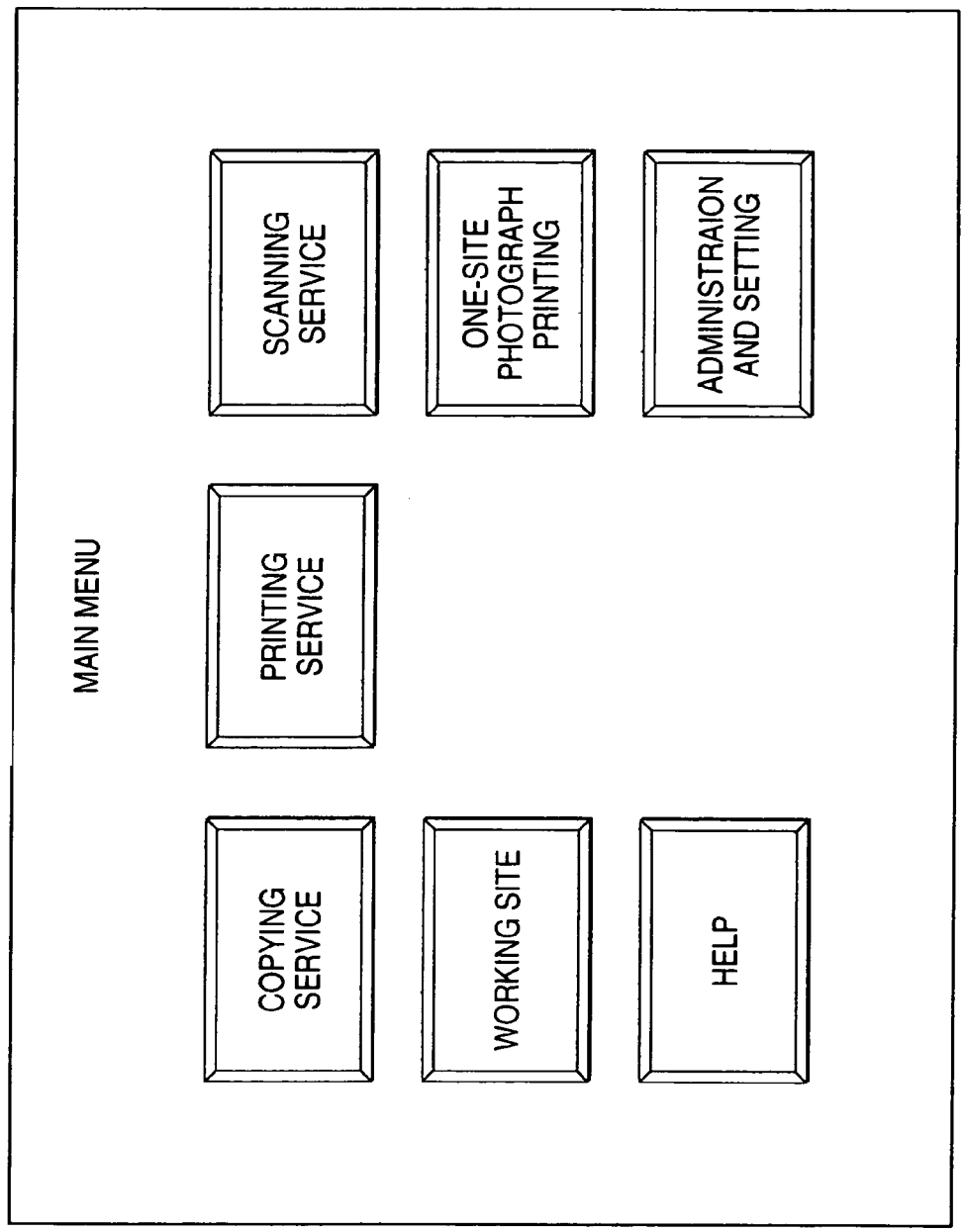
FIG. 6 is a view showing a main menu display screen provided to a display 71.

FIG. 6 illustrates a main menu display screen prepared on the display 71. As shown in the drawing, on the main menu screen, menu buttons for calling various functions such as "copying service", "printing service", "scanning service" and the like are prepared. The display of the display 71 supports the GUI environment and when the user clicks given menu with a mouse cursor or touches the touch panel with his finger, the selection of functions is performed. Here, "the copying service" button which corresponds to the copying manipulation is selected.

In response to this button selection, the screen display on the display 71 is changed over to a copying start screen. FIG. 7 illustrates the copying start screen. As shown in the drawing, the copying start screen includes a "CI (Corporate Identity) display area" which displays information on a product and a manufacturer, a "function selection area" which prepares functions which the image editing system 100 supports in the form of buttons, a "help information display area" which displays hints on manipulation and error messages, a "preview area" which displays thumbnail or the like of original image which are to be outputted as image, a "manipulating button area" where buttons for performing the control of copying operation such as starting, stopping and the like are disposed, a "ten key area" for inputting numerical values, and a "parameter designation area" for designating copying parameters. By expressing respective buttons in the manipulation button area and the ten key area with icons which imitate the designs of the hard keys of the image forming apparatus 10, the users operational feeling is integrated.

In the parameter designation area, buttons for designating parameters which are necessary for executing functions designated in the function selection area are prepared. In the example shown in FIG. 7, "electronic sorting copying" is selected as a function and the parameter designation area includes five kinds of tabbed work sheets made of "basic copying", "application copying", "image quality adjustment", "outputting form" and others. In accordance with the attribution of respective work sheets, respective parameter items are classified. By clicking (or touching) the tab, the user can select a desired work sheet.

The user can designate various copying parameters in the form of a dialogue inputting style on the parameter designation area of the copying start screen. Here, the copying parameters include paper selection, magnification selection, density, kinds of originals, color mode, color balance adjustment, hue adjustment, saturation adjustment, sharpness adjustment, Collate/Uncollate, the number of papers to be copied, operation mode and the like. Although "printing", "printing and preserving" and "preserving" can be designated as the operation mode, "printing" is assumed to be designated here.

Returning back again to FIG. 5, the processing routine is explained. The content of the copying parameter inputted through the display 71 (default values in case copying parameters are omitted) is transmitted to the image forming apparatus 10 side through the high-speed bus 22 and the high-speed bus interface 20 (step S22). Step S21 and step S22 are realized when the CPU 51 executes given program codes.

Subsequently, the first page of the original is placed on the platen (or automatic document feeder). In response to the clicking or touching of the manipulation button "start" disposed at the left lower side of the copying start screen shown in FIG. 7, the original image scanning operation is started and then a closed-loop system processing constituted by a judgement block S23 is repeatedly executed until outputting of images are completed with respect to all pages of original.

The image inputting part 11 optically scans the surface of the original placed on the platen so as to read image data (step S24) and transfers the inputted image data to the image processing part 12 where the image processing is executed. Here, the image processing includes respective processing for converting to the output system data format including processing (step S25) such as rotation, movement, enlargement, reduction of image in accordance with copying parameters inputted in the step S21, filtering (step S26), color coordinate conversion from the RGB system to the YMCK system (step S27) and gray scale adjustment (step S28).

After the image processing, in the step S29, the image data of the output system data format is supplied to the image outputting part 13 and the input image is reproduced on the printing paper. When the printing paper is discharged to the outside of the image forming apparatus 10, the processing again returns to the step S23 and it is judged whether all original pages are processed or not.

As has already been explained above, the display 71 has a larger screen than the operation panel 15 which is provided to the image forming apparatus 10 as the standard equipment so that the display 71 can largely depict or separate by color respective manipulation objects or can offer the GUI screen which can make the user intuitively understand the manipulation method by making use of multi-windows or a work sheet screen. The GUI screen is designed not only in the form of a window system screen which is general in the field of computer technology, but also in the form of an operation panel of a copying machine so as to obtain the integration of operational feeling between the users of copying machines. The design change of such a GUI screen can be substantially realized by only rewriting software program and hence, the design change can be performed at a relatively low cost in a short due period.

The image editing system 100 of this embodiment can offer various functions such as electronic sort copying, image editing, photograph printing, on-site photograph printing, document synthesizing/document printing, scanning box, Job Template besides copying. Respective functions are explained hereinafter.

[Electronic Sort Copying]

Although the electronic sort copying is basically the same as the usual copying function in a viewpoint of outputting image, the electronic sort copying is characterized in that the read image data is stored in the disc as the electronic file. That is, the electronic sort copying enables collate outputting of image stored in the disc so that it is possible to print every the number of copies. For example, it is advantageous that even when the image forming apparatus 10 body does not support the collate outputting function, the collate outputting function is obtained by adding the expansion box 50.

Figure 8:
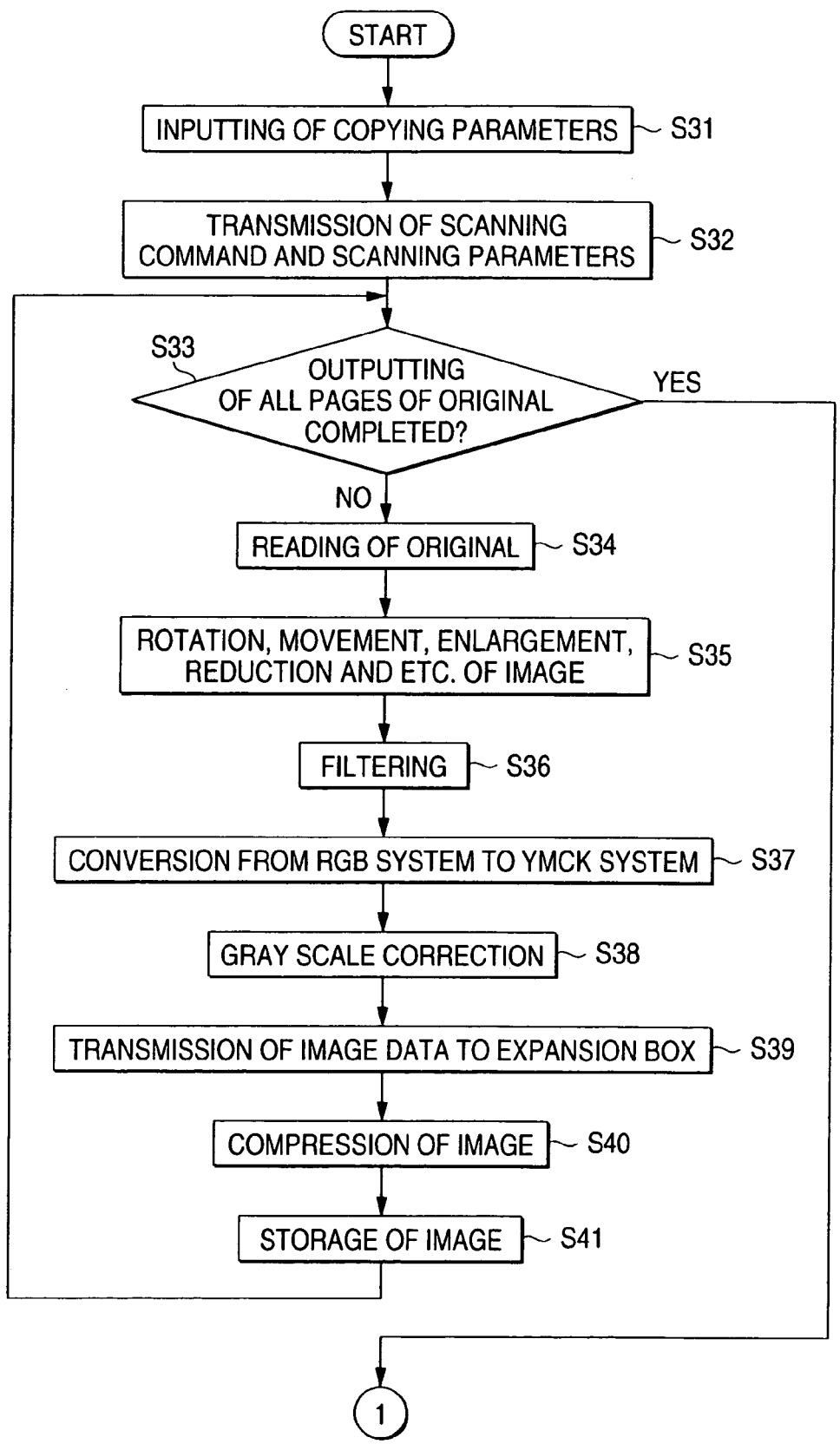
FIG. 8 is a flow chart showing the processing procedures of electronic sorting and copying operations in the image editing system 100.
Figure 9:
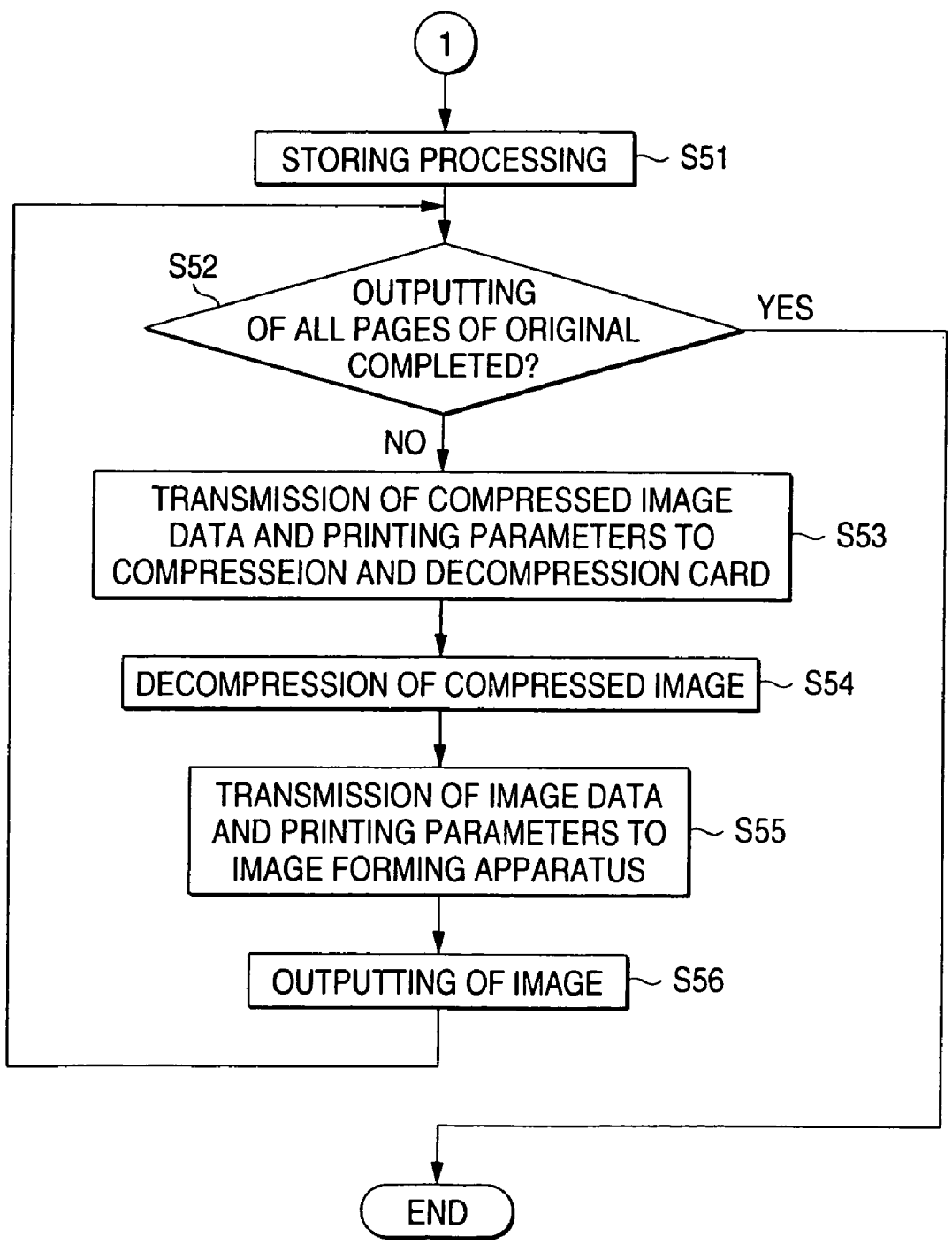
FIG. 9 is a flow chart showing the processing procedures of electronic sorting and copying operations in the image editing system 100.

FIG. 8 and FIG. 9 show the processing procedure for executing the electronic sort copying in the form of a flow chart. Respective steps of the flow chart are explained hereinafter.

First of all, the inputting of the copying parameters is performed (step S31). In this case, the inputting operation is performed on the GUI screen prepared on the large screen display 71 of the expansion box 50 side.

Figure 7:
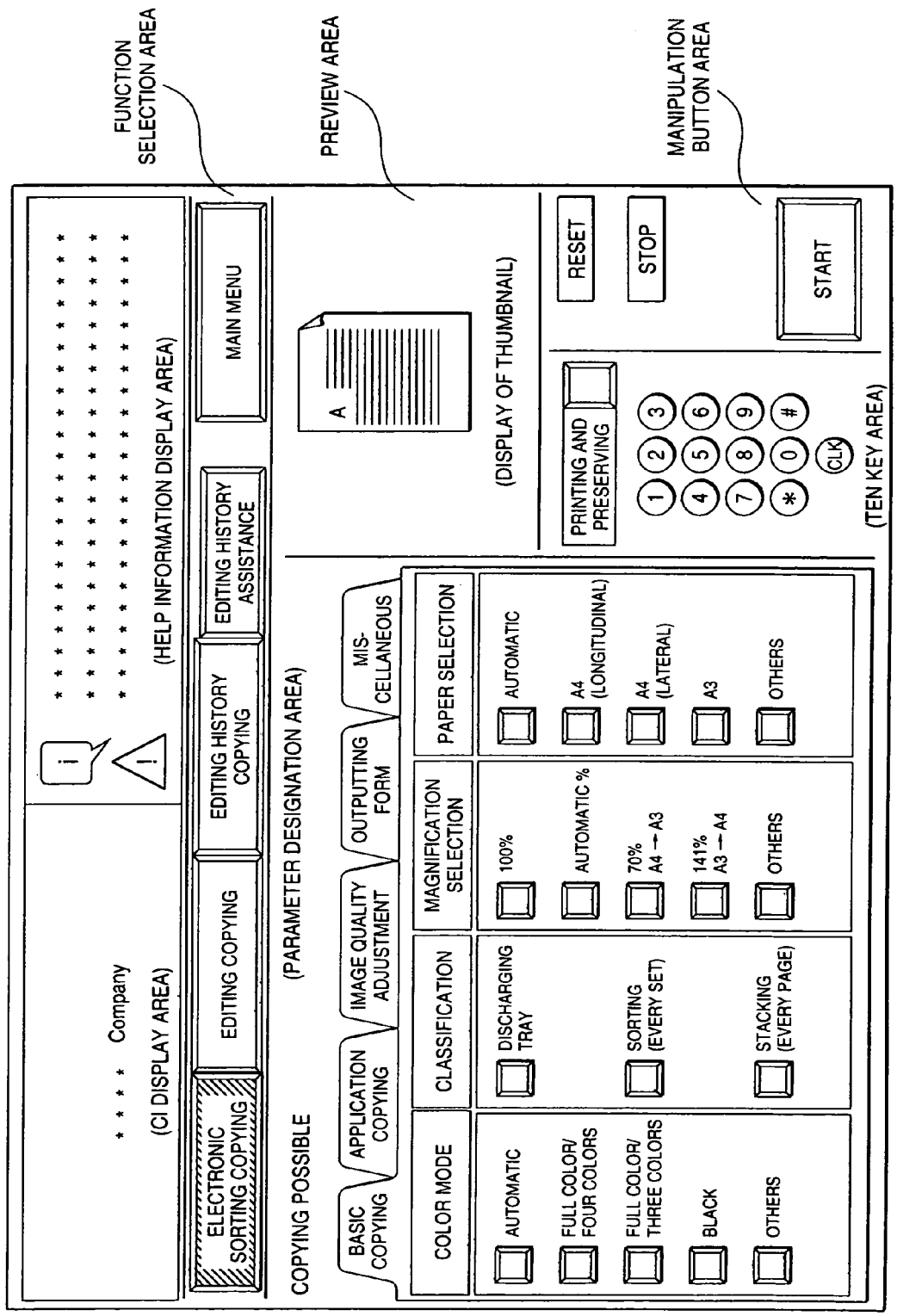
FIG. 7 is a view showing a copying start screen displayed on the display 71.

By selecting "the copying service" button on the main menu offered to the display 71, the user can change over the screen display to the copying start screen shown in FIG. 7. The user designates copying parameters in the parameter designating area of the copying start screen.

Among copying parameters, paper selection, magnification selection, density, kinds of originals, color mode, color balance adjustment, hue adjustment, saturation adjustment, sharpness adjustment can be set in the same manner as the usual copying function. Further, the operation mode can be designated by the operation selection button disposed at the upper portion of the ten key area. At the left side of the button, a current operation mode is displayed and corresponding to the number of manipulation of buttons, the operation mode is changed over to "printing", "printing and preserving" and "preserving". In this case, "printing and preserving" is assumed to be selected.

The first page of the original is placed on the platen (or automatic document feeder: not shown in the drawing). In response to the clicking or touching of the manipulation button "start" disposed at the left lower side of the copying start screen shown in FIG. 7, the scanning command and the scanning parameters which are inputted through the display 71 are transmitted to the image forming apparatus 10 side through the high-speed bus 22 and the high-speed bus interface 20 (step S32). The image forming apparatus 10 starts the scanning operation of original image in accordance with the received scanning command and scanning parameters. The step S31 and the step S32 can be realized by making the CPU 51 execute given program codes.

Subsequently, a closed-loop system processing constituted by a judgement block S33 is repeatedly executed until storing of image is completed with respect to all pages of original.

The image inputting part 11 optically reads the surface image of one page of the original placed on the platen (step S34) and transfers the inputted image data to the image processing part 12 where the image processing is executed. Here, the image processing includes processing (step S35) such as rotation, movement, enlargement, reduction of image in accordance with copying parameters inputted in the step S31, filtering (step S36), color coordinate conversion from the RGB system to the YMCK system (step S37) and gray scale adjustment (step S38).

The image data subjected to the image processing at the image processing part 12 has a data format which allows the image outputting part 13 to directly output the image. In step S39, the image data having such an output system data format is transferred to the expansion box 50 through the high-speed bus interface 20 and the high-speed bus 22.

At the expansion box 50 side, the received image data of one page is compressed (step S40). The compression processing is performed, for example, every face information of respective colors YMCK. Further, the compressed data is stored in the hard disc device 54 as the compressed data file of 1 page while maintaining the face order (step S41). Then, the processing procedure returns to the step S33 and the above-mentioned processing are repeated until the storing of the output image data of the YMCK system is completed with respect to all pages of the original.

When the image storage is completed, the processing procedure jumps to a processing routine shown in FIG. 9.

In the hard disc device 54, the output image data of the YMCK system on all pages of the original is stored as the files. However, the allocation of respective image data files on the disc does not necessarily follow the order of pages to be outputted as image. Accordingly, in step S51, the rearrangement of pages, that is, the sorting is performed. Since this sorting processing is performed in the form of the manipulation of the electronic information with the use of the operation resource of the CPU 51, the sorting can be readily realized at a high speed compared to the sorting of original papers (hardcopy).

Subsequently, the image outputting is performed by the closed loop system processing constituted by a judgement block S52 with respect to all pages of original.

In step S53, the compressed image data of one page of original is read from the hard disc device 54 and the image data is transferred to the compression and decompression card 62 together with relevant printing parameters.

Subsequently, the decompression module on the compression and decompression card 62 performs decompression processing of the received compressed data (step S54). The image data restored by the decompression processing is sequentially transferred to the image forming apparatus 10 side through the high-speed bus interface 20 together with the print parameters (step S55). The compressed image data of each page of the original stored in the hard disc device 54 is composed of the compressed data of each face information of each color of YMCK. It is efficient to perform the decompression processing and the transfer processing of respective face information in accordance with the face order in which the image is outputted from the image outputting part 13.

In the inside of the image forming apparatus 10, the image outputting part 13 receives the image data and directly outputs the image on the printing paper (step S56). The image data of each one page is composed of face information of the output system data format, that is, each color of the YMCK system and is supplied to the image outputting part 13 in accordance with the face order of the developing processing to which the image data is subjected to so that the real-time characteristics can be assured.

When the image output of one page is completed, the processing procedure returns to the step S52 and the above-mentioned processing is repeated until the image outputting is completed with respect to all output image.

Figure 10:
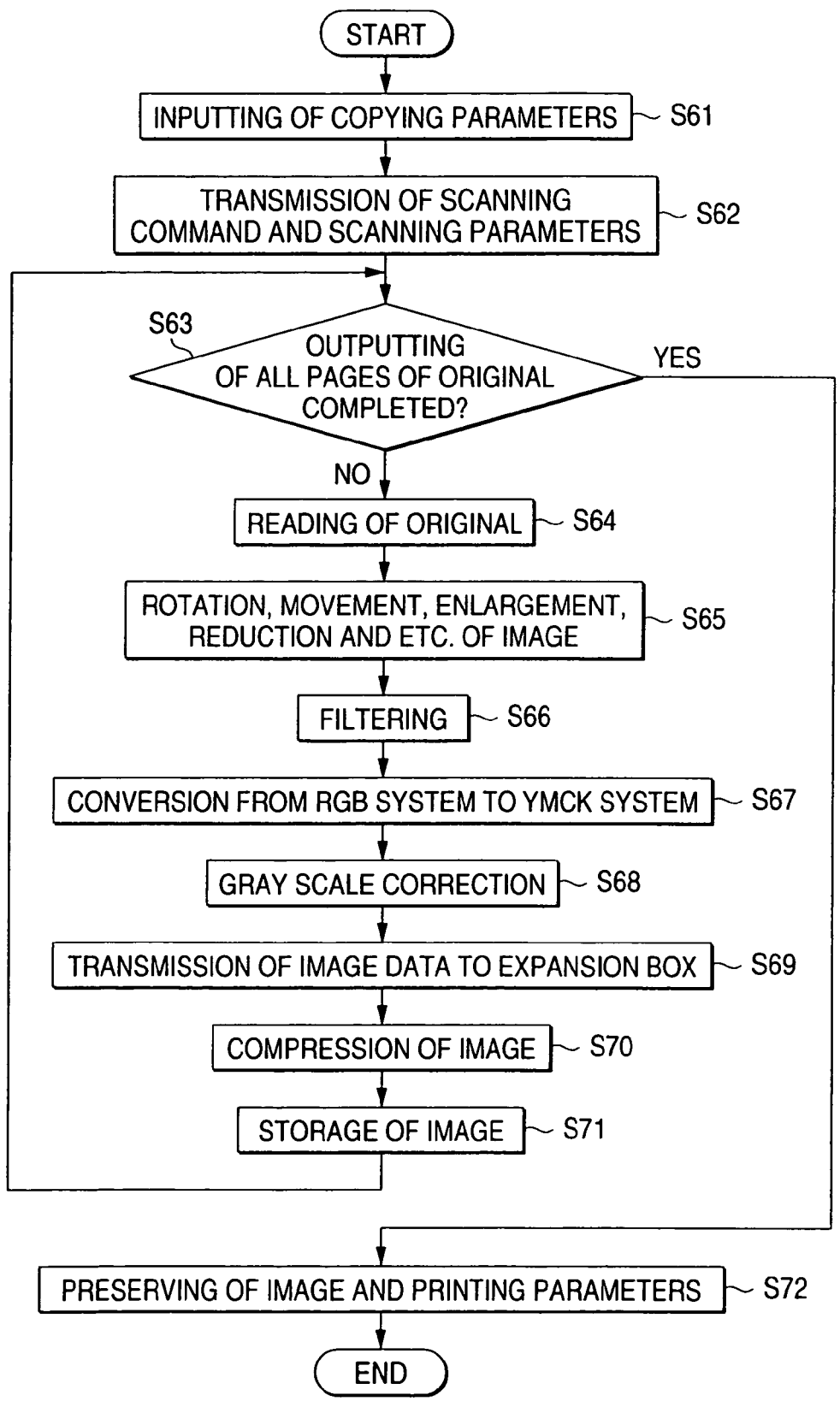
FIG. 10 is a flow chart showing the processing procedures of an electronic sorting operation on the image editing system 100 (image being not outputted and only stored as a file)

There may be a case that it is unnecessary for the user of the image forming apparatus 10 (or the expansion box 50 as PC) to promptly print out the scanned image which is obtained by optical reading and rather he wants to store the scanned image as files. So long as the image is stored as files, the image can be printed out later. FIG. 10 shows the processing procedure of the case where the scanned image is directly stored as files in the form of a flow chart. Respective steps of this flow chart is explained hereinafter.

First of all, the copying parameters are inputted (step S61). In this case, the inputting operation is performed on the GUI screen prepared on the large screen display 71 of the expansion box 50 side. The user can change over the screen to a scanning start screen by selecting the "scanning service" button on the main menu provided to the display 71. This scanning start screen is approximately equal to that of FIG. 7 and hence, the explanation thereof is omitted here. Among copying parameters, paper selection, magnification selection, density, kinds of originals, color mode, color balance adjustment, hue adjustment, saturation adjustment, sharpness adjustment can be set in the same manner as the usual copying function. In case of only storing the image data into files, Collate/Uncollate and the number of copies are ignored. Further, although "printing", "printing and preserving" and can be designated, the "preserving" is assumed to be designated here.

Subsequently, the first page of the original is placed on the platen (or automatic document feeder: not shown in the drawing) of the image forming apparatus 10. In response to the clicking or touching of the manipulation button "start" disposed at the left lower side of the scanning start screen shown in FIG. 7, the scanning command and scanning parameters inputted through the display 71 are transmitted to the image forming apparatus 10 side through the high-speed bus 22 and the high-speed bus interface 20 (step S62). At the image forming apparatus 10 side, the original image scanning operation is started in accordance with the received scanning command and the scanning parameters.

Then, a closed-loop system processing constituted by a judgement block S63 is repeatedly executed until the storing of images is completed with respect to all pages of original.

The image inputting part 11 optically reads the surface image of one page of the placed original (step S64) and transfers the inputted image data to the image processing part 12 where the image processing is executed. Here, the image processing includes processing (step S65) such as rotation, movement, enlargement, reduction of image in accordance with copying parameters inputted in the step S61, filtering (step S66), color coordinate conversion from the RGB system to the YMCK system (step S67) and gray scale adjustment (step S68).

After the image processing by the image processing part 12, the image data has the output system data format, that is, the form which allows the image outputting part 13 to directly output image. In step S69, the image data is transferred to the expansion box 50 through the high-speed bus interface 20 and the high-speed bus 22.

At the expansion box 50 side, the received image data of one page is compressed (step S70). The compression processing is performed, for example, every face information of respective colors YMCK and the image data is temporarily stored as the compressed data files of one page in the hard disc device 54 while maintaining the face order (step S71). Then, the processing procedure returns to the step S63 and the above-mentioned processing is repeated until the storage of output image data of the YMCK system is completed with respect to all pages of the original.

When the storage of compressed data of all original images is completed, the compressed data is moved to a designated preserving place and is preserved together with the printing parameters inputted in the step S61 (step S72). Here, the preserving place may be located in the inside of the same hard disc device 54 and is specified by the pass name and the file name. This file can be electronically sorted and printed out later.

According to the image editing system 100 of this embodiment, even when the copying machine does not have the sort outputting function under the stand-alone condition, by connecting the expansion box 50 to the copying machine through the high-speed bus interface 20 and the connection port 21, the image editing system 100 can readily offer the electronic sorting and copying function at a relatively low cost.

Further, the image data preserved in the local disc 54 of the expansion box 50 as the file is available to other clients 81 . . . through the network 80. In other words, the common use of the relatively expensive scanning function of the image forming apparatus 10 among plural PCs become possible thus the image editing system 100 is excellent economically.

[Image Editing]

In this embodiment, "image editing" means to perform editing processing such as coloring to the image inputted at the image inputting part 10 and then printing out the image to the printing paper. The editing processing is performed with the use of the high-speed and high-function operation resource of the CPU 51.

Figure 11:
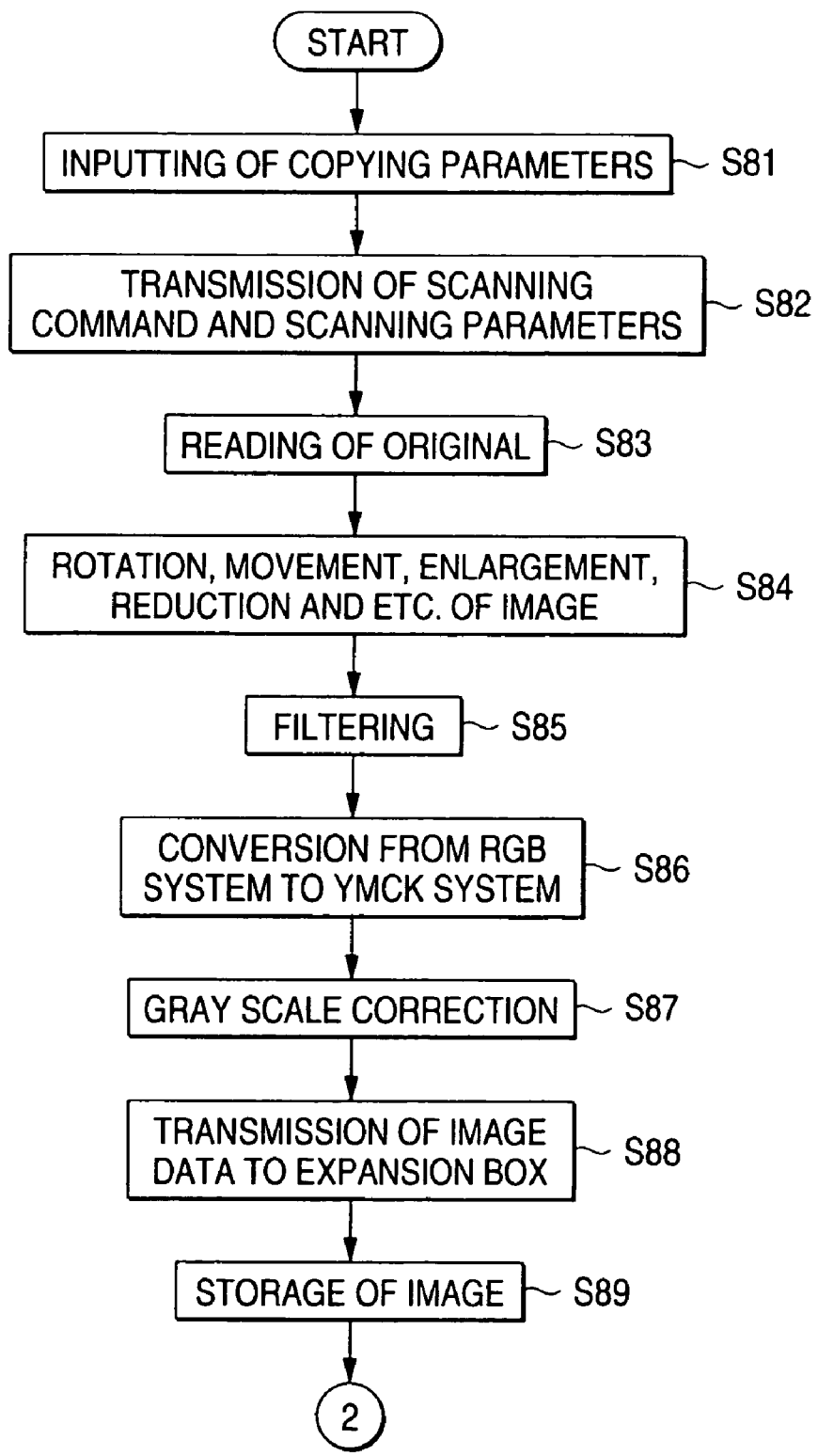
FIG. 11 is a flow chart showing the processing procedures of an image editing operation in the image editing system 100 (including image outputting)
Figure 12:
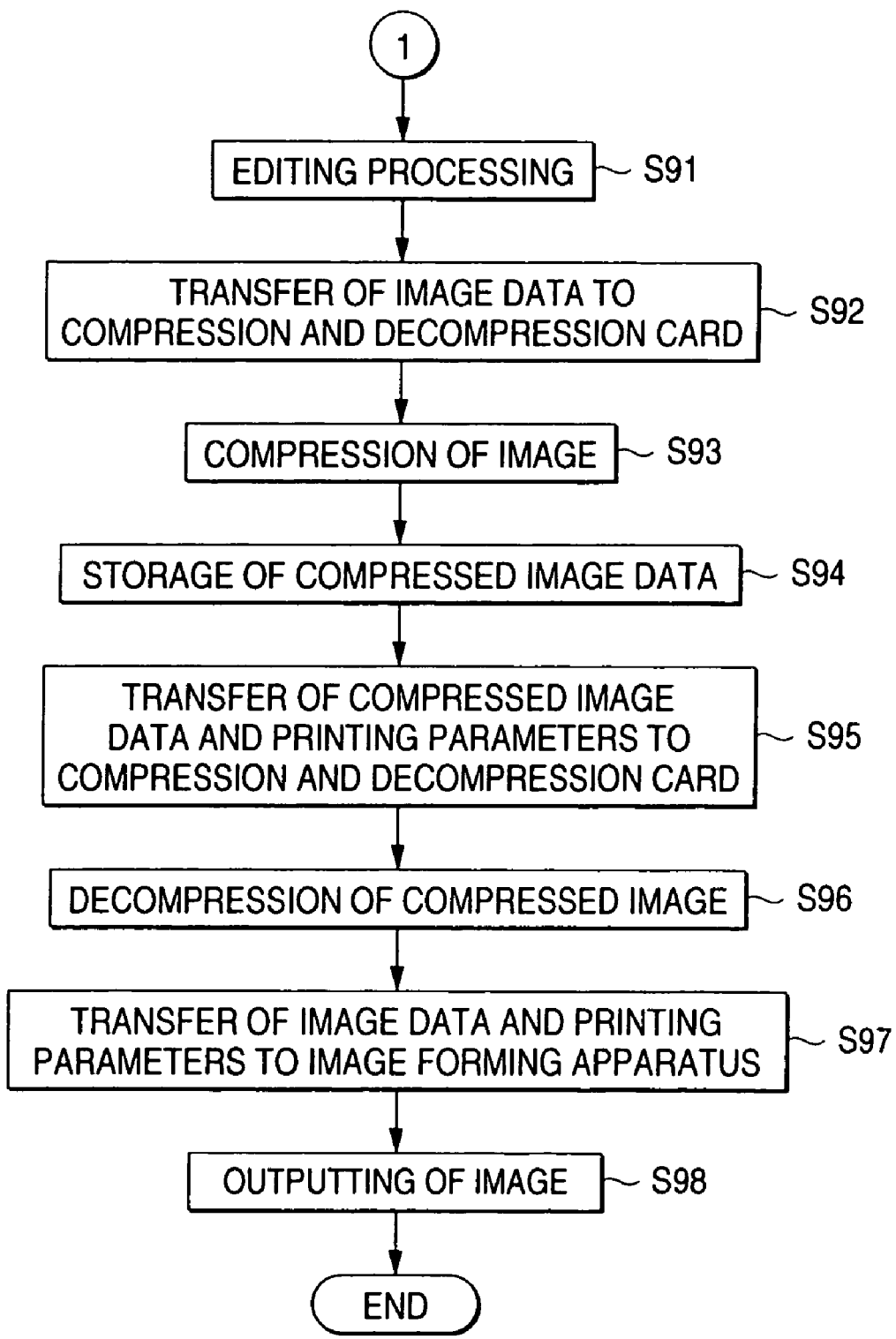
FIG. 12 is a flow chart showing the processing procedures of an image editing operation (including an image output) in the image editing system 100.

FIG. 11 and FIG. 12 show the processing procedure which executes the image editing in the form of a flow chart. Respective steps of this flow chart is explained hereinafter.

First of all, the copying parameters are inputted (step S81). In this case, the inputting operation is performed on the GUI screen prepared on the large screen display 71 of the expansion box 50 side.

The user can change over the screen display to a scanning start screen (see FIG. 7) by selecting the "copying service" button on the main menu provided to the display device 71. Copying parameters are designated in the parameter designation area of this scanning start screen.

Among copying parameters, paper selection, magnification selection, density, kinds of originals, color mode, color balance adjustment, hue adjustment, saturation adjustment, sharpness adjustment can be respectively set in the same manner as the usual copying function. In the editing function, the image of only one page of the original is subjected to processing and hence, Collate/Uncollate and the number of copies are ignored. Further, although any one of "printing", "printing and preserving" and "preserving" can be designated, the "preserving" is assumed to be designated here.

Subsequently, the first page of the original to be edited is placed on the platen. In response to the clicking or touching of the "start" button disposed at the left lower side of the scanning start screen, the scanning command and scanning parameters which are inputted through the display 71 are transmitted to the image forming apparatus 10 side through the high-speed bus 22 and the high-speed bus interface 20 (step S82).

At the image forming apparatus 10 side, the original image scanning operation is started in accordance with the received scanning command and the scanning parameters.

The image inputting part 11 optically scans the surface image of one page of the original placed on the platen so as to read image data (step S83) and transfers this image data to the image processing part 12 where the image processing is executed. Here, the image processing includes processing (step S84) such as rotation, movement, enlargement, reduction of image in accordance with copying parameters inputted in the step S81, filtering (step S85), color coordinate conversion from the RGB system to the YMCK system (step S86) and gray scale adjustment (step S87).

The image data subjected to the image processing at the image processing part 12 has the output system data format which allows the image outputting part 13 to directly output the image. In step S88, such image data is transferred to the expansion box 50 through the high-speed bus interface 20 and the high-speed bus 22.

At the expansion box 50 side, the received image data is once stored in the hard disc device 54 (step S89). However, since the image editing is performed right after such storing, it is unnecessary to compress the image data before storing.

Subsequently, the processing procedure jumps to a processing routine shown in FIG. 12.

In step S91, the image data of one page is developed on the RAM 52 from the inside of the hard disc device 54 and the image editing is performed.

Figure 13:
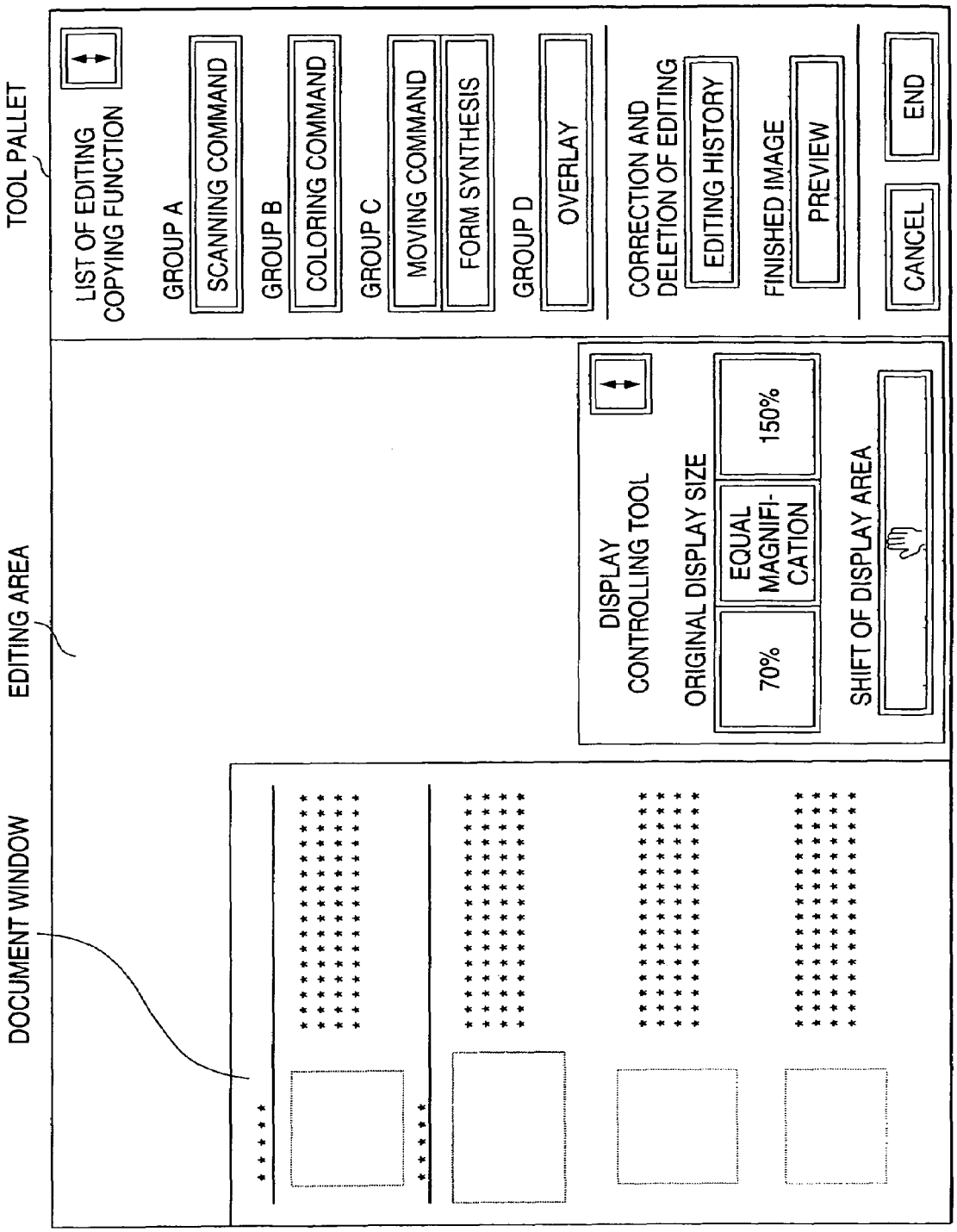
FIG. 13 is a view showing an image editing screen displayed on the display 71.

When the user selects "working site" button on the main menu provided to the display 71, the user can change over the screen to the image editing screen shown in FIG. 13.

As shown in FIG. 13, the editing screen is composed of a GUI screen which is formed of a tool pallet and an editing area. In the tool pallet, the function selection for image editing, that is, plural buttons for allowing the user to perform command inputting are prepared in several groups. The group A is provided with a "scanning command" button which relates to scanning inputting of the original image, the group B is provided with a "coloring command" button which relates to color editing of the image, the group C is provided with a "moving command" button which relates to the movement of a figured object such as an image and a "form synthesizing" button which relates to a document format, the group D is provided with an "overlay" button which relates to a superposed display of figured objects. When the user selects a "editing history" button, the history of editing command which were used in the past with respect to the document under edition is listed up. By selecting the used commands from the list, the editing content can be corrected readily and in the form of dialogue or the editing commands per se can be cancelled. Further, when a "preview" button is selected, the finished image of the whole document under editing, that is, the preview image appears. A "cancel" button and a "finish" button in the lowermost row of the tool pallet are respectively used for indicating canceling of the editing content (that is, input command) with respect to the document under display, fixing of editing content and completion of editing operation.

On the other hand, the document under editing is displayed by windows in the editing area. The display in the document window is sequentially updated in accordance with the result of the command input which uses a tool pallet. Further, in the editing area, a "display control tool" window for inputting the control information on the display system of the document window is prepared. In the window of the "display control tool", a cursor button for moving the document window frame (indicated by an icon having double arrows), a "70%" button, an "equal magnification" button and a "150%" button for designating the original display size and a movement button (indicated by a palm-shaped icon) are disposed.

In this embodiment, the designation of the region selection and the editing processing is performed at the time of editing manipulation (step S91).

In the designation of region, the designation of rectangle, circle, ellipse, solid closed loop region, hollow closed loop region, polygonal region, front face and the like are allowed.

Further, as the editing manipulation, coloring, color conversion, colorless characters, matting, extraction, synthesizing by fitting, repeating, regional copying, movement, deletion, complementary color inversion, lightness inversion, mirror image and the like are prepared. In color designation, in addition to the selection from a color patch which is preliminarily prepared (or programmable by users), a position on the edited image is designated and the color of the position can be selected.

Followings and the like are prepared as editing manipulations other than the above-mentioned editing manipulations.

(1) In canceling the processing, the region is selected and deleted.

(2) A series of editing manipulations are preserved in the form that they are related with each other and are applied to editing of other image data (in this case, plural originals from the automatic document feeder are read and the same editing manipulation may be applied to the page of respective originals).

Returning back to FIG. 12, the processing procedure of the image editing is explained. The image data subjected to such an editing processing is transferred to the compression and decompression card 62 (step S92) and is compressed (step S93). The compression processing is, for example, performed every face information of respective colors YMCK and the compressed image data is stored in the hard disc device 54 as the compressed data file of one page while maintaining the face order (step S94).

Subsequently, the compressed image data of one page is taken out from the hard disc device 54 and is transferred to the compression and decompression card 62 together with the relevant printing parameters (step S95).

The decompression module on the compression and decompression card 62 performs decompression processing of the received compressed data (step S96). The image data restored by the decompression processing is transferred to the image forming apparatus 10 side through the high-speed bus 22 and the high-speed bus interface 20 together with the printing parameters (step S97). The compressed image data stored in the hard disc device 54 is composed of the compressed data of respective face information of respective colors YMCK. It is efficient to perform the decompression processing and the transfer processing of respective face information in accordance with the face order in which the image is outputted from the image outputting part 13.

In the inside of the image forming apparatus 10, the image outputting part 13 receives the image data and directly outputs the image on the printing paper (step S98). The image data of each one page is composed of face information of the output system data format, that is, respective colors of the YMCK system and is supplied to the image outputting part 13 in accordance with the face order of the developing processing so that the real-time characteristics can be assured.

Figure 14:
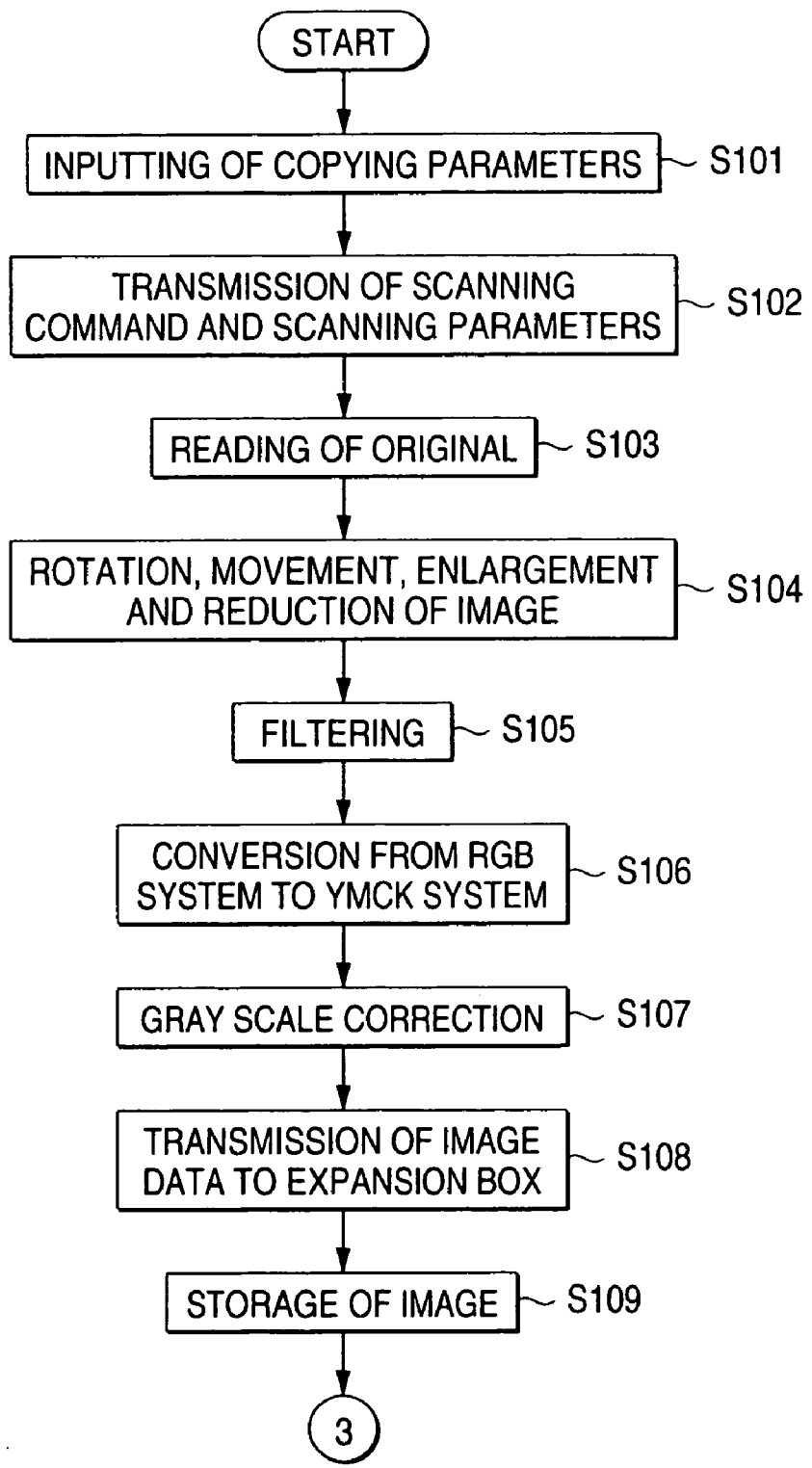
FIG. 14 is a flow chart showing the processing procedures of an image editing operation (only scanning and storing scanned image) in the image editing system 100.
Figure 15:
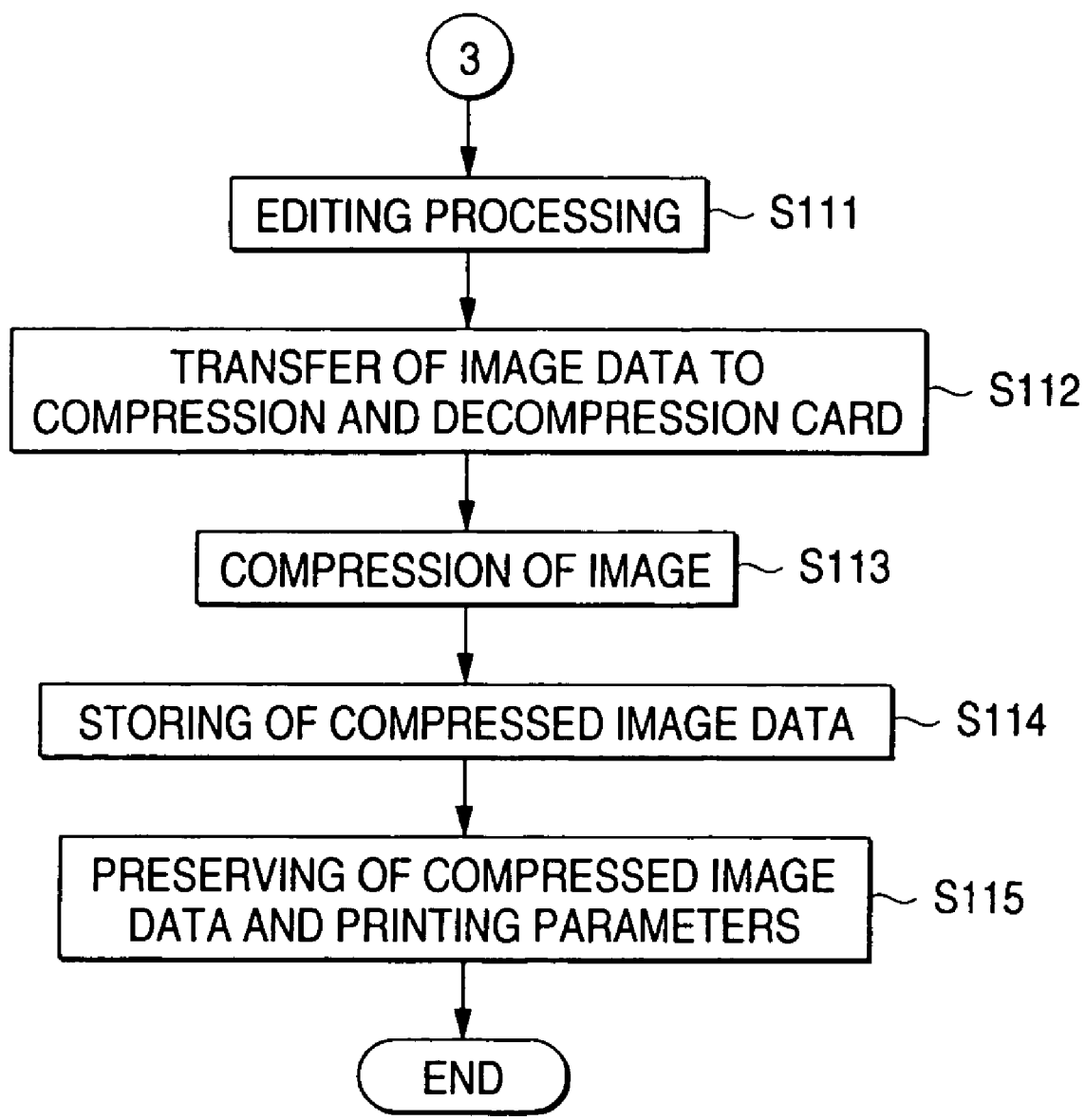
FIG. 15 is a flow chart showing the processing procedures of an image editing operation (only scanning and storing scanned image) on the image editing system 100.

There may be a case that it is unnecessary for the user of the image forming apparatus 10 (or the expansion box 50 as PC) to promptly print out the edited image which is obtained by editing the scanned image which is optically read and rather he wants to only store the edited image as files. FIG. 14 and FIG. 15 show processing procedure for directly preserving the edited image as files in the form of a flow chart. Respective steps of the flow chart are explained hereinafter.

First of all, the copying parameters are inputted (step S101). In this case, the inputting operation is performed on the GUI screen prepared on the large screen display 71 of the expansion box 50 side.

The user can change over the screen to the scanning start screen by selecting the "copying service" button on the main menu provided to the display device 71. Copying parameters are designated in the parameter designation area of this scanning start screen.

Among copying parameters, paper selection, magnification selection, density, kinds of originals, color mode, color balance adjustment, hue adjustment, saturation adjustment, sharpness adjustment can be respectively set in the same manner as the usual copying function. In the editing function, the image of only one page of the original is subjected to processing and hence, Collate/Uncollate and the number of copies are ignored. Further, although any one of "printing", "printing and preserving" and "preserving" can be designated as the operation mode, the "preserving" is assumed to be designated here.

Subsequently, the first page of the original to be edited is placed on the platen (or the automatic document feeder: not shown in the drawing). In response to the clicking or touching of the "start" button disposed at the left lower side of the scanning start screen shown in FIG. 7, the scanning command and scanning parameters which are inputted through the display 71 are transmitted to the image forming apparatus 10 side through the high-speed bus 22 and the high-speed bus interface 20 (step S102).

At the image forming apparatus 10 side, the original image scanning operation is started in accordance with the received scanning command and the scanning parameters.

The image inputting part 11 optically scans the surface image of one page of the original placed on the platen so as to read image data (step S103) and transfers this image data to the image processing part 12 where the image processing is executed. Here, the image processing includes processing (step S104) such as rotation, movement, enlargement, reduction of image in accordance with copying parameters inputted in the step S101, filtering (step S105), color coordinate conversion from the RGB system to the YMCK system (step S106) and gray scale adjustment (step S107) and the like.

The image data subjected to the image processing at the image processing part 12 has the output system data format which allows the image outputting part 13 to directly output the image. In step S108, such image data is transferred to the expansion box 50 through the high-speed bus 22 and the high-speed bus interface 20.

At the expansion box 50 side, the received image data is once stored in the hard disc device 54 (step S109). However, since the image editing is performed right after such storing, it is unnecessary to compress the image data before storing.

Subsequently, the processing procedure jumps to a processing routine shown in FIG. 15.

In step S111, the image data of one page is developed on the RAM 52 from the inside of the hard disc device 54 and the image editing is performed.

When the user selects "working site" button on the main menu provided to the display 71, the user can change over the screen to the image editing screen shown in FIG. 13 (previously mentioned). In this embodiment, the designation of the region selection and the editing processing is performed at the time of editing manipulation (step S111). Further, the designation of color and moving place is performed corresponding to the editing manipulation.

In the designation of region, the designation of rectangle, circle, ellipse, solid closed loop region, hollow closed loop region, polygonal region, front face and the like are allowed. Further, as the editing manipulation, coloring, color conversion, colorless characters, matting, extraction, synthesizing by fitting, repeating, regional copying, movement, deletion, complementary color inversion, lightness inversion, mirror image and the like are prepared. In color designation, in addition to the selection from a color patch which is preliminarily prepared (or programmable by users), a position on the edited image is designated and the color of the position can be selected.

Followings and the like are prepared as editing manipulations other than the above-mentioned editing manipulation.

(1) In canceling the processing, the region is selected and deleted.

(2) A series of editing manipulations are preserved in a form that they are related with each other and are applied to editing of other image data (in this case, plural originals from the automatic document feeder are read and the same editing manipulation may be applied to respective page of originals).

Subsequently, the image data subjected to such an editing processing is transferred to the compression and decompression card 62 (step S112) and is compressed (step S113). The compression processing is, for example, performed every face information of respective colors YMCK and the compressed image data is stored in the hard disc device 54 as the compressed data files of one page while maintaining the face order (step S114).

Subsequently, the printing parameters related to this compressed image data files are preserved (step S115) and this whole processing routine ends.

The place where the compressed image data file is stored is not necessarily the local disc 54 of the expansion box 50. For example, the files may be preserved by other media drive which is added to the expansion box 50 such as a MO drive or a CD-R drive (not shown in FIG. 2) or remote discs present on other computer systems 81 . . . connected to the expansion box 50 through the network 80.

Figure 16:
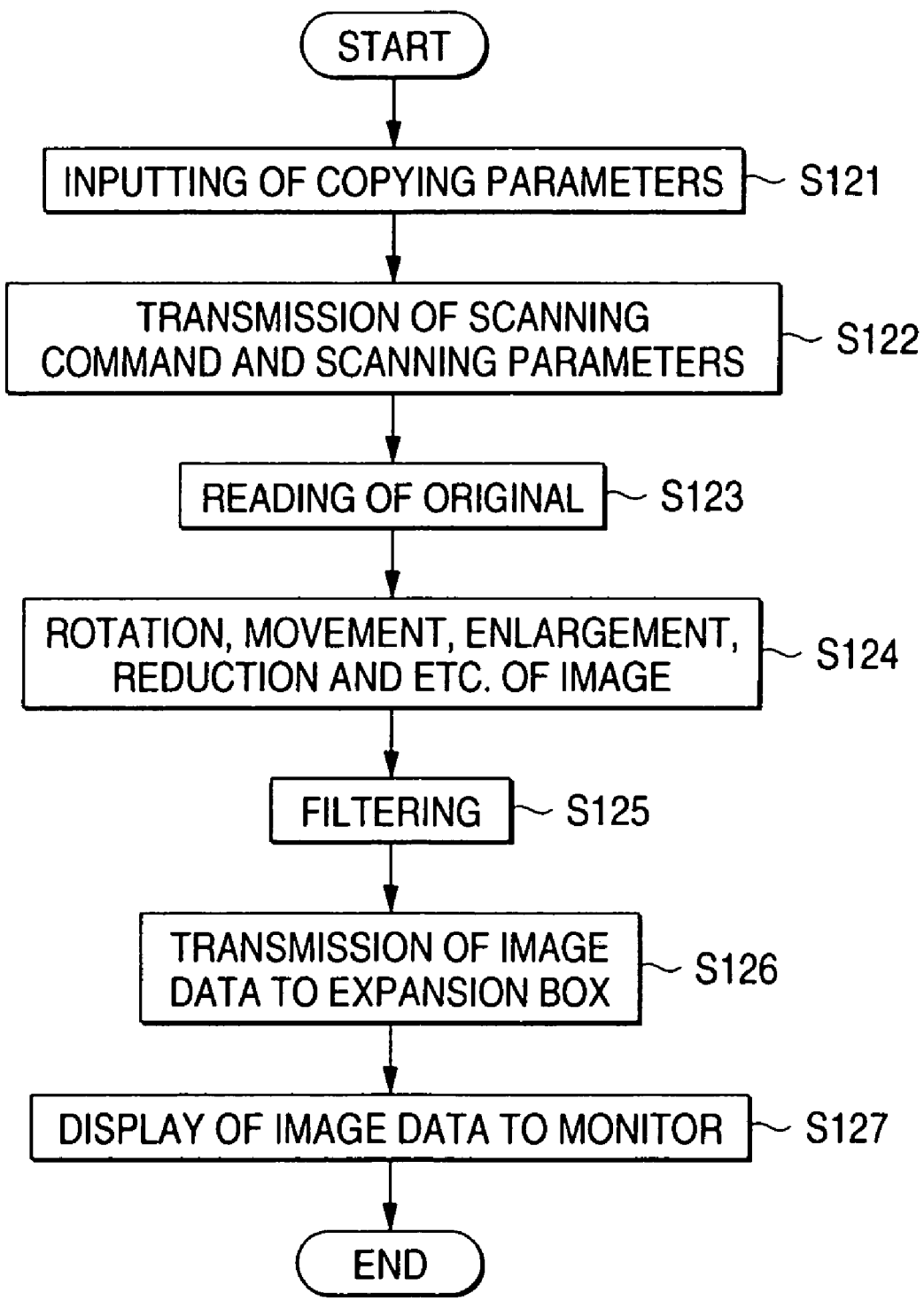
FIG. 16 is a flow chart showing the processing procedures of an image editing operation (only scanning and displaying scanned image) in the image editing system 100.

There may be a case that it is unnecessary for the user of the image forming apparatus 10 (or the expansion box 50 as PC) to promptly print out or preserve as files the edited image and it may be enough for the user to confirm the edited image by simply displaying the edited image on the display screen. FIG. 16 shows the processing procedure of the case where the edited image is directly preserved as files in the form of a flow chart. Respective steps of this flow chart is explained hereinafter.

First of all, the copying parameters are inputted (step S121). In this case, the inputting operation is performed on the GUI screen prepared on the large screen display 71 of the expansion box 50 side.

The user can change over the screen display to the scanning start screen by selecting the "scanning service" button on the main menu provided to the display device 71. Copying parameters are designated in the parameter designation area of this scanning start screen.

Among copying parameters, paper selection, magnification selection, density, kinds of originals, color mode, color balance adjustment, hue adjustment, saturation adjustment, sharpness adjustment can be respectively set in the same manner as the usual copying function. In the editing function, the image of only one page is subjected to processing, Collate/Uncollate and the number of copies are ignored.

Further, the scanned image is neither printed out nor preserved as files and hence, the designation of the operation mode is also ignored.

Subsequently, the first page of the original to be edited is placed on the platen (or the automatic document feeder: not shown in the drawing). In response to the selecting of the "start" button disposed at the left lower side of the scanning start screen (see FIG. 7), the scanning command and scanning parameters which are inputted through the display 71 are transmitted to the image forming apparatus 10 side through the high-speed bus 22 and the high-speed bus interface 20 (step S122).

Subsequently, at the image forming apparatus 10 side, the original image scanning operation is started in accordance with the received scanning command and the scanning parameters.

The image inputting part 11 optically scans the surface image of one page of the original placed on the platen so as to read image data (step S123). This image data is transferred to the image processing part 12 and the image processing is executed. Here, the image processing includes processing (step S124) such as rotation, movement, enlargement, reduction of image in accordance with copying parameters inputted in the step S121, filtering (step S125) and the like. However, in this processing routine, since the final image outputting of the scanned image is not expected, processing such as color coordinate conversion from the RGB system to the YMCK system, gray scale adjustment and the like are omitted and hence, the image data having the output system data format is not generated.

The image data subjected to the image processing at the image processing part 12 is transferred to the expansion box 50 through the high-speed bus interface 20 and the high-speed bus 22. Then, the image data is displayed by the display 71 having the relatively large screen.

With the use of the image editing system 100 according to this embodiment, the image is displayed on the relatively large screen display 71 provided to the expansion box 50 (or a CRT display which is connected to the expansion box 50 externally and has a further large screen and a high definition) so that the image editing can be performed while checking the detail of the scanned image.

Further, the image data which is preserved in the local disc 54 of the expansion box 50 as files is available to other clients 81 . . . through the network 80. In other words, the relatively expensive scanning function that the image forming apparatus 10 has can be commonly shared by plural PCs so that the image editing system 100 is excellent economically.

[Photograph Printing]

Here, "photograph printing" means to print out electronic image data obtained by picking up with a digital camera or the like with the use of the image outputting part 13 of the image forming apparatus 10. The significance in using the expansion box 50 lies in that not only the picked-up image is reproduced on the printing paper but also the picked-up image is inlaid into given electronic documents so that the layout in the document can be freely designated.

Figure 17:
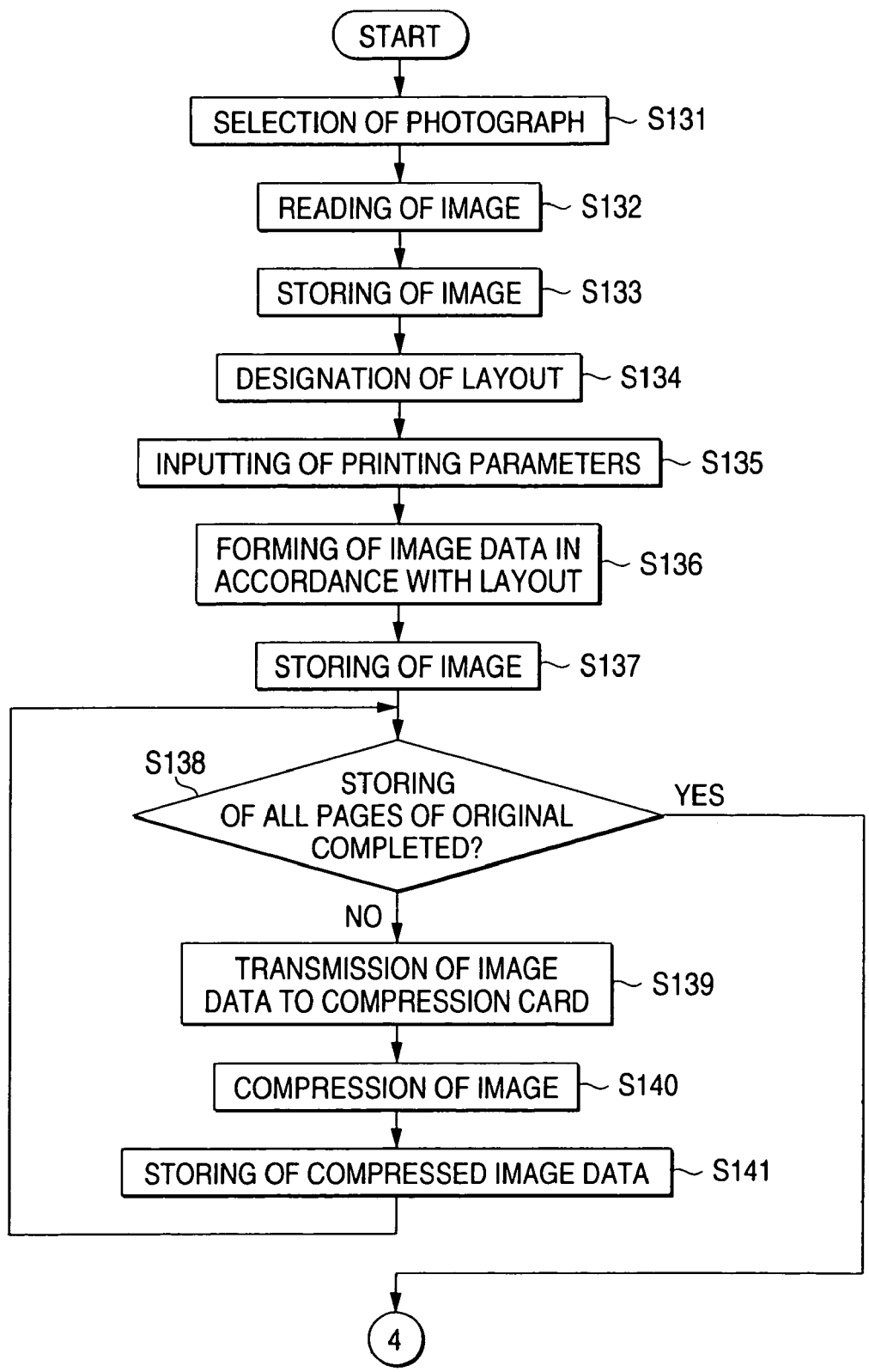
FIG. 17 is a flow chart showing the processing procedures of a photograph printing operation (including an image outputting) in the image editing system 100.
Figure 18:
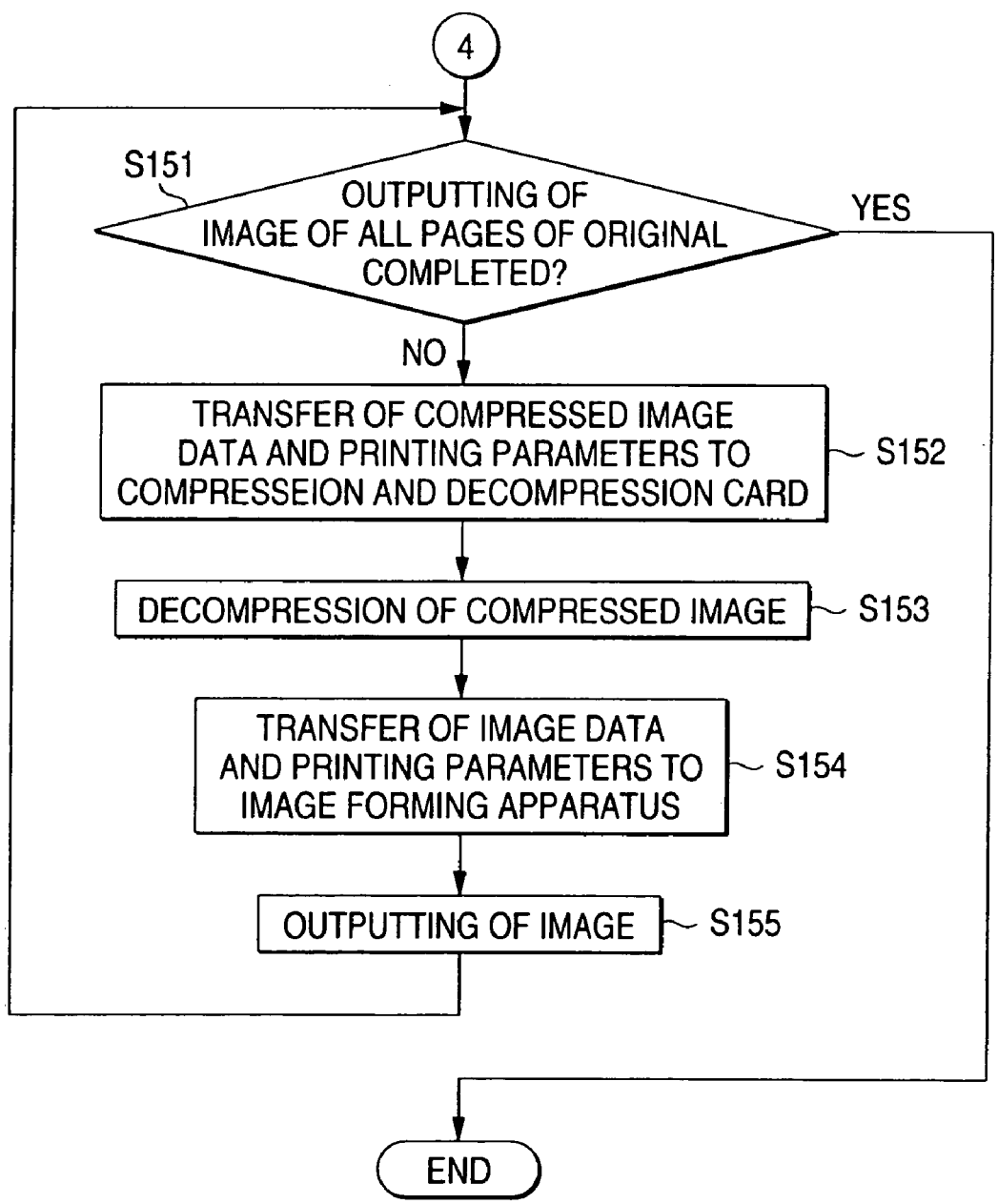
FIG. 18 is a flow chart showing the processing procedures of a photograph printing operation (including an image outputting) in the image editing system 100.

FIG. 17 and FIG. 18 show the processing procedure for executing the photograph printing in the form of a flow chart. Respective steps of the flow chart are explained hereinafter.

The image data picked up by the digital camera is supplied to the expansion box 50 in the form of media called a PC card or a smart media. Further, depending on the kinds of apparatus, the digital camera is connected to the expansion box 50 by a cable connection by means of input and output port (for example, a serial port (not shown in FIG. 2)) which is provided to the expansion box as a standard equipment so that the digital camera can directly transfer the picked-up image. Alternatively, the image data may be preliminarily stored in the hard disc device 54.

On the main menu (see FIG. 6) provided to the display 71, by selecting the "printing service" button, the user can change over the screen to the printing start screen suitable for setting of printing manipulation of image data such as document printing, media printing, digital camera printing, on-site photograph printing (described later) or the like.

In FIG. 19, only a parameter designation area is extracted from the photograph printing screen provided to the display 71 and is illustrated (it is to be understood that the display regions such as CI display area, help display area, function selection area, preview area, manipulation button area or the like which are not shown in FIG. 19 are approximately equal to those shown in FIG. 7). This parameter designation area is provided for designating various parameters related to the printing manipulation in a dialogue inputting system. The parameter designation area is composed of two-kinds of work sheets, that is, "photograph printing" and "miscellaneous". By clicking or touching a tab, the user can make the corresponding work sheet displayed on the frontmost surface. In the example shown in FIG. 19, the "photograph printing" is selected.

On the photograph printing screen shown in FIG. 19, in response to performing of the designation of media which supplies image data, the processing flow shown in FIG. 17 starts (step S131). That is, in the "file selection" within the parameter designation area shown in FIG. 19, media which supplies image data is designated. For example, when a "PC card" button is selected, reading of image data from a media card inserted in the PC card slot 57 is tried (step S132).

In reading the image data, the whole image data (photographs) in the designated media (or a "folder" which corresponds to the media) may be displayed in the form of a list. Further, the user may select the whole folder altogether or may select some image data from the folder. As a list display system of the image data files, for example, name of photograph (file), pick-up date, thumbnail (miniature version display of image) or the like can be used.

The read-out image data is once stored in the hard disc device 54 (step S133).

Subsequently, the designation of layout (step S134) and inputting of printing parameters (step S135) are performed. These inputting manipulations are performed in the form of dialogue on the parameter designation area shown in FIG. 19.

For example, in the designation of layout, when the user clicks or touches the "miscellaneous" button in the column of "photograph size", a pop-up screen of "photograph size" as shown in FIG. 20 appears on the display 71. On the same screen, the user can select the output photograph size from "post card", "L size", "2L size", "A4 size" and can designate N up number of the photograph layout, wherein N is the number of photographs described in a sheet of output page and is a positive integer).

Further, as printing parameters, paper selection, Collate/Uncollate designation, resolution (for example, alternatively selected between 300 dpi and 600 dpi), the number of printings and operation mode are designated. In case inputting of the printing parameters is omitted, default values are used. Although three kinds of modes, that is, "printing mode", "printing and preserving" and "preserving" are prepared as operation modes, the "printing and preserving" is assumed to be designated.

Upon completion of the designation of printing parameters, the image outputting processing is started. For example, by pushing the "start" button disposed in the manipulation button area within the photograph printing screen, the photograph image data which constitutes a printing object is read on the RAM 52 from the hard disc device 54. Then, in accordance with the layout and the printing parameters designated in step S134 and step S135, the photograph image data is processed (in this embodiment, the photo size is automatically adjusted corresponding to the size of the selected paper size) so as to form page image data for print outputting (step S136). The formed page image data is again stored in the hard disc device 54 (step S137).

At this point of time, the formed page image data is held in the uncompressed state and the file preservation efficiency is low. Accordingly, in a closed loop processing system which is composed of step S138 to step S141, the compression processing of respective page image data is performed. That is, in the step S139, the image data of one page is transferred from the hard disc device 54 to the compression and decompression card 62. In the step S140, the compression and decompression card 62 compresses the image data. In this case, the image data is expressed by either the color coordinate of RGB system or the color coordinate of YMCK system. In both color coordinate systems, the compression processing is performed every face information of respective colors and the image data are again stored in the hard disc device 54 while maintaining the face order (step S141). Then, the processing procedure returns to the step 138 and the above-described closed-loop processing is repeated until the compression processing and the storing of the image data to the hard disc device 54 are finished with respect to all page image data.

Upon completion of the storing of compressed image data, the processing procedure jumps to a processing routine shown in FIG. 18 and the image outputting processing is performed by the image forming apparatus 10. This image outputting processing is executed with respect to all page image data by a closed loop system processing constituted by a judgement block S151.

In step S152, the compressed page image data and its print parameters are taken out from the hard disc device 54 and are transferred to the compression and decompression card 62. Then, in step S153, the decompression processing of the compressed image data is performed.

Subsequently, in step S154, the decompressed and restored page image data is transferred to the image forming apparatus 10 through the high-speed bus 22 and the high-speed bus interface 20 together with the printing parameters.

Then, at the image forming apparatus 10 side, the image outputting processing is performed by the image outputting part 13 (step S155). However, there may be a case where the received data is not of a data format of the output system (for example, a case where the image data is of the RGB color coordinate system). In such a case, the selection part 12B in the inside of the image processing part 12 transmits the received image data to the image processing core 12A and applies given image processing such as rotation, movement, enlargement, reduction of image, filtering, color coordinate conversion from the RGB system to the YMCK system, gray scale adjustment and the like in accordance with printing parameters to the image data and supplies data to the image outputting part 13 after converting the image data into the outputting system data format.

Upon completion of image outputting of one page, the processing procedure returns to the step S151 and the above-mentioned processing are repeated until image outputting is finished with respect to all images to be outputted.

The photograph printing system may be either "index printing" or "repeat printing". The index printing is an outputting system where a list of all photographs in the designated folder is printed out in accordance with a predetermined layout and is useful in administration of photographs and saving of outputting papers. On the other hand, the repeat printing is an outputting system where only the designated photograph is repeatedly printed out on an outputting paper of one page in accordance with a predetermined layout. In case the repeat printing is designated with respect to plural photographs, they are printed out in the order of designation.

Figure 21:
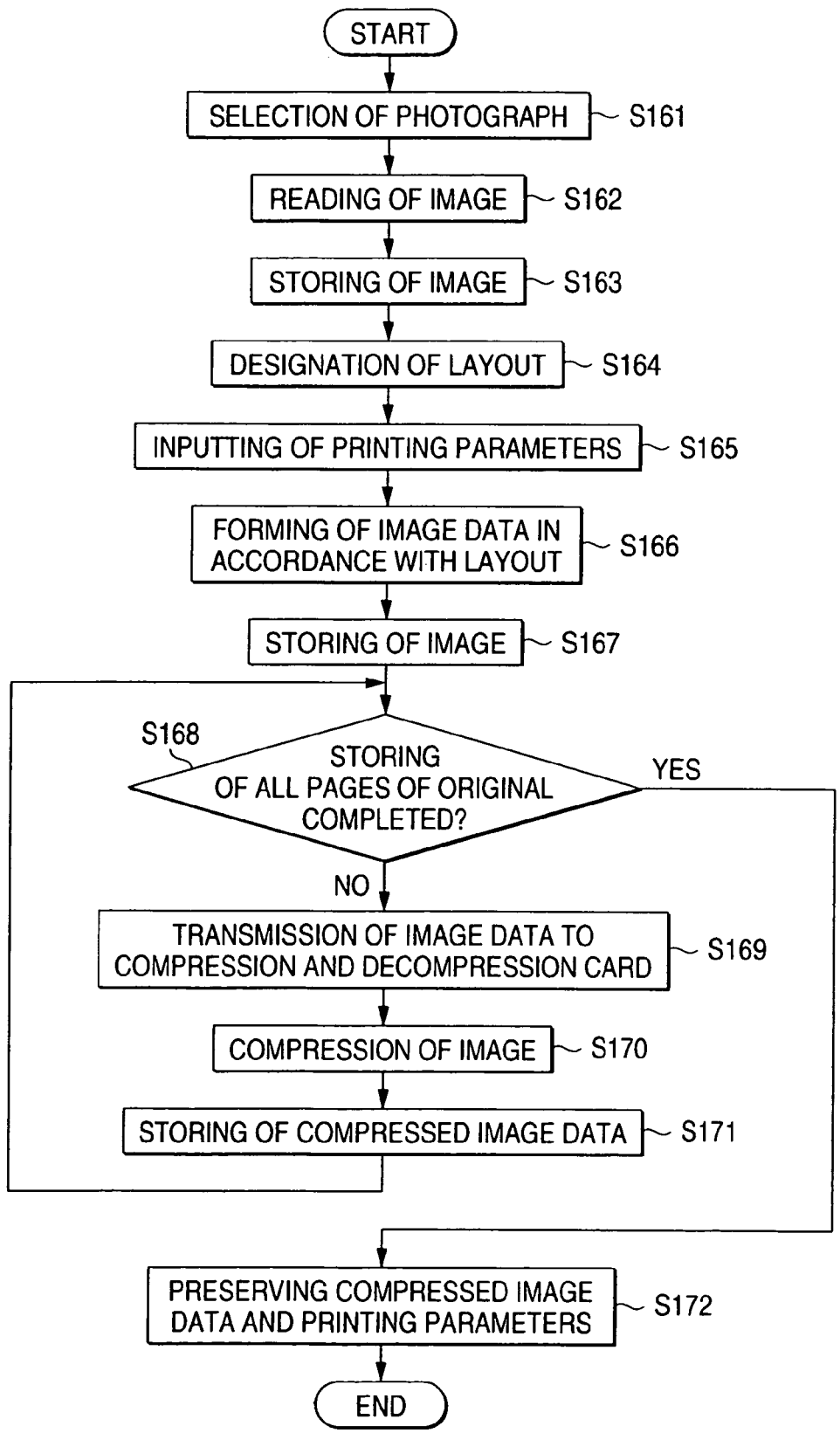
FIG. 21 is a flow chart showing processing procedures of a photograph printing operation (including a file storing but excluding an image outputting) in the image editing system 100.

There may be a case that it is unnecessary for the user of the expansion box 50 or the user of other computer connected to the expansion box 50 through the network to promptly print out the image picked up by the digital camera and rather he wants to simply preserve the image as files. FIG. 21 shows the processing procedure of the case where the picked-up image is directly preserved as files in the form of a flow chart. Respective steps of this flow chart is explained hereinafter.

In step S161, first of all, the selection of the photograph to be printed out is performed. That is, in the "file selection" within the parameter designation area shown in FIG. 19 (described previously), media which supplies image data is designated. For example, when the "PC card" button is selected, reading of image data from a media card inserted in the PC card slot 57 is tried (step S162). The read-out image data is once stored in the hard disc device 54 (step S163). In reading and storing the image data, the image data (photographs) in the designated media (or a "folder" which corresponds to the media) is displayed in the form of a list. Here, the user may select the whole folder altogether or may select some image data from the folder. As a list display system of the image data files, for example, the name of photograph (file), the pick-up date, the thumbnail (miniature version display of image) or the like can be used.

Subsequently, the designation of layout (step S164) and inputting of printing parameters is performed (step S165). These input manipulations are performed in the form of dialogue on the parameter designation area shown in FIG. 19 (described already).

Upon completion of the designation of parameters, the photograph image data which constitutes a printing object is read on the RAM 52 from the hard disc device 54. Then, in accordance with the layout designated in step S164, the photograph image data is processed (in this embodiment, the photo size is automatically adjusted corresponding to the size of the selected paper size) so as to form page image data for print outputting (step S166). The formed page image data is again stored in the hard disc device 54 (step S167).

At this point of time, the formed page image data is held in the uncompressed state and the file preservation efficiency is low. Accordingly, in a closed loop processing system which is composed of step S168 to step S171, the compression processing of respective page image data is performed. That is, in the step S169, the image data of one page is transferred from the hard disc device 54 to the compression and decompression card 62. In the step S170, the compression and decompression card 62 compresses the image data. In this case, the image data is expressed by either the color coordinate of RGB system or the color coordinate of YMCK system. In both color coordinate systems, the compression processing is performed every face information of respective colors and are again stored in the hard disc device 54 while maintaining the face order (step S171). Then, the processing procedure returns to the step 168 and the above-described closed-loop processing is repeated until the compression processing and the storing of the image data to the hard disc device 54 are finished with respect to all page image data.

Upon completion of storing of compressed image data, the compressed image data and the printing parameters inputted in the step S165 are preserved (step S172) and then the whole processing routine ends.

The place where the image data files is stored is not necessarily the local disc 54 of the expansion box 50. For example, the image data files may be stored by other media drive which is added to the expansion box 50 such as a MO drive or a CD-R drive, a DVD drive or the like (not shown in FIG. 2) or remote discs present on other computer systems connected to the expansion box 50 through the network 80.

With the use of the image editing system 100 according to this embodiment, the digital camera photograph image is displayed on the relatively large screen display 71 provided to the expansion box 50 (or a CRT display which is connected to the expansion box 50 externally and has a further large screen and a high definition) so that the image editing and the image outputting can be performed while checking the paste positions in the document and the layout of the whole document with eyes in detail.

Further, the relatively expensive image outputting function that the image forming apparatus 10 has can be commonly shared by plural PCs which are connected through the network 80 so that the image editing system 100 is excellent economically.

[Image Printing]

Here, "image printing" means to print out image data supplied to the expansion box 50 with the use of the image outputting part 13 of the image forming apparatus 10. This embodiment is characterized in that not only the image is reproduced but also the image is inlaid into given electronic documents so that the layout in the document and the like can be freely designated.

Figure 22:
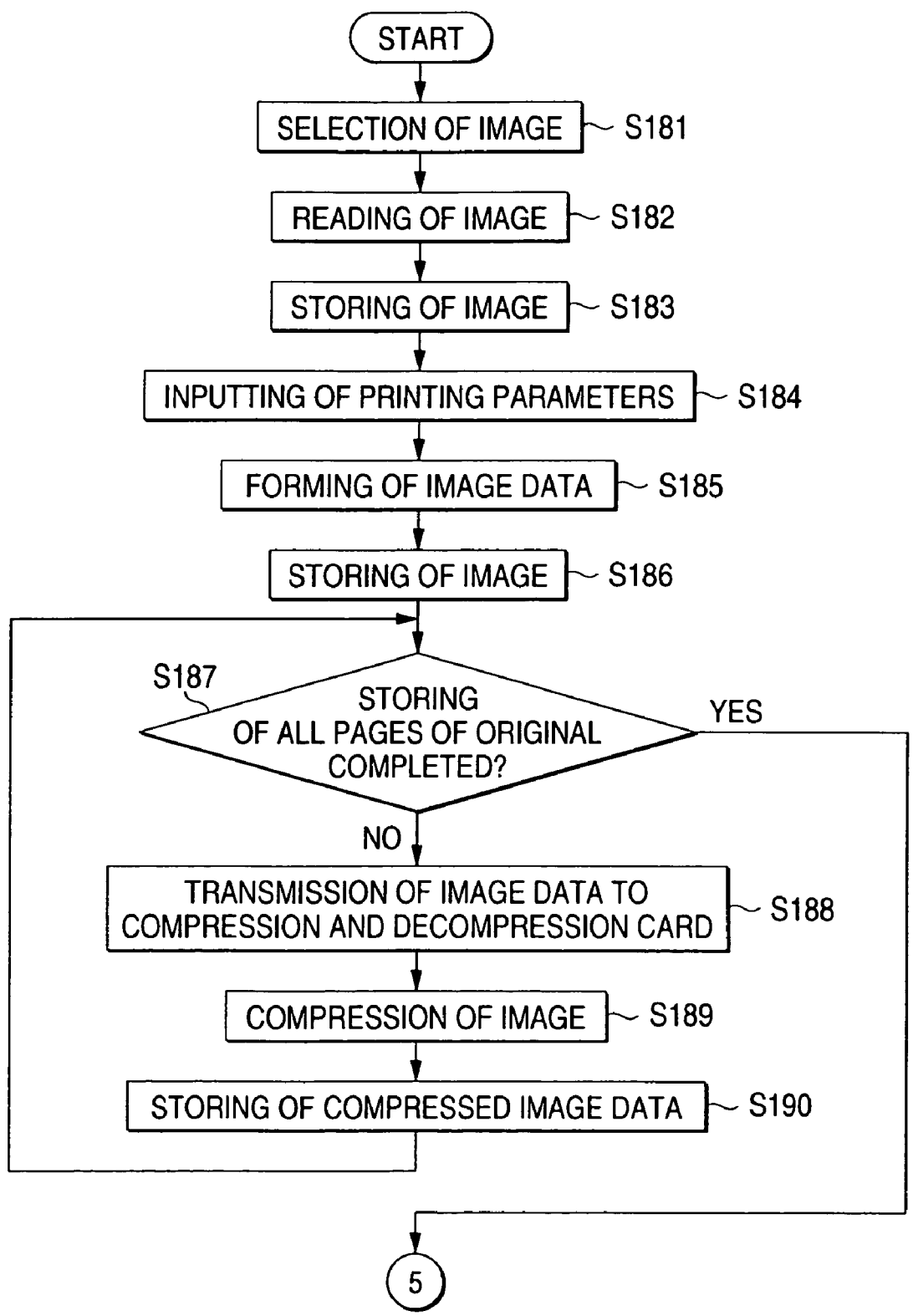
FIG. 22 is a flow chart showing processing procedures of an image printing operation (including image outputting) on the image editing system 100.
Figures 23, 24:
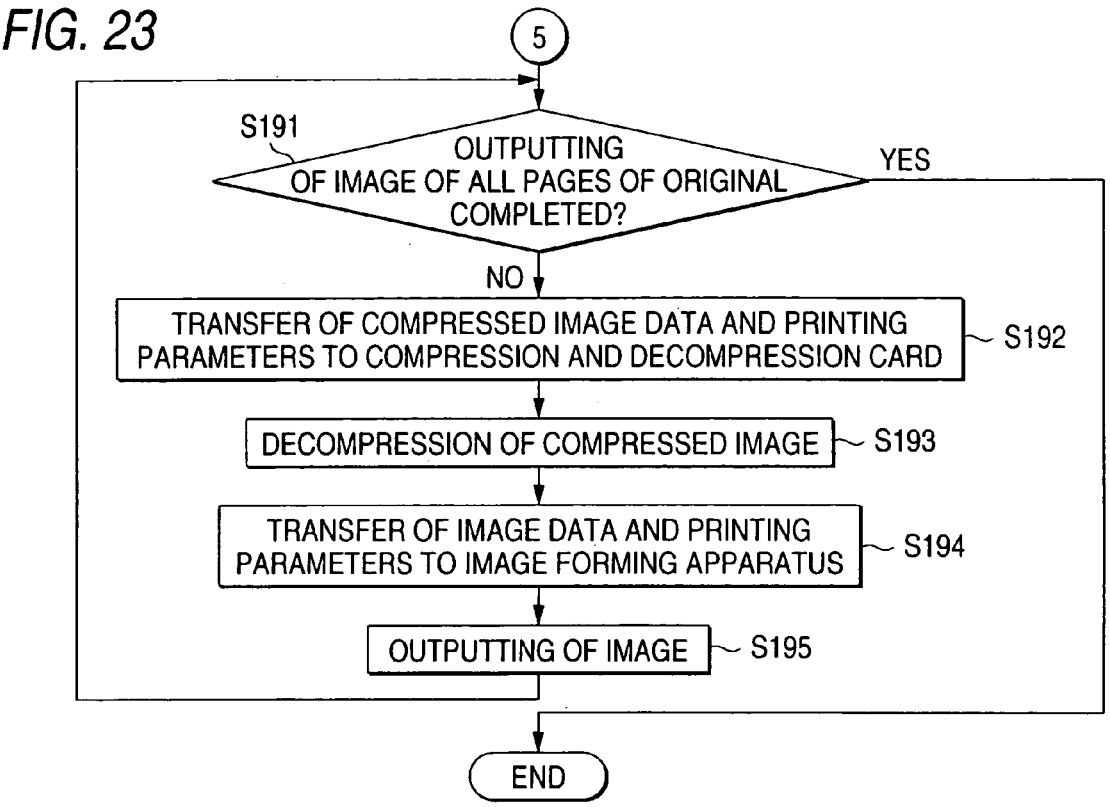
FIG. 23 is a flow chart showing processing procedures of an image printing operation (including an image outputting) in the image editing system 100.
FIG. 24 is a view obtained by extracting and illustrating only a parameter designated area out of an image printing screen displayed on the display 71.

FIG. 22 and FIG. 23 show the processing procedure for executing the image printing in the form of a flow chart. Respective steps of the flow chart are explained hereinafter.

The expansion box 50 can receive the supply of image data by loading a media disc which carries image data into a media drive locally connected to the media disc or by inserting a media card which carries image files to a PC card slot 57. Alternatively, the expansion box 50 can receive image data from other clients 81 through the network 80. Further, the image data may be preliminarily stored in the hard disc device 54.

On the main menu (see FIG. 6) provided to the display 71, by selecting the "printing service", the user can change over the screen to a printing start screen suitable for setting of printing manipulation of image data such as document printing, media printing, digital camera printing, on-site photograph printing (described later) or the like.

In FIG. 24, only a parameter designation area is extracted from the photograph printing screen provided to the display 71 and is illustrated (it is to be understood that other display regions such as CI display area, help display area, function selection area, preview area, manipulation button area or the like which are not depicted in FIG. 24 are approximately equal to those shown in FIG. 7). This parameter designation area is provided for designating various parameters related to the printing manipulation in a dialogue inputting system.

The parameter designation area is composed of two-kinds of work sheets, that is, "image printing" and "miscellaneous". By clicking or touching a tab, the user can make the corresponding work sheet displayed on the frontmost surface. In the example shown in FIG. 24, the "image printing" is selected.

On the photograph printing screen shown in FIG. 24, in response to performing of the designation of media which supplies image data, the processing flow starts (step S181). That is, in the "file selection" within the parameter designation area shown in FIG. 24, media which supplies image data is designated. For example, when a "PC card" button is selected, reading of image data from a media card inserted in the PC card slot 57 is tried (step S182). The read-out image data is once stored in the hard disc device 54 (step S183).

In reading and storing the image data, the image data (photographs) in the designated media (or a "folder" which corresponds to the media) may be displayed in the form of a list. Further, the user may select the whole folder altogether or may select some image data from the folder. As a list display system of the image data files, for example, name of photograph (file), pick-up date, thumbnail (miniature version display of image) or the like can be used.

Subsequently, the inputting of printing parameters is performed (step S184). These input manipulations are performed in the form of dialogue on the parameter designation screen shown in FIG. 24.

As printing parameters for image printing, paper selection, Collate/Uncollate designation, resolution (for example, alternatively selected between 300 dpi and 600 dpi), the number of printings, operation mode are designated. In case inputting of the printing parameters is omitted, default values are used. Although three kinds of modes, that is, "printing mode", "printing and preserving" and "preserving" are prepared as operation modes, the "printing and preserving" is assumed to be designated. Further, as the resolution, it is allowed to select either 300 dpi or 600 dpi alternatively. However, different from the photograph printing, it is impossible to designate the layout and the outputting size. Instead, the image is enlarged or shrunken to the paper size one by one and then is printed out.

Upon completion of the designation of printing parameters, the image outputting processing is started. For example, by pushing the "start" button disposed in the manipulation button area within the printing screen, the image data which constitutes a printing object is read on the RAM 52 from the hard disc device 54. Then, in accordance with the printing parameters designated in step S184, the page image data for print outputting is formed (step S185). The formed page image data is again stored in the hard disc device 54 (step S186).

At this point of time, the formed page image data is held in the uncompressed state and hence, the file preservation efficiency is low. Accordingly, in a closed loop processing system which is composed of step S187 to step S190, the compression processing of page image data is performed. That is, in the step S188, the image data of one page is transferred from the hard disc device 54 to the compression and decompression card 62. In the step S189, the compression and decompression card 62 compresses the image data. In this case, the image data is expressed by either the color coordinate of RGB system or the color coordinate of YMCK system. In both color coordinate systems, the compression processing is performed every face information of respective colors and are again stored in the hard disc device 54 while maintaining the face order (step S190). Then, the processing procedure returns to the step S187 and the above-described closed-loop processing is repeated until the compression processing and the storage of the image data to the hard disc device 54 are finished with respect to all page image data.

Upon completion of the storage of compressed image data, the processing procedure jumps to a processing routine shown in FIG. 23 and the image outputting processing is performed by the image forming apparatus 10. This image outputting processing is executed with respect to all page image data by a closed loop system processing constituted by a judgement block S191.

In step S192, the compressed page image data and its print parameters are taken out from the hard disc device 54 and are transferred to the compression and decompression card 62. Then, in step S193, the decompression processing of the compressed image data is performed.

Subsequently, in step S194, the decompressed and restored page image data is transferred to the image forming apparatus 10 through the high-speed bus 22 and the high-speed bus interface 20 together with the printing parameters.

Then, at the image forming apparatus 10 side, the image outputting processing is performed by the image outputting part 13 (step S195). However, there may be a case where the received image data is not of a data format of the output system (for example, a case where the image data is of the RGB color coordinate system). In such a case, the selection part 12B in the inside of the image processing part 12 transmits the received image data to the image processing core 12A and applies given image processing such as rotation, movement, enlargement, reduction of image, filtering, color coordinate conversion from the RGB system to the YMCK system and gray scale adjustment in accordance with printing parameters to the image data and supplies data to the image outputting part 13 after converting the image data into the outputting system data format.

Upon completion of image outputting of one page, the processing procedure returns to the step S191 and the above-mentioned processing are repeated until image outputting is finished with respect to all images to be printed.

Figure 25:
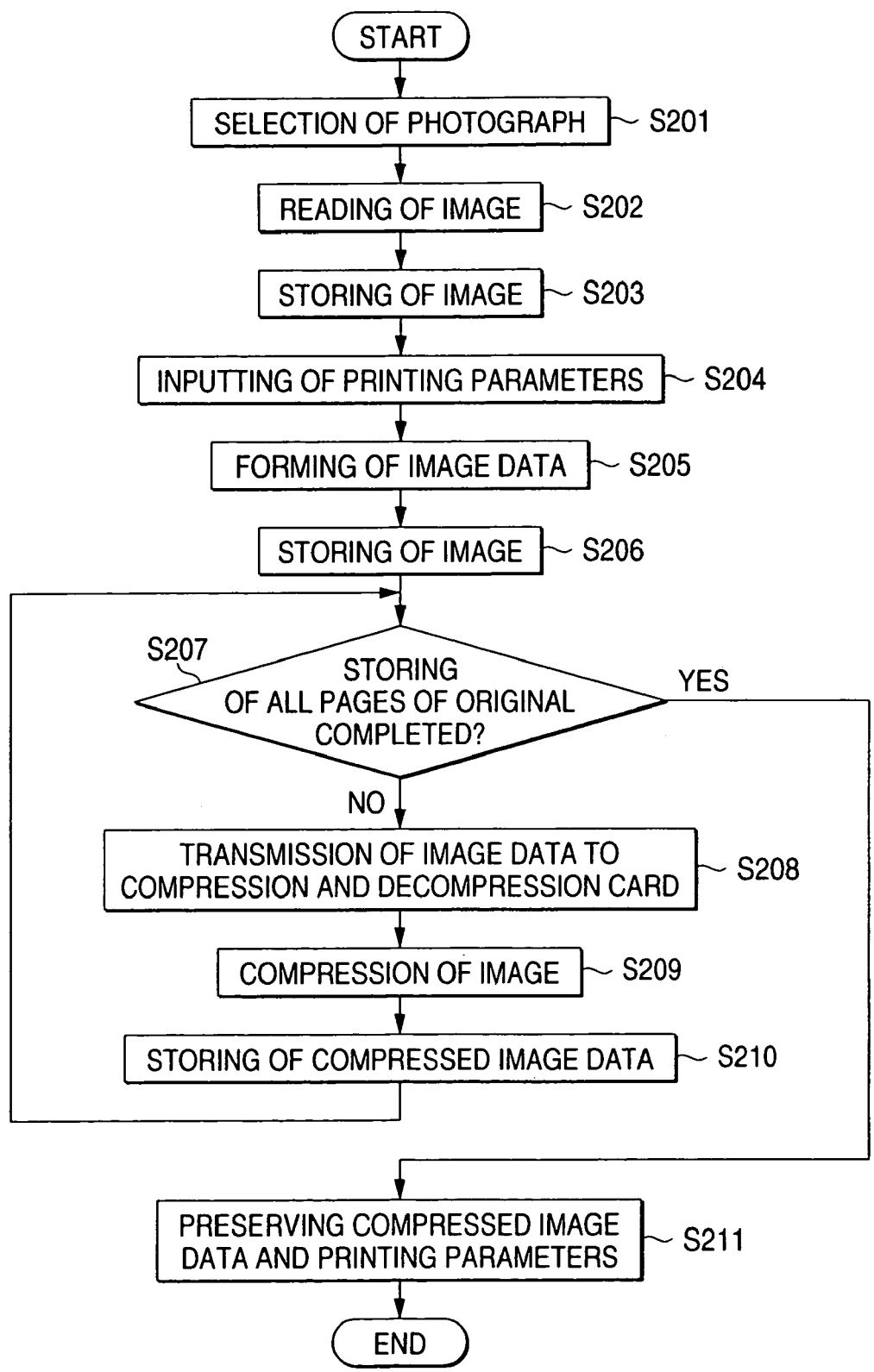
FIG. 25 is a flow chart showing processing procedures of an image printing operation (including only preserving of files but excluding image outputting) in the image editing system 100.

There may be a case that it is unnecessary for the user of the expansion box 50 or the user of other computer system connected to the expansion box 50 through the network to promptly print out the image data supplied from the media and rather he wants to simply preserve the image as files after editing the image. FIG. 25 shows the processing procedure of the case where the picked-up image is directly stored as files in the form of a flow chart. Respective steps of this flow chart is explained hereinafter.

In step S201, first of all, the selection of the image to be printed out is performed. That is, in the "file selection" within the parameter designation area shown in FIG. 24 (previously described), media which supplies image data is designated. For example, when the "PC card" button is selected, reading of image data from a media card inserted in the PC card slot 57 is tried (step S202). The read-out image data is once stored in the hard disc device 54 (step S203). In reading and storing the image data, the image data (photograph) in the designated media (or a "folder" which corresponds to the media) is displayed in the form of a list and the user may select the whole folder altogether or may select some image data from the folder. As a list display system of the image data files, for example, name of photograph (file), pick-up date, thumbnail (miniature version display of image) or the like can be used.

Subsequently, the inputting of printing parameters is performed (step S204). These input manipulations are performed in the form of dialogue on the parameter designation screen shown in FIG. 24 (described already).

As printing parameters, paper selection, Collate/Uncollate designation, resolution (for example, alternatively selected between 300 dpi and 600 dpi), the number of printings, operation mode are designated. In case inputting of the printing parameters is omitted, default values are used. Although three kinds of modes, that is, "printing", "printing and preserving" and "preserving" are prepared as operation modes, the "preserving" is assumed to be designated. Further, since the image data is only stored into files, Collate/Uncollate and the number of copies are ignored. Further, as the resolution, it is allowed to select either 300 dpi or 600 dpi alternatively.

Upon completion of the designation of printing parameters, the image data which constitutes a printing object is read on the RAM 52 from the hard disc device 54. Then, in accordance with the printing parameters designated in step S204, the page image data for print outputting is formed (step S205). The formed page image data is again stored in the hard disc device 54 (step S206).

At this point of time, the formed page image data is held in the uncompressed state and hence, the file preservation efficiency is low. Accordingly, in a closed loop processing system which is composed of step S207 to step S210, the compression processing of page image data is performed. That is, in the step S208, the image data of one page is transferred from the hard disc device 54 to the compression and decompression card 62. In the step S209, the compression and decompression card 62 compresses the image data. In this case, the image data is expressed by either the color coordinate of RGB system or the color coordinate of YMCK system. In both color coordinate systems, the compression processing is performed every face information of respective colors and the image data are again stored in the hard disc device 54 while maintaining the face order (step S210). Then, the processing procedure returns to the step S207 and the above-described closed-loop processing is repeated until the compression processing and the storing of the image data to the hard disc device 54 are finished with respect to all page image data.

Upon completion of storing of compressed image data, the compressed image data and the printing parameters inputted in the step S204 are preserved (step S211) and then, the whole processing routine ends.

The place where the image data is stored is not necessarily the local disc 54 of the expansion box 50. For example, the image data files may be stored by other media drive which is added to the expansion box 50 such as an MO drive or a CD-R drive a DVD drive (not shown in FIG. 2) or remote discs present on other computer systems connected to the expansion box 50 through the network 80.

With the use of the image editing system 100 according to this embodiment, the image data is displayed on the relatively large screen display 71 provided to the expansion box 50 (or a CRT display which is connected to the expansion box 50 externally and has a further large screen and a high definition) so that the image editing and the image outputting can be performed while checking the paste positions in the document and the layout of the whole document with eyes in detail.

Further, the relatively expensive image outputting function that the image forming apparatus 10 has can be commonly shared by plural PCs which are connected to the image forming apparatus 10 through the network 80 so that the image editing system 100 is excellent economically.

[On-Site Photograph Printing]

Here, "on-site photograph printing" means to sequentially read image data from a submission media prepared in accordance with a file format which is prescribed by the Ministry of Construction and to print out image data in accordance with a desired printing layout (or to preserve edited image data as files). The on-site photograph printing is provided for preparing official sanction documents related with civil engineering and architecture in accordance with the electronicification procedure. As the submission media, a media having a relatively large capacity such as a MO disc is used and the media includes a large number of digitally picked-up photographs. The file format includes at least one "image folder" which preserves photograph image data and a "control information folder" which preserves description data on layout information at the time of printing-out and the file format supports two forms composed of "civil engineering" and "architecture".

Figure 26:
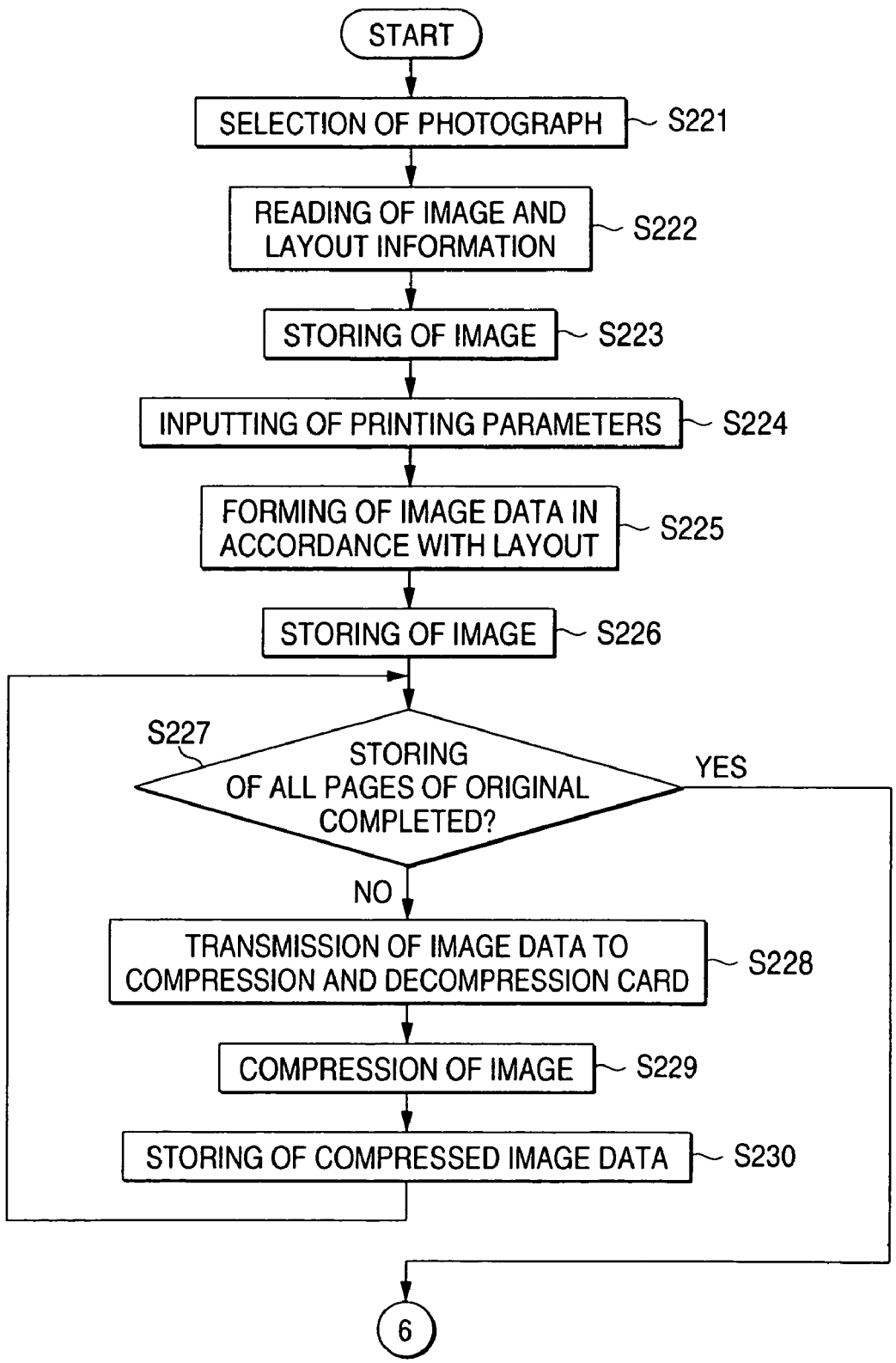
FIG. 26 is a flow chart showing processing procedures of an on-site photograph printing operation (including image outputting) in the image editing system 100.
Figure 27:
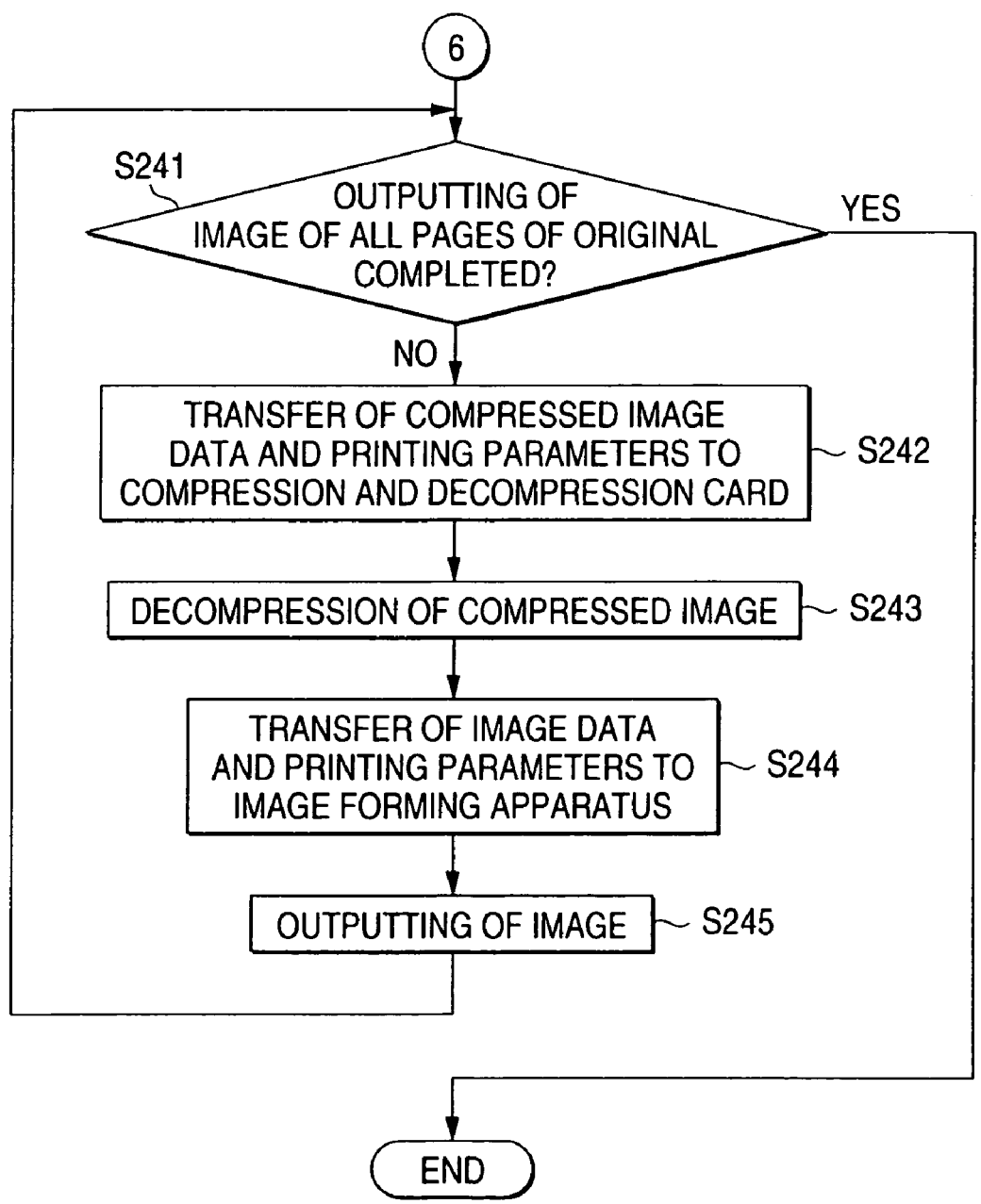
FIG. 27 is a flow chart showing processing procedures of an on-site photograph printing operation (including image outputting) in the image editing system 100.

FIG. 26 and FIG. 27 show the processing procedure for executing the on-site photograph printing in the form of a flow chart. Respective steps of the flow chart are explained hereinafter.

On the main menu screen shown in FIG. 6 (previously described), by selecting the "on-site photograph printing", this processing routine is started and at the same time an on-site printing start screen appears on the screen of the display 71.

Figure 28:
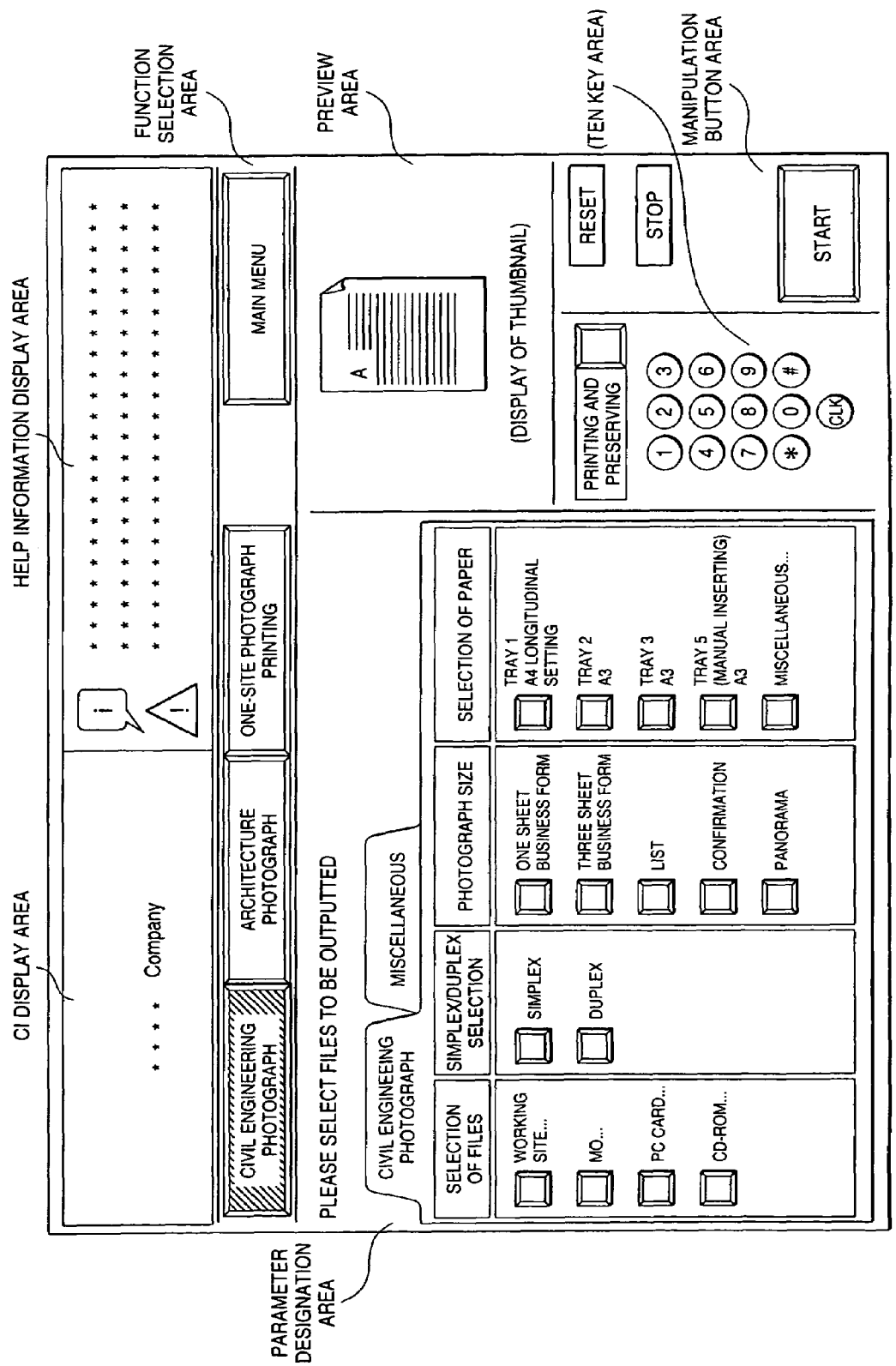
FIG. 28 is a view showing an on-site photograph printing starting screen displayed on the display 71.

FIG. 28 illustrates the configuration of the on-site photograph printing start screen. The display configurations and functions of a CI display area, a help information area, a preview area, a manipulation button area, and a ten key area on the on-site photograph printing start screen are approximately the same as those of the copying start screen which was explained in conjunction with FIG. 7. In the example shown in FIG. 28, on the function selection area of the on-site photograph printing start screen, function selection buttons composed of a "civil engineering photograph" button, an "architecture photograph" and an "on-site photograph printing" button are prepared and the "civil engineering photograph" is selected as the function here. Further, the parameter designation area is changed over to the parameter inputting screen for executing the "civil engineering photograph" function.

On the on-site photograph printing screen shown in FIG. 28, the designation of media which supplies image data is performed (step S221). That is, in the "file selection" within the parameter designation area, media which supplies image data is designated. For example, when an "MO . . . " button is selected, reading of image data and layout information at the time of printing out from an MO disc loaded into an MO drive (not shown in FIG. 2) is tried (step S222).

In reading the image data, the whole image data (that is, digital camera picked-up photographs) in the "image folder" of the designated media may be displayed in the form of a list. Further, the user may select the whole folder altogether or may select only the desired image data from the folder. As a list display system of the image data files, for example, name of photograph (file), pick-up date, thumbnail (miniature version display of image) or the like can be used.

Figure 29:
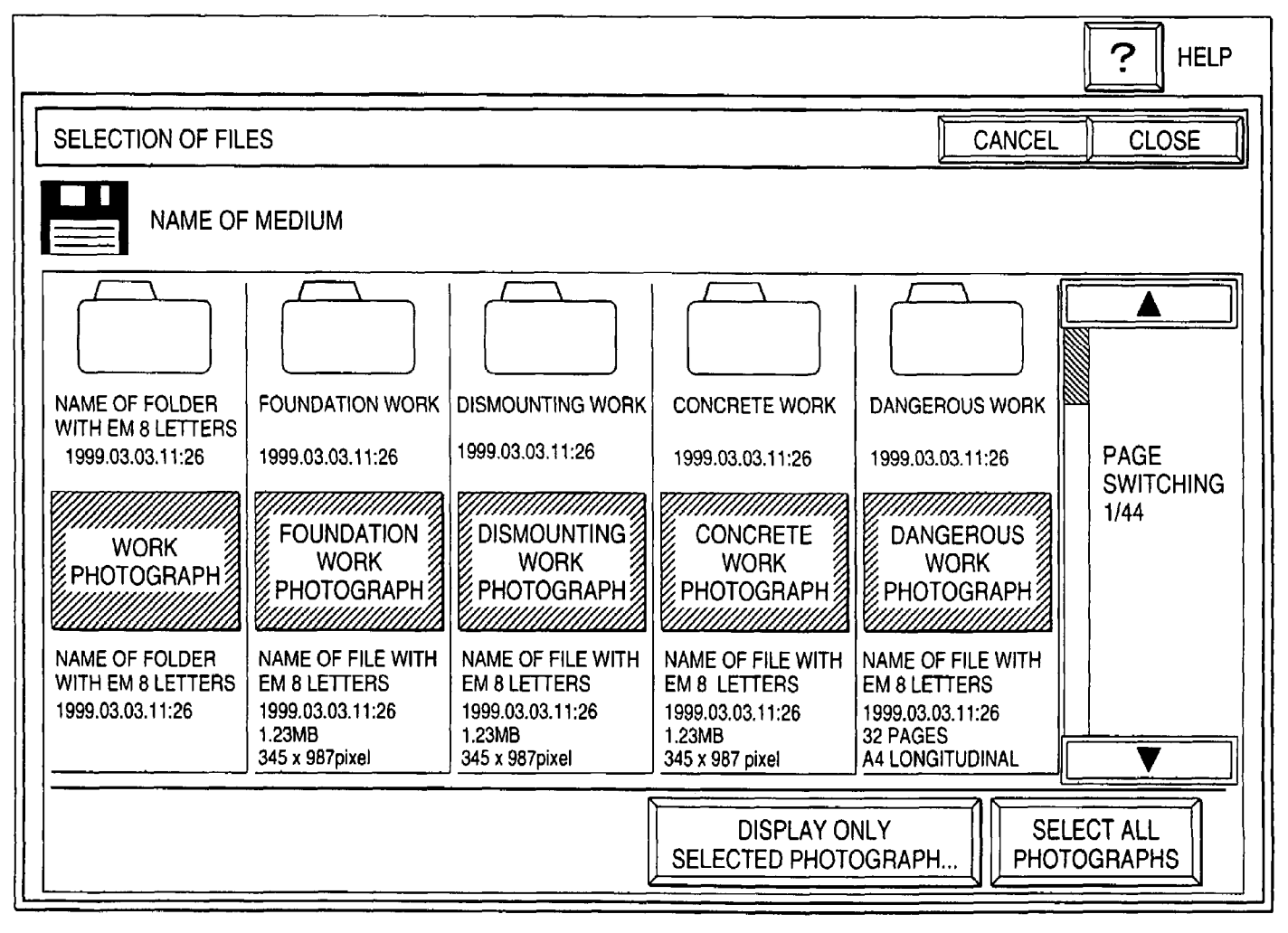

FIG. 29 shows one example of the display screen of a list of on-site photographs for selecting photographs from the designated media. As shown in the drawing, the data files of the on-site photographs at respective steps of the construction work are read out from the designated media and the data files are displayed in a list together with names of photographs (files), pick-up dates and thumbnails and the like. In case the whole photographs stored in the designated media cannot be displayed in only one screen, a scroll bar in a longitudinal direction is prepared and the pages can be changed over by clicking scroll buttons disposed at upper and lower end portions thereof. When a "display only selected photographs . . . " button disposed at the lowermost row of the display screen is clicked, only selected files are displayed and hence, image editing is performed. Alternatively, when a "select all photographs" button is clicked, all files, that is, all photographs in the designated media can be selected.

Selected image data are once stored in the hard disc device 54 (step S223).

Subsequently, inputting of printing parameters is performed (step S224). This inputting manipulation is performed in the form of dialogue on the parameter designation area shown in FIG. 28.

As printing parameters for image printing, paper selection, Collate/Uncollate designation, layout, the number of printings and operation mode are designated. In case inputting of the printing parameters is omitted, default values are used. As paper selection, only A4 longitudinal setting and A4 lateral setting are allowed. As choice of layout, one sheet business form, three sheet business form, a list and a confirmation layout are prepared. However, the layout information is read out as control data from media and hence, it is not necessary to designate the layout information in the step S224 specifically. Although three kinds of modes, that is, "printing", "printing and preserving" and "preserving" are prepared as operation modes, the "printing and preserving" is assumed to be designated here.

Upon completion of the designation of printing parameters, the image outputting processing is started. For example, by clicking or touching the "start" button disposed in the manipulation button area within the on-site photograph printing screen (see FIG. 28), the image data which constitutes a printing object is sequentially read on the RAM 52 from the hard disc device 54. Then, in accordance with the layout information read out in step S222 and the printing parameters designated in step S224, the page image data for printing out is formed (step S225). The formed page image data is again stored in the hard disc device 54 (step S226).

At this point of time, the formed page image data is maintained in the uncompressed state and the file preservation efficiency is low. Accordingly, in a closed loop processing system which is composed of step S227 to step S230, the compression processing of respective page image data is performed. That is, in the step S228, the image data of one page is transferred from the hard disc device 54 to the compression and decompression card 62. In the step S229, the compression and decompression card 62 compresses the image data. In this case, the image data is expressed by either the color coordinate of RGB system or the color coordinate of YMCK system. In both color coordinate systems, the compression processing is performed every face information of respective colors and are again stored in the hard disc device 54 while maintaining the face order (step S230). Then, the processing procedure returns to the step S227 and the above-described closed-loop processing is repeated until the compression processing and the storage of the image data to the hard disc device 54 are completed with respect to all page image data.

Upon completion of the storage of compressed image data, the processing procedure jumps to a processing routine shown in FIG. 27 and the image outputting processing is performed by the image forming apparatus 10. This image outputting processing is executed with respect to all page image data by a closed loop system processing constituted by a judgement block S241.

In step S242, the compressed page image data and its printing parameters are taken out from the hard disc device 54 and are transferred to the compression and decompression card 62. Then, in step S243, the decompression processing of the compressed image data is performed.

Subsequently, in step S244, the decompressed and restored page image data is transferred to the image forming apparatus 10 through the high-speed bus 22 and the high-speed bus interface 20 together with the printing parameters.

Then, at the image forming apparatus 10 side, the image outputting processing is performed by the image outputting part 13 (step S245). However, there may be a case where the received image data is not of a data format of the output system (for example, a case where the image data is of the RGB color coordinate system). In such a case, the selection part 12B in the inside of the image processing part 12 transmits the received image data to the image processing core 12A and applies given image processing such as rotation, movement, enlargement, reduction of image, filtering, color coordinate conversion from the RGB system to the YMCK system and gray scale adjustment to the image data in accordance with printing parameters and supplies the image data to the image outputting part 13 after converting the image data into the outputting system data format.

Upon completion of image outputting of one page, the processing procedure returns to the step S241 and the above-mentioned processing are repeated until image outputting is completed with respect to all outputting image.

Even when the media disc which carries the on-site photographs is not loaded into the drive unit of the expansion box 50 per se but is loaded into the drive unit of other computer system 81 . . . which is connected to the expansion box 50 through the network 80, the on-site photograph printing can be realized in accordance with processing procedure shown in FIG. 26 and FIG. 27.

Figure 30:
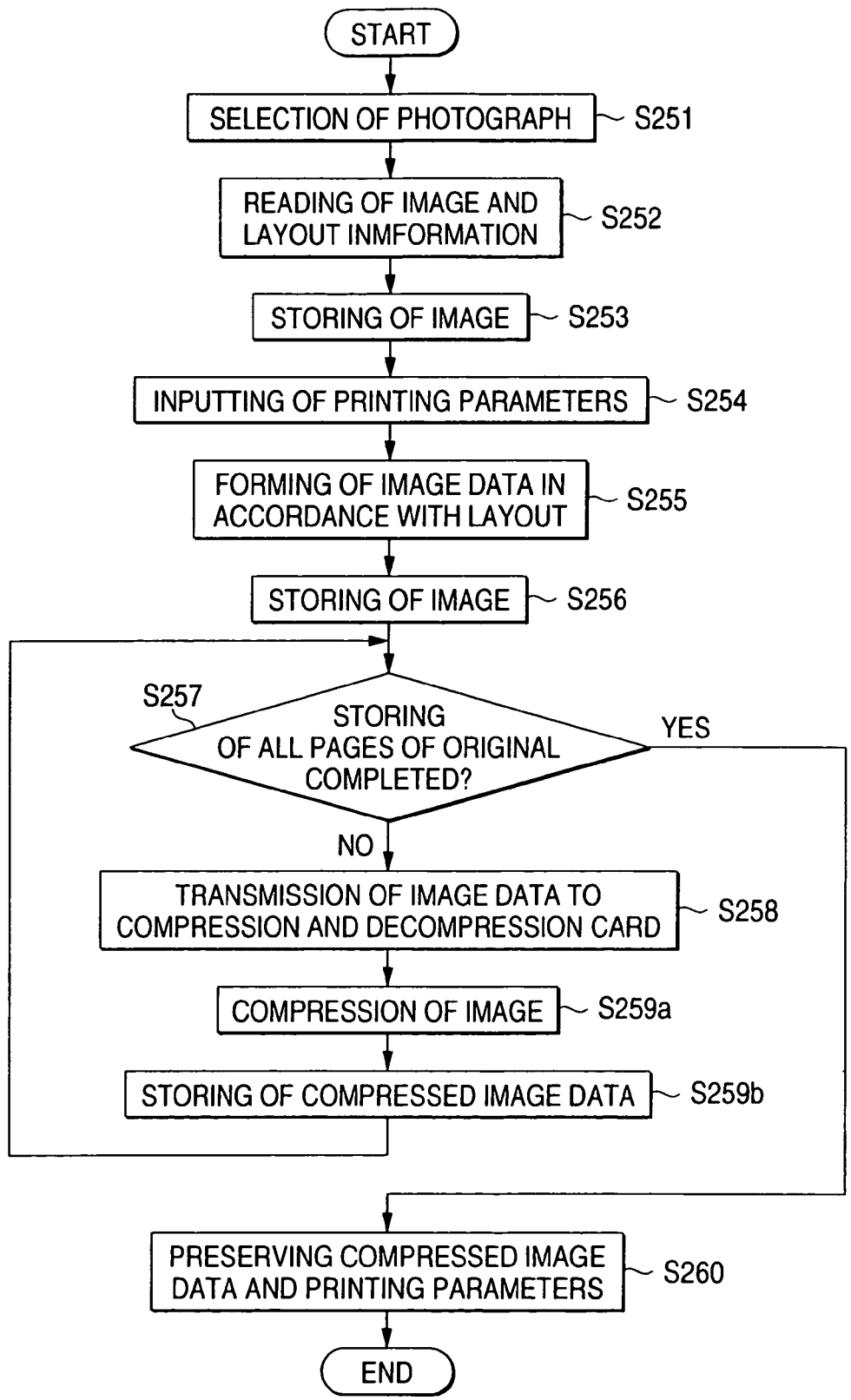
FIG. 30 is a flow chart showing processing procedures of an on-site photograph printing operation (including a file storing but excluding an image outputting) in the image editing system 100.

There may be a case that it is unnecessary for a person who prepares media for submission to the Ministry of Construction to promptly print out the image data (photographs picked up by the digital camera) carried by the submission media and rather he wants to simply preserve the image data as files after image editing. FIG. 30 shows the processing procedure of the case where the on-site photographs are directly stored as files in the form of a flow chart. Respective steps of this flow chart is explained hereinafter.

On the main menu screen shown in FIG. 6 (previously mentioned), by selecting the "on-site photograph printing" button, this processing routine is started and simultaneously the on-site photograph printing start screen (see FIG. 28) appears on the screen of the display 71.

First of all, on the on-site photograph printing screen shown in FIG. 28, the designation of media which supplies image data is performed (step S251). That is, in the "file selection" within the parameter designation area, media which supplies image data is designated. For example, when the "MO . . . " button is selected, reading of image data and layout information at the time of printing out from an MO disc loaded into an MO drive (not shown in the drawing) is tried (step S252).

In reading the image data, the whole image data (that is, photographs picked up by the digital camera) in the "image folder" of the designated media is displayed in the form of a list. Here, the user may select the whole folder altogether or may select only the desired image data from the folder. As a list display system of the image data files, for example, name of photograph (file), pick-up date, thumbnail (miniature version display of image) or the like can be used (see FIG. 29)

The read-out image data is once stored in the hard disc device 54 (step S253).

Subsequently, inputting of printing parameters are performed (step S254). This input manipulation is performed in the form of dialogue on the parameter designation screen shown in FIG. 28.

As printing parameters for image printing, paper selection, Collate/Uncollate designation, layout, the number of printings and the operation mode are designated. In case inputting of the printing parameters is omitted, default values are used. As paper selection, only A4 longitudinal setting and A4 lateral setting are allowed. As choice of layout, one sheet business form, three sheet business form, a list and a confirmation layout are prepared. However, the layout information is read out as control data from media and hence, it is not necessary to designate the layout information in the step S254 specifically. Although three kinds of modes, that is, "printing", "printing and preserving" and "preserving" are prepared as operation modes, the "preserving" is assumed to be designated here. Further, the image data is only preserved in files and hence, the Collate/Uncollate designation and the number of printings are ignored.

Upon completion of the designation of printing parameters, the image data which constitutes a printing object is read on the RAM 52 from the hard disc device 54. Then, in accordance with the layout information read in the step S252 and the printing parameters designated in step S254, the page image data for printing out is formed (step S255). The formed page image data is again stored in the hard disc device 54 (step S256).

At this point of time, the formed page image data is held in the uncompressed state and the file preservation efficiency is low. Accordingly, in a closed loop processing system which is composed of step S257 to step S260, the compression processing of respective page image data is performed. That is, in the step S258, the image data of one page is transferred from the hard disc device 54 to the compression and decompression card 62. In the step S259a, the compression and decompression card 62 compresses the image data. In this case, the image data is expressed by either the color coordinate of RGB system or the color coordinate of YMCK system. In both color coordinate systems, the compression processing is performed every face information of respective colors and the image data is again stored in the hard disc device 54 while maintaining the face order (step S259b). Then, the processing procedure returns to the step S257 and the above-described closed-loop processing is repeated until the compression processing and the storage of the image data to the hard disc device 54 are completed with respect to all page image data.

Upon completion of storing of compressed image data, the compressed image data and the printing parameters inputted in the step S254 are stored (step S260) and then the whole processing routine ends.

The place where the image data file is stored is not necessarily the local disc 54 of the expansion box 50. For example, the files may be stored by other media drive which is added to the expansion box 50 such as an MO drive, a CD-R drive or a DVD drive (not shown in FIG. 2) or remote discs present on other computer systems connected to the expansion box 50 through the network 80.

With the use of the image editing system 100 according to this embodiment, the on-site photograph image is displayed on the relatively large screen display 71 provided to the expansion box 50 (or a CRT display which is connected to the expansion box 50 externally and has a further large screen and a high definition) so that the image editing and the image outputting can be performed while checking the paste positions in the document and the layout of the whole document with eyes in detail.

Further, the relatively expensive image outputting function that the image forming apparatus 10 has can be commonly shared by plural PCs which are connected to the image forming apparatus 10 through the network 80 so that the image editing system 100 is excellent economically.

[Document Synthesis]

In an image editing system 100 according to this embodiment, the document which is subjected to image editing or is outputted as image can be preserved as files in a suitable manner. As a place for preserving files, besides the hard disc 54 in the expansion box 50, other media drive which is added to the expansion box 50 (for example, an MO drive or a CD-R drive: not shown in the drawing) or a remote disc present on other computer system 81 . . . connected to the expansion box 50 through the network 80 is considered (previously mentioned).

Further, the preserved files can be taken out from the media and printed out when they are necessary. By preserving files in a data format system which enables the prompt image outputting at the image outputting part 13 (for example, the image data being already converted to YMCK color coordinate system), after reading image data from the media, printing data can be supplied to the image outputting part 13 real-time so that high-speed printing becomes possible. Further, plural files in the media are selected and are printed out altogether (called "document printing" hereinafter) or plural files can be synthesized into one document (called "document synthesis).

In performing the document printing or the document synthesis, first of all, files which become a processing target is taken out. In case the target files are on the local hard disc device 54, this disc device 54 is designated. Further, in case the target files are on other media, the media is loaded into a media drive and simultaneously the media drive is designated. Further, in case the target file are on the remote disc on the network 80, this remote disc is designated.

In response to the designation of the media, on the screen of the display 71 of the expansion box 50, the files in the designated media are displayed in the form of a list and the user can select the given files in the form of dialogue. The selected files are, for example, once stored in a working area in the hard disc device 54. Further, by designating other media again, a larger number of files can be taken in as editing targets.

Subsequently, the printing parameter inputting is performed with respect to the stored files with the use of the above-mentioned image editing function. Further, by selecting the "start" button on the printing start screen, the document printing is performed.

Further, by setting the operation mode to "preserving", the document synthesis can be designated.

The paper selection can be designated every file. However, it is impossible to designate papers except for the papers whose size and direction agree with the size and the direction thereof at the time of preserving documents. Further, since the high-speed reprinting is pursued and the files are stored with the data format of right-before printing out, the changing of size and direction at the time of document printing is not allowed. To perform the changing of size and direction, the decompression of the compression data and the image processing again (for example, the conversion to the output system data format) become necessary and hence, the reduction of the performance must be taken into account.

Further, in case the inputting of printing parameters is omitted, default values are used.

With the use of the image editing system 100 according to this embodiment, a large quantity of image files can be stored by using the memory device of a large capacity which is installed in the expansion box 50 and these image files are utilized for performing the document synthesis and the document printing. The expansion box 50 is designed by making use of the architecture of the general-purpose computer system and hence, the addition or the extension of the memory capacity such as hard disc device or the like can be easily carried out at a relatively low cost. Further, the image under editing is displayed on the display 71 having a large screen (or a CRT display which is connected to the expansion box 50 externally and has a larger screen and a higher definition) so that the image editing and the image outputting and the like can be performed while checking the document synthesis operation with eyes in detail.

Further, the relatively expensive image inputting and image outputting function that the image forming apparatus 10 has can be commonly shared by plural PCs which are connected to the image forming apparatus 10 through the network 80 so that the image editing system 100 is excellent economically.

[Scanning Box]

The scanning box means a function of storing image which is scanned at the image inputting part 11 in the image forming apparatus 10 into the hard disc device 54 in the expansion box 50 (that is, the scanning box). The image files in the scanning box can be commonly shared by respective computer systems connected to the network 80.

Figure 31:
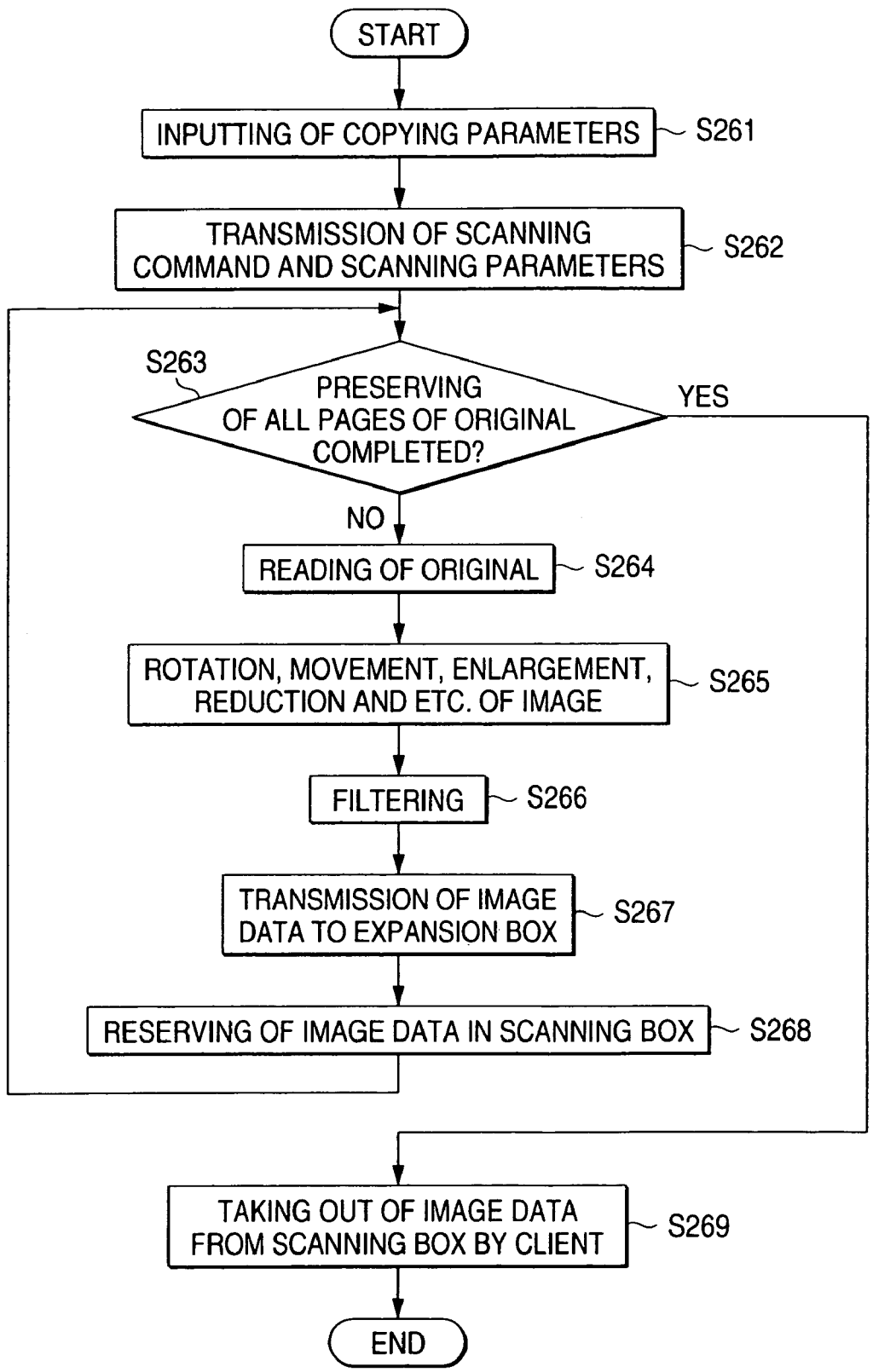
FIG. 31 is a flow chart showing processing procedures of a scanning box operation in the image editing system 100.

FIG. 31 shows the processing procedure in case of using the scanning box function in the form of a flow chart. Respective steps of the flow chart are explained hereinafter.

First of all, the scanning parameters are inputted (step S261). As scanning parameters, resolution, gray scale, magnification, reading surface, image size, preserving place (pass name, name of preserving files) and the like are used. The resolution is selected out of 100 dpi, 200 dpi, 300 dpi and 400 dpi. Further, either colors (24 bits) or gray (8 bits) is alternatively selected as the gray scale.

Subsequently, the first page of the original is placed on the platen (or the automatic document feeder: not shown in the drawing) of the image forming apparatus 10. In response to the clicking or touching of the "start" button disposed at the left lower side of the scanning start screen (see FIG. 7), the scanning command and the scanning parameters are transmitted to the image forming apparatus 10 side through the high-speed bus 22 and the high-speed bus interface 20 (step S262).

Subsequently, at the image forming apparatus 10 side, the original image scanning operation is started in accordance with the received scanning command and the scanning parameters. Then, a closed-loop system processing constituted by a judgement block S263 is repeatedly executed until the image inputting is completed with respect to the whole original pages.

That is, the image inputting part 11 optically scans the surface image of one page of the original placed on the platen (step S264). This inputting image data is transferred to the image processing part 12 and the image processing is executed. Here, the image processing includes processing (step S265) such as rotation, movement, enlargement, reduction of image or the like in accordance with scanning parameters, filtering (step S266) and the like. However, in this processing routine, since the image outputting of the scanned image is not expected necessarily, it is unnecessary to form the output system data format and hence, processing such as color coordinate conversion from the RGB system to the YMCK system, gray scale adjustment and the like are omitted. Further, the compression processing of image data is also omitted.

Subsequently, in step S267, the image data subjected to the image processing is transferred to the expansion box 50 through the high-speed bus interface 20 and the high-speed bus 22.

In the expansion box 50, the received image data is temporarily stored in the scanning box allocated to a given disc region in the inside of the hard disc device 54 (step S268).

Then, the processing procedure returns to the step S263 and the above-mentioned processing is repeated until the storing of image data is completed with respect to all pages of original.

Upon completion of storing of image data with respect to all pages of original, a client of the network 80 takes out the image data from the scanning box and transfers the image data to his own preserving place and preserves the image data as files (step S269). Here, the preserving place may be, for example, a local disc of the client which may be specified by the pass name and the file name.

With the use of the image editing system 100 according to this embodiment, the relatively expensive image inputting function that the image forming apparatus 10 has can be commonly shared by plural PCs which are connected to the expansion box 50 through the network 80 so that the image editing system 100 is excellent economically.

[Job Template]

The Job Template means a function of preliminarily defining parameters for scanning original images. Not only the expansion box 50 which is directly connected to the image forming apparatus 10 but also clients 81, 82 . . . which are connected to the expansion box 50 through the network 80 can effectively make use of the Job Template.

Figure 32:
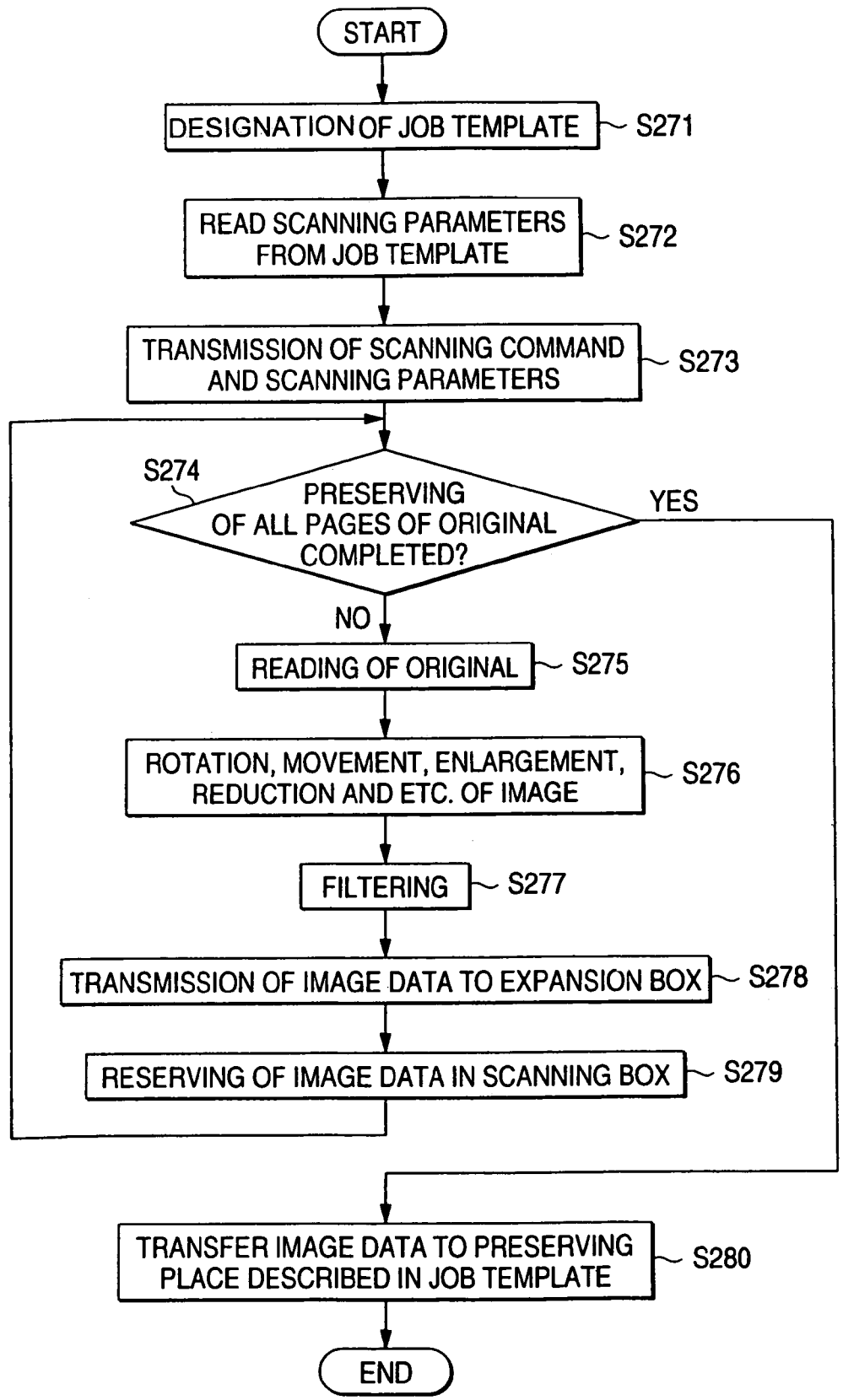
FIG. 32 is a flow chart showing processing procedures of a Job Template operation in the image editing system 100.

FIG. 32 shows the processing procedure in case of using the scanning box function in the form of a flow chart. Respective steps of the flow chart are explained hereinafter.

As mentioned previously, the Job Template is composed of a combination of scanning parameter values. Here, as scanning parameters, resolution, gray scale, magnification, reading surface, image size, preserving place (pass name, name of preserving files) and the like are used. The resolution is selected out of 100 dpi, 200 dpi, 300 dpi and 400 dpi. Further, either colors (24 bits) or gray (8 bits) is alternatively selected as the gray scale.

The client 81 . . . preliminarily prepares at least tow Job Templates. Then, in step S271, the client designates the Job Template that he uses and transfers this Job Templates to the expansion box 50.

The expansion box 50 takes out the scanning parameters from the received Job Template (step S272). Then, the first page of the original is placed on the platen (or the automatic document feeder: not shown in the drawing) of the image forming apparatus 10. In response to clicking or touching of the "start" button (see FIG. 7) disposed at the left lower side of the scanning start screen (see FIG. 7), the scanning command and the scanning parameters are transmitted to the image forming apparatus 10 side through the high-speed bus 22 and the high-speed bus interface 20 (step S273).

Subsequently, at the image forming apparatus 10 side, the original image scanning operation is started in accordance with the received scanning command and the scanning parameters. Then, a closed-loop system processing constituted by a judgement block S274 is repeatedly executed until the image inputting is completed with respect to the whole original pages.

That is, the image inputting part 11 optically scans the surface image of one page of the original placed on the platen (step S275). This inputting image data is transferred to the image processing part 12 and the image processing is executed. Here, the image processing includes processing (step S276) such as rotation, movement, enlargement, reduction of image or the like in accordance with scanning parameters described in the Job Template, filtering (step S277) and the like. However, since the image outputting is not expected necessarily, it is unnecessary to form the output system data format and hence, processing such as color coordinate conversion from the RGB system to the YMCK system and gray scale adjustment are omitted. Further, the compression processing of image data is also omitted.

Subsequently, in step S278, the image data subjected to the image processing is transferred to the expansion box 50 through the high-speed bus interface 20 and the high-speed bus 22.

In the expansion box 50, the received image data is temporarily stored in the scanning box (described previously) allocated to a given disc region in the inside of the hard disc device 54 (step S279).

Then, the processing procedure returns to the step S274 and the above-mentioned processing is repeated until the storing of image data is completed with respect to all pages of original.

Upon completion of storing of image data with respect to all pages of original, the image data is transferred to a preserving place described in the Job Template (step S280). The preserving place is usually a local disc of the client who published the Job Template which may be specified by the pass name and the file name. The client may preserve and administrate files in such a manner that the files correspond to the Job Template.

With the use of the image editing system 100 according to this embodiment, the original image can be scanned in accordance with the printing parameters which the client who is connected to the network 80 preliminarily defines and hence, it is excellent in the operability of the scanning function under the network environment.

Further, the relatively expensive image inputting function that the image forming apparatus 10 has can be commonly shared by plural PCs which are connected to the expansion box 50 through the network 80 so that the image editing system 100 is excellent economically.

As has been described heretofore, according to the present invention, the expansion of image editing function can be provided with the least design change of the body of the image forming apparatus.

The image editing system according to the present invention is composed of the image forming apparatus body and the expansion box. In such a configuration, the image forming apparatus includes the image inputting part which inputs original image as image data of the input color coordinate system, the image processing part which converts the image data of the input color coordinate system into the output color coordinate system, the image outputting part which prints out the image data of the input color coordinate system, and the first connection part which performs transmission/reception of the image data of the output color coordinate system between the image forming apparatus and the expansion box. Further, the expansion box provides the expansion of the image editing function and includes the second connection part which is connected to the first connection part and the storing part which stores the image data.

The expansion box can be developed at a low cost in a short due period by making use of the architecture of the general-purpose computer system. Further, the image forming apparatus can enjoy added functions which make use of the hardware resource of the general-purpose computer by merely preparing the port for external connection.

The display provided to the expansion box has the larger screen than the operation panel which is provided to the image forming apparatus as standard equipment and can provide the GUI screen which depicts each manipulation object largely, or separates each manipulation object by color or makes use of a multi-window or work sheet screen so as to make the user intuitively understand the manipulation manner. Not only the GUI screen is designed in the form of a window system screen which is general in the field of computer technology, but also the GUI screen can be designed in the form of an operation panel of a copying machine so as to obtain the integration of operational feeling between the users of copying machines. The design change of such a GUI screen can be substantially realized by only rewriting software program and hence, the design change can be performed at a relatively low cost in a short due period.

Although the present invention has been explained in detail in conjunction with specific embodiments, it is obvious that various modifications and substitutions can be made by those who are skilled in the art within a scope which does not depart from the gist of the present invention. That is, the invention is disclosed for the purpose of illustration and should not construed in a restricting manner. To determine the gist of the present invention, the claims hereunder is to be referred to.

We claim:

1. An image editing system comprising:
   an image forming apparatus including:
      a user interface;
      a display;
      an image inputting part which inputs an original image as image data of an input color coordinate system;
      an image processing part which converts the image data of the input color coordinate system into image data of an output color coordinate system;
      an image outputting part which prints out the image data of the output color coordinate system; and
      a connection part which performs transmission/reception of the image data of the output color coordinate system between the image forming apparatus and an expansion box comprising a computer disposed outside the image forming apparatus, wherein
   the expansion box is connected to the image forming apparatus, the expansion box including:
      a user interface;
      a display;
      a connection part that inputs and outputs image data;
      an image editing part that performs all of an electronic clipping process, and an electronic copying process and an electronic process of sorting the image data; and
      a storing part that stores the image data, wherein at least one of the user interface of the image forming apparatus and the display of the image forming apparatus is disabled when the display of the expansion box is active.

2. The image editing system according to claim 1, wherein the expansion box further comprises an approximately box-like body and a display part which is disposed on the upper surface of the body.

3. The image editing system according to claim 2, wherein the expansion box further comprises a recording medium loading part in a front face thereof.

4. The image editing system according to claim 1, further comprising:
   a discharging part which discharges a printing paper to the outside of the apparatus; and
   a supporting member comprising a mounting base that holds the media box and an attaching part that attaches the mounting base to the image forming apparatus at a position not interfering with the discharging part.

5. The image editing system according to claim 1, the expansion box further comprising a media box having a recording medium loading part and an expansion box body accommodating other hardware components, the expansion box body being disposed near the image forming apparatus.

* * * * *